United States Patent
Kawashima et al.

(10) Patent No.: US 8,812,306 B2
(45) Date of Patent: *Aug. 19, 2014

(54) SPEECH DECODING AND ENCODING APPARATUS FOR LOST FRAME CONCEALMENT USING PREDETERMINED NUMBER OF WAVEFORM SAMPLES PERIPHERAL TO THE LOST FRAME

(75) Inventors: Takuya Kawashima, Ishikawa (JP); Hiroyuki Ehara, Kanagawa (JP); Koji Yoshida, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 991 days.

This patent is subject to a terminal disclaimer.

(21) Appl. No.: 12/307,974

(22) PCT Filed: Jul. 11, 2007

(86) PCT No.: PCT/JP2007/063814
§ 371 (c)(1),
(2), (4) Date: Jan. 8, 2009

(87) PCT Pub. No.: WO2008/007699
PCT Pub. Date: Jan. 17, 2008

(65) Prior Publication Data
US 2009/0326930 A1 Dec. 31, 2009

(30) Foreign Application Priority Data

Jul. 12, 2006 (JP) .................................. 2006-192071
Dec. 15, 2006 (JP) .................................. 2006-338981
Mar. 3, 2007 (JP) .................................. 2007-053547

(51) Int. Cl.
*G10L 21/00* (2013.01)
*H04L 1/00* (2006.01)
*G10L 19/005* (2013.01)
*G10L 25/90* (2013.01)
*H04L 12/56* (2006.01)

(52) U.S. Cl.
CPC ............... *G10L 19/005* (2013.01); *H04L 47/10* (2013.01); *G10L 25/90* (2013.01)
USPC ........................... 704/207; 704/228; 370/230

(58) Field of Classification Search
CPC ........ G10L 25/90; G10L 19/005; H04L 47/10
USPC .................................. 704/228, 201; 370/201
See application file for complete search history.

(56) References Cited

U.S. PATENT DOCUMENTS

| 5,732,389 A | 3/1998 | Kroon et al. |
| 6,584,438 B1 | 6/2003 | Manjunath et al. |

(Continued)

FOREIGN PATENT DOCUMENTS

| JP | 9-120298 | 5/1997 |
| JP | 2002-221994 | 8/2002 |

(Continued)

OTHER PUBLICATIONS

English language Abstract of JP 2002-221994, Aug. 9, 2002.

(Continued)

*Primary Examiner* — Farzad Kazeminezhad
(74) *Attorney, Agent, or Firm* — Greenblum & Bernstein, P.L.C.

(57) ABSTRACT

An audio decoding device capable of suppressing an information amount for a lost flame compensation process and encoding efficiency is provided. A decoded sound source generator generates a lost frame's CELP decoded sound source signal. A pitch pulse information decoder CELP decodes a pitch pulse position information and a pitch pulse amplitude information. A pitch pulse waveform learner learns a pitch pulse learning waveform in a past frame in advance from the lost frame. A convolution adjuster amplitude-adjusts the pitch pulse learning waveform according to the pitch pulse amplitude information by considering a predetermined number of waveforms peripheral to a peak position of the lost frame's CELP decoded excitation signal, and convolutes a pitch pulse waveform into a time axis which has been amplitude-adjusted according to the pitch pulse position information. A sound source signal corrector adds or replaces the pitch pulse waveform convoluted into the time axis to the lost flame decoded sound source signal.

11 Claims, 36 Drawing Sheets

(56) References Cited

U.S. PATENT DOCUMENTS

| | | |
|---|---|---|
| 6,757,654 B1 | 6/2004 | Westerlund et al. |
| 7,047,190 B1 * | 5/2006 | Kapilow .................... 704/228 |
| 7,324,444 B1 * | 1/2008 | Liang et al. ................ 370/230 |
| 7,596,488 B2 * | 9/2009 | Florencio et al. ........... 704/208 |
| 7,693,710 B2 * | 4/2010 | Jelinek et al. .............. 704/207 |
| 2003/0093266 A1 | 5/2003 | Banba |
| 2004/0049380 A1 | 3/2004 | Ehara et al. |
| 2005/0060143 A1 * | 3/2005 | Ehara ......................... 704/201 |
| 2005/0154584 A1 | 7/2005 | Jelinek et al. |
| 2005/0171771 A1 | 8/2005 | Yasunaga et al. |
| 2005/0197833 A1 | 9/2005 | Yasunaga et al. |
| 2005/0288936 A1 * | 12/2005 | Busayapongchai et al. .. 704/275 |
| 2006/0206317 A1 | 9/2006 | Morii et al. |
| 2008/0033717 A1 | 2/2008 | Sato et al. |

FOREIGN PATENT DOCUMENTS

| | | |
|---|---|---|
| JP | 2002-236495 | 8/2002 |
| JP | 2002-268696 | 9/2002 |
| JP | 2003-249957 | 9/2003 |
| JP | 2003-533916 | 11/2003 |
| JP | 2004-501391 | 1/2004 |
| JP | 2004-102074 | 4/2004 |
| JP | 2004-138756 | 5/2004 |
| JP | 2005-534950 | 11/2005 |

OTHER PUBLICATIONS

English language Abstract of JP 2002-268696, Sep. 20, 2002.

English language Abstract of JP 2003-249957, Sep. 5, 2003.

STA CR Phane Ragot France Telecom France:, "AAP35-LC-G. 729. 1-new TD0260-plen rev2", ITU-T Drafts ; Study Period 2005-2008, International Telecommunication Union, Geneva ; CH, vol. Study Group 16, XP017543883, Jun. 28, 2006, pp. 1-95.

* cited by examiner

SPEECH DECODING AND ENCODING APPARATUS FOR LOST FRAME CONCEALMENT USING PREDETERMINED NUMBER OF WAVEFORM SAMPLES PERIPHERAL TO THE LOST FRAME

TECHNICAL FIELD

The present invention relates to a speech decoding apparatus and speech encoding apparatus, and chiefly relates to a lost frame concealment method in these apparatuses.

BACKGROUND ART

A speech codec for VoIP (Voice over IP) use is required to have high packet loss tolerance. It is desirable for a next-generation VoIP codec to achieve error-free quality even at a comparatively high frame loss rate (for example, 6%).

In the case of CELP speech codecs, there are many cases in which quality degradation due to frame loss in a speech onset portion is a problem. The reason for this may be that signal variation is great and correlativity with the signal of the preceding frame is low in the onset portion, and therefore concealment processing using preceding frame information does not function effectively. Alternatively, the reason may be that in a frame of a subsequent voiced portion, an excitation signal encoded in the onset portion is actively used as an adaptive codebook, and therefore the effects of loss of an onset portion are transmitted to a subsequent voiced frame, tending to cause major distortion of a decoded speech signal.

In response to the above kind of problem, a technology has been developed whereby encoded information for concealment processing when a preceding or succeeding frame is lost is transmitted together with current frame encoded information (see Patent Document 1, for example). With this technology, it is determined whether or not a preceding frame false signal (or succeeding frame false signal) can be created by synthesizing a preceding frame (or succeeding frame) concealment signal by repetition of a current frame speech signal or extrapolation of a characteristic amount of that code, and comparing this with the preceding frame signal (or succeeding frame signal), and if it is determined that creation is not possible, a preceding subcode (or succeeding subcode) is generated by a preceding sub-encoder (or succeeding sub-encoder) based on a preceding frame signal (or succeeding frame signal), and it is possible to generate a high-quality decoded signal even if a preceding frame (succeeding frame) is lost by adding a preceding subcode (succeeding subcode) to the main code of the current frame encoded by a main encoder.

Patent Document 1: Japanese Patent Application Laid-Open No. 2003-249957

DISCLOSURE OF INVENTION

Problems to be Solved by the Invention

However, with the above technology, a configuration is used whereby preceding frame (past frame) encoding is performed by a sub-encoder based on current frame encoded information, and therefore a codec method is necessary that enables high-quality decoding of a current frame signal even if preceding frame (past frame) encoded information is lost. Therefore, it is difficult to apply this to a case in which a predictive type of encoding method that uses past encoded information (or decoded information) is used as a main layer. In particular, when a CELP speech codec utilizing an adaptive codebook is used as a main layer, if a preceding frame is lost, decoding of the current frame cannot be performed correctly, and it is difficult to generate a high-quality decoded signal even if the above technology is applied.

It is an object of the present invention to provide a speech decoding apparatus and speech encoding apparatus in which a lost frame concealment method is applied that enables current frame concealment to be performed even if a preceding frame is lost when a speech codec utilizing past excitation information such as an adaptive codebook is used as a main layer.

Means for Solving the Problems

A speech decoding apparatus of the present invention employs a configuration having: a receiving section that receives frame loss information identifying a first frame that is a lost frame; a first decoding section that decodes an encoded parameter transmitted in a second frame different from the first frame, to acquire a pitch pulse information and an excitation signal of the first frame; a learning section that learns a pitch pulse learning waveform in a steady-state frame backward in time from the first frame; and a compensation section that compensates the excitation signal of the first frame using the pitch pulse learning waveform and the pitch pulse information.

Advantageous Effect of the Invention

According to the present invention, when a current frame is lost, the current frame can be decoded using only concealment processing information, enabling an information amount of relevant concealment processing information transmitted in a past or future frame to be reduced, and enabling speech encoding efficiency to be improved.

BEST MODE FOR CARRYING OUT THE INVENTION

Embodiments of the present invention will now be described in detail with reference to the accompanying drawings.

Embodiment 1

Figure 1:
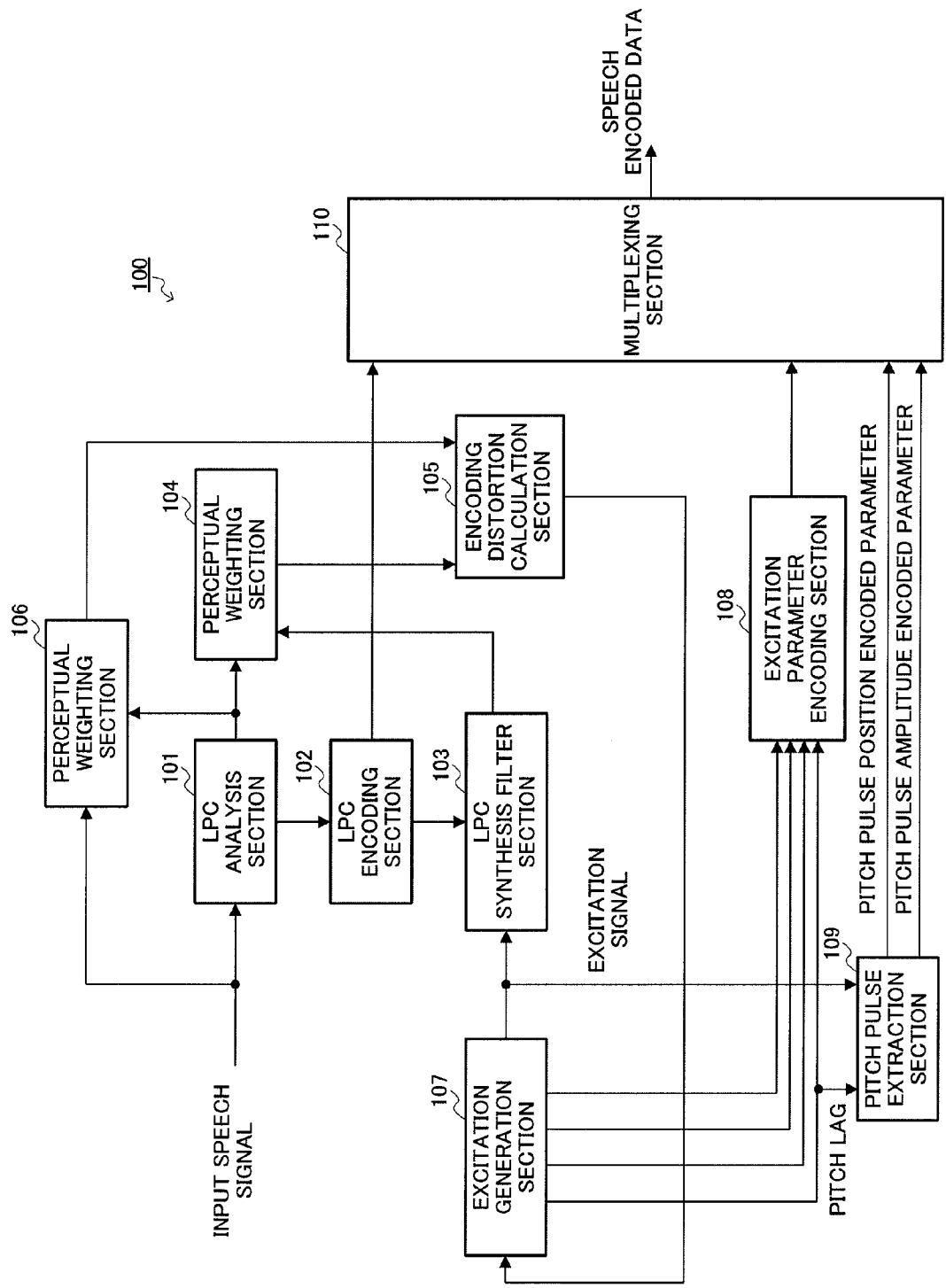
FIG. 1 is a block diagram showing the main configuration of a speech encoding apparatus according to Embodiment 1.

FIG. 1 is a block diagram showing the main configuration of speech encoding apparatus 100 according to Embodiment 1 of the present invention. Here, a CELP speech encoding apparatus is shown as speech encoding apparatus 100 by way of example.

Speech encoding apparatus 100 is equipped with LPC analysis section 101, LPC encoding section 102, LPC synthesis filter section 103, perceptual weighting section 104, encoding distortion calculation section 105, perceptual weighting section 106, excitation generation section 107, excitation parameter encoding section 108, pitch pulse extraction section 109, and multiplexing section 110.

The sections of speech encoding apparatus 100 perform the following operations. Encoding processing in speech encoding apparatus 100 is performed in frame units.

LPC analysis section 101 performs linear predictive analysis (LPC analysis) on an input speech signal, and outputs an obtained LPC coefficient to LPC encoding section 102, perceptual weighting section 104, and perceptual weighting section 106.

Perceptual weighting section 106 forms a perceptual weighting filter by means of a filter coefficient in which LPC output from LPC analysis section 101 is multiplied by a weighting factor, executes perceptual weighting on the input speech signal, and outputs the resulting signal to encoding distortion calculation section 105.

LPC encoding section 102 quantizes and encodes the LPC coefficient input from LPC analysis section 101, outputs an obtained LPC quantized parameter to LPC synthesis filter section 103, and outputs an obtained LPC encoded parameter to multiplexing section 110.

LPC synthesis filter section 103 takes an LPC quantized parameter input from LPC encoding section 102 as a filter coefficient, performs driving as an LPC synthesis filter by means of an excitation signal input from excitation generation section 107, and outputs a synthesized signal to perceptual weighting section 104.

Using a perceptual weighting filter that takes an LPC coefficient input from LPC analysis section 101 as a filter coefficient, perceptual weighting section 104 executes perceptual weighting on the synthesized signal input from LPC synthesis filter section 103, and outputs the resulting signal to encoding distortion calculation section 105.

Encoding distortion calculation section 105 calculates the difference between the input speech signal on which perceptual weighting has been executed output from perceptual weighting section 106 and the synthesized signal on which perceptual weighting has been executed input from perceptual weighting section 104, and outputs the calculated difference to excitation generation section 107 as encoding distortion.

Excitation generation section 107 outputs an excitation signal for which encoding distortion output from encoding distortion calculation section 105 is minimal to LPC synthesis filter section 103. Also, excitation generation section 107 outputs an excitation signal and pitch lag when encoding distortion is minimal to pitch pulse extraction section 109, and outputs excitation parameters such as an excitation codebook index, excitation codebook gain, pitch lag, and pitch gain when encoding distortion is minimal to excitation parameter encoding section 108.

Excitation parameter encoding section 108 encodes excitation parameters comprising an excitation codebook index, excitation codebook gain, pitch lag, pitch gain, and so forth, input from excitation generation section 107, and outputs the obtained excitation encoded parameters to multiplexing section 110.

Based on pitch lag input from excitation generation section 107, pitch pulse extraction section 109 detects a pitch pulse of the excitation signal input from excitation generation section 107, encodes pitch pulse position and amplitude information, and outputs an obtained pitch pulse position encoded parameter and pitch pulse amplitude encoded parameter to multiplexing section 110.

When the frame number of a speech signal input from speech encoding apparatus 100 is denoted as n+1 (where n is an integer greater than 0), multiplexing section 110 multiplexes an LPC encoded parameter of frame n+1 input from LPC encoding section 102, an excitation encoded parameter of frame n+1 input from excitation parameter encoding section 108, and a pitch pulse position encoded parameter and pitch pulse amplitude encoded parameter of frame n input from pitch pulse extraction section 109, and outputs the obtained multiplexed data as frame n+1 speech encoded data.

Figure 2:
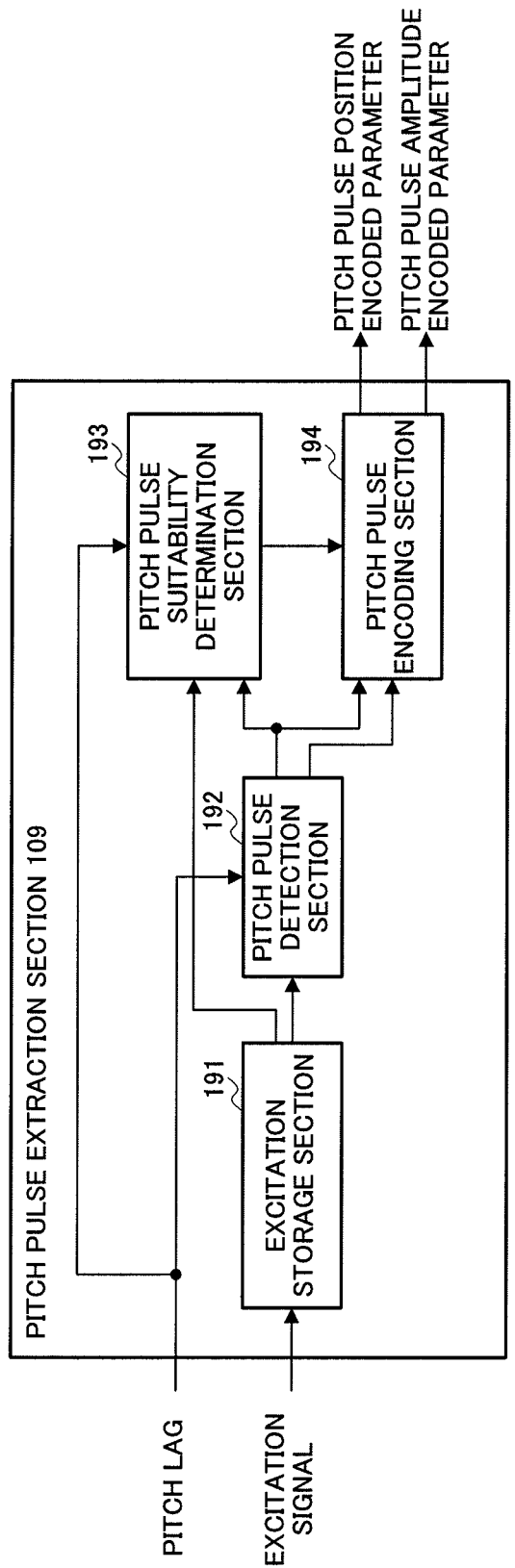
FIG. 2 is a block diagram showing the main internal configuration of a pitch pulse extraction section according to Embodiment 1.

FIG. 2 is a block diagram showing the main internal configuration of pitch pulse extraction section 109.

Pitch pulse extraction section 109 is equipped with excitation storage section 191, pitch pulse detection section 192, pitch pulse suitability determination section 193, and pitch pulse encoding section 194.

Excitation storage section 191 incorporates a buffer that stores an excitation signal input from excitation generation section 107, outputs an excitation signal of the current frame to pitch pulse suitability determination section 193, and outputs an excitation signal of a past frame to pitch pulse detection section 192.

Pitch pulse detection section 192 detects a frame n pitch pulse using a frame n+1 pitch lag input from excitation generation section 107 and an excitation signal input from excitation storage section 191. Details of the pitch pulse detection method used in pitch pulse detection section 192 will be given later herein. Pitch pulse detection section 192 outputs pitch pulse position PPp to pitch pulse suitability determination section 193, and outputs detected pitch pulse position PPp and amplitude PPa to pitch pulse encoding section 194.

Using the excitation signal input from excitation storage section 191, pitch pulse position PPp input from pitch pulse detection section 192 and pitch lag input from excitation generation section 107, pitch pulse suitability determination section 193 determines whether or not the pitch pulse of frame n detected by pitch pulse detection section 192 is suitable. Details of the determination method used in pitch pulse suitability determination section 193 will be given later herein.

If the pitch pulse suitability determination result input from pitch pulse suitability determination section 193 is "suitable," pitch pulse encoding section 194 encodes pitch pulse position PPp and amplitude PPa input from pitch pulse detection section 192 using a scalar quantization method or the like, and outputs an obtained pitch pulse position encoded parameter and pitch pulse amplitude encoded parameter to multiplexing section 110.

Figure 3:
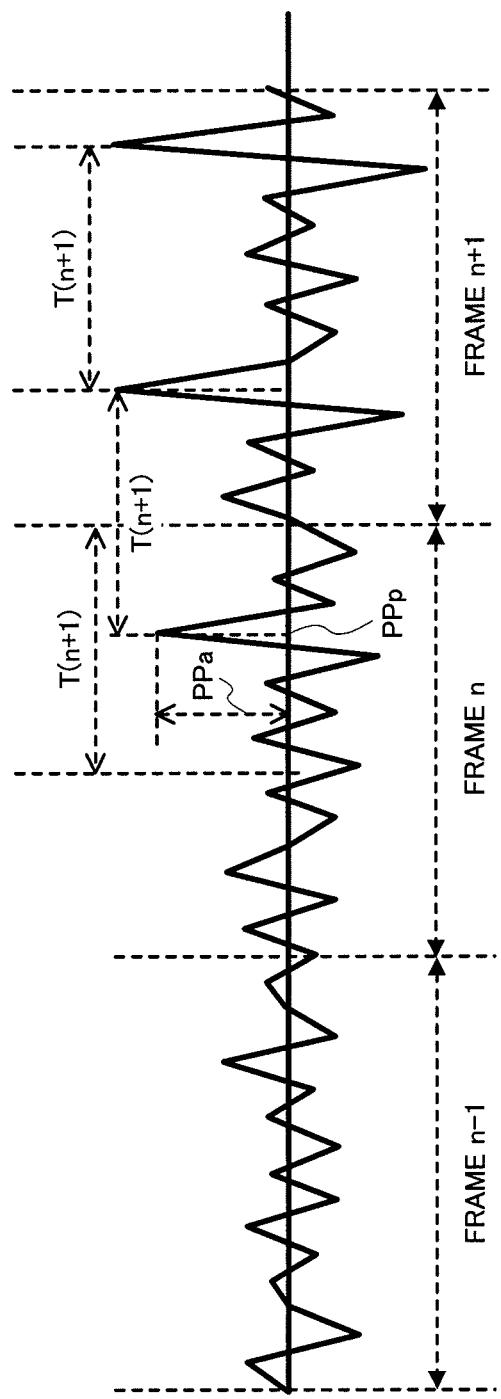
FIG. 3 is a drawing for explaining the pitch pulse detection method of a pitch pulse detection section according to Embodiment 1.

FIG. 3 is a drawing for explaining the pitch pulse detection method used in pitch pulse detection section 192. In FIG. 3, the horizontal axis indicates the time axis and the vertical axis indicates excitation signal amplitude. Here, an excitation signal of each frame is represented by the sum of a signal repeated with pitch lag as a period and a noise signal for representing a signal that cannot be represented with a periodic waveform. Pitch pulse detection section 192 detects the pitch pulse in frame n using pitch lag T(n+1) of frame n+1. Specifically, a section with pitch lag T(n+1) as its length is taken as the pitch pulse search range backward in time from the end of frame n—that is, backward in time from the position of contact with frame n+1. Pitch pulse detection section 192 detects a pitch pulse whose amplitude is maximal within the pitch pulse search range.

Next, pitch pulse suitability determination section 193 extracts a section of a length shorter than the frame length before and after pitch pulse position PPp from the excitation signal as a pitch pulse waveform, extends the extracted pitch pulse waveform by pitch lag T(n+1) of frame n+1, and calculates a correlation value with respect to the frame n+1 excitation signal. The correlation value between the extended pitch pulse waveform and the frame n+1 excitation signal is normalized using the power of the pitch pulse search range in frame n. If the calculated correlation value is greater than or equal to a predetermined threshold value, pitch pulse suitability determination section 193 determines that the pitch pulse detected by pitch pulse detection section 192 is repeated with pitch lag T(n+1) in frame n+1. That is to say, if frame n is lost, the pitch pulse detected by pitch pulse detection section 192 is determined to be suitable for use in frame n lost frame concealment processing in speech decoding apparatus 200 described later herein. On the other hand, if the calculated correlation value is less than the predetermined threshold value, pitch pulse suitability determination section 193 determines that the pitch pulse detected by pitch pulse detection section 192 is not suitable. Pitch pulse suitability determination section 193 outputs the pitch pulse suitability determination result to pitch pulse encoding section 194.

Figure 4:
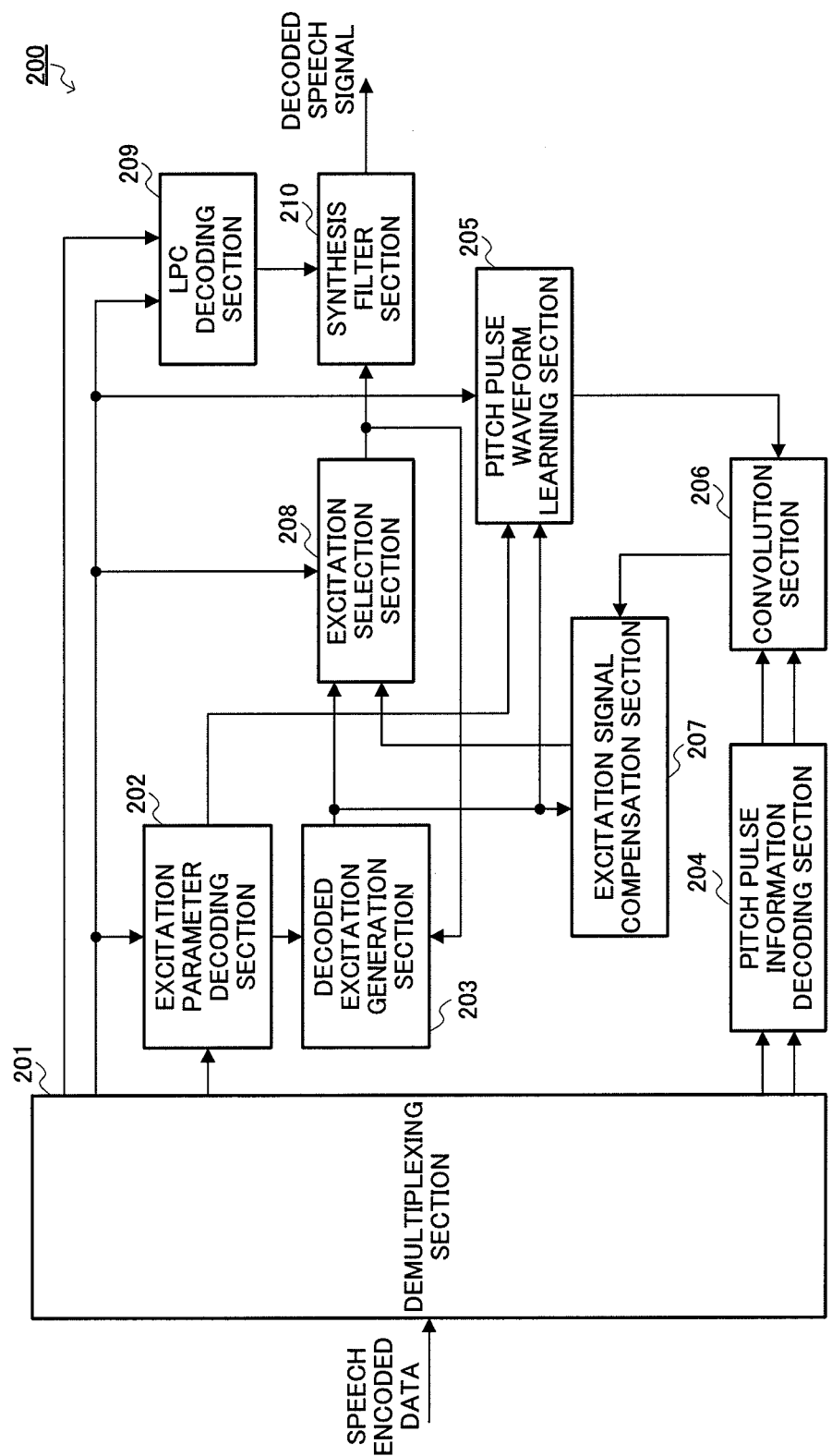
FIG. 4 is a block diagram showing the main configuration of a speech decoding apparatus according to Embodiment 1.

FIG. 4 is a block diagram showing the main configuration of speech decoding apparatus 200 according to Embodiment 1 of the present invention.

Speech decoding apparatus 200 is equipped with demultiplexing section 201, excitation parameter decoding section 202, decoded excitation generation section 203, pitch pulse information decoding section 204, pitch pulse waveform learning section 205, convolution section 206, excitation signal compensation section 207, excitation selection section 208, LPC decoding section 209, and synthesis filter section 210.

Processing in speech decoding apparatus 200 is performed in frame units in the same way as speech encoding apparatus 100 processing, and frames subject to pitch pulse information decoding section 204, convolution section 206, and excitation signal compensation section 207 processing are lost frames.

Demultiplexing section 201 receives speech encoded data transmitted from speech encoding apparatus 100, and demultiplexes an excitation encoded parameter, LPC encoded parameter, pitch pulse position encoded parameter, and pitch pulse amplitude encoded parameter. Demultiplexing section 201 outputs an obtained excitation encoded parameter to excitation parameter decoding section 202, outputs a pitch pulse position encoded parameter and pitch pulse amplitude encoded parameter to pitch pulse information decoding section 204, and outputs an LPC encoded parameter to LPC decoding section 209. Demultiplexing section 201 also receives frame loss information, and outputs this to excitation parameter decoding section 202, pitch pulse waveform learning section 205, excitation selection section 208, and LPC decoding section 209.

Excitation parameter decoding section 202 decodes excitation encoded parameters input from demultiplexing section 201 to acquire excitation parameters such as an excitation codebook index, excitation codebook gain, pitch lag, and pitch gain. Excitation parameter decoding section 202 outputs the obtained pitch lag, pitch gain, excitation codebook index, and excitation codebook gain to decoded excitation generation section 203, and outputs pitch lag to pitch pulse waveform learning section 205.

Decoded excitation generation section 203 performs CELP decoding, concealment, and smoothing processing using the excitation codebook index and excitation codebook gain input from excitation parameter decoding section 202 and an excitation signal, pitch lag, and pitch gain of a past frame fed back from excitation selection section 208, to generate a decoded excitation signal, and outputs this to pitch pulse waveform learning section 205, excitation signal compensation section 207, and excitation selection section 208.

Pitch pulse information decoding section 204 decodes a pitch pulse position encoded parameter and pitch pulse amplitude encoded parameter input from demultiplexing section 201, and outputs obtained pitch pulse position PPp and pitch pulse amplitude PPa to convolution section 206.

Pitch pulse waveform learning section 205 generates a pitch pulse learning waveform using frame loss information input from demultiplexing section 201, pitch lag input from excitation parameter decoding section 202, and a decoded excitation signal input from decoded excitation generation section 203, and outputs this to convolution section 206. Here, the pitch pulse learning waveform is generated through learning of a waveform peripheral to the pitch pulse. Learning is performed after the maximum amplitude is normalized. The configuration and operation of pitch pulse waveform learning section 205 will be described in detail later herein.

Convolution section 206 has pitch pulse position PPp and pitch pulse amplitude PPa as input from pitch pulse information decoding section 204, and has a pitch pulse learning waveform as input from pitch pulse waveform learning section 205. Convolution section 206 convolutes the pitch pulse learning waveform on the time domain so that pitch pulse position PPp and the position of the maximum amplitude of the pitch pulse learning waveform coincide, multiplies the convoluted pitch pulse learning waveform by pitch pulse amplitude PPa, and outputs the obtained pitch pulse waveform to excitation signal compensation section 207.

Excitation signal compensation section 207 adds the pitch pulse waveform input from convolution section 206 to the decoded excitation signal input from decoded excitation generation section 203, and outputs the obtained compensated excitation signal to excitation selection section 208. Excitation signal compensation section 207 may also replace a section corresponding to a pitch pulse waveform in the excitation signal with a pitch pulse waveform.

If frame loss information input from demultiplexing section 201 indicates a frame loss, excitation selection section 208 selects the compensated excitation signal input from excitation signal compensation section 207, and if frame loss information does not indicate a frame loss, excitation selection section 208 selects the decoded excitation signal input from decoded excitation generation section 203. Excitation selection section 208 outputs the selected excitation signal to synthesis filter section 210.

LPC decoding section 209 decodes an LPC encoded parameter input from demultiplexing section 201, and outputs an obtained LPC coefficient to synthesis filter section 210.

Using the excitation signal input from excitation selection section 208 and the LPC coefficient input from LPC decoding section 209, synthesis filter section 210 synthesizes and outputs a decoded speech signal.

FIG. 5 is a drawing for explaining lost frame concealment processing by speech decoding apparatus 200. Here, a case will be described by way of example in which frame m of speech encoded data input to speech decoding apparatus 200 is lost. Frame m in speech decoding apparatus 200 corresponds to frame n in speech encoding apparatus 100.

Figure 5A:
FIG. 5 is a drawing for explaining lost frame concealment processing by a speech decoding apparatus according to Embodiment 1.
Figures 5B, 5C:
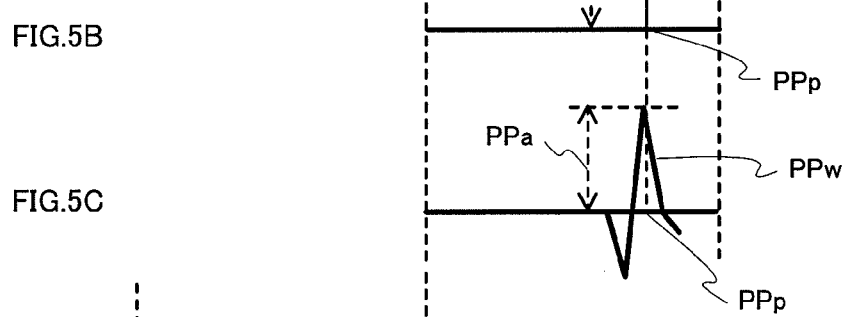
Figure 5D:
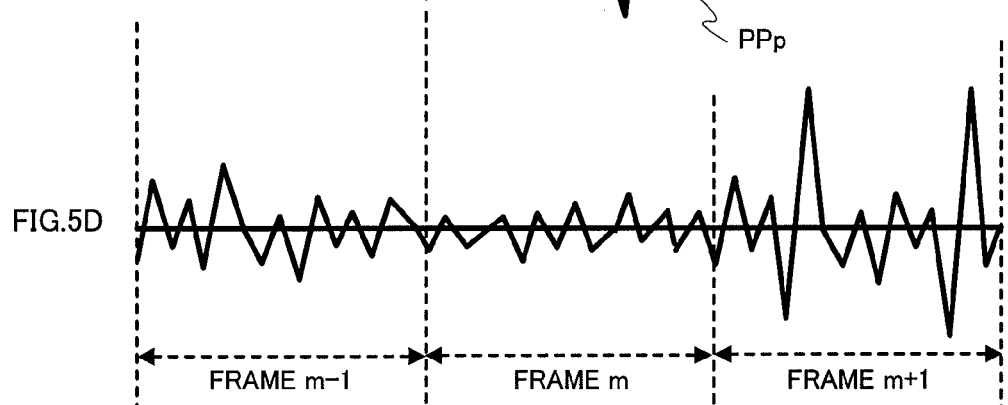
Figure 5E:
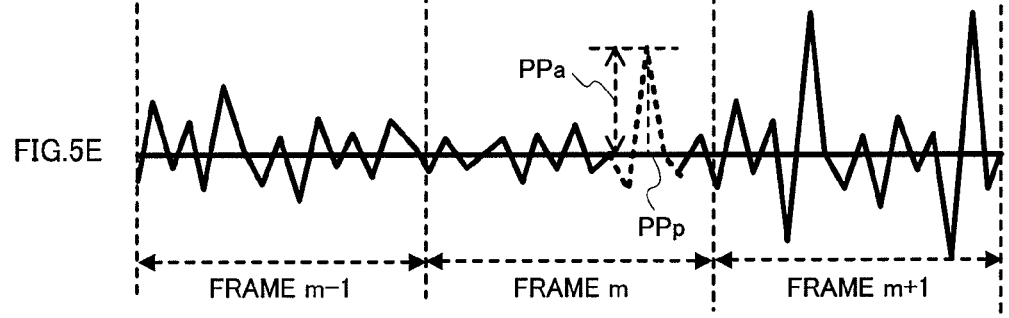

FIG. 5A is a drawing showing pitch pulse learning waveform lw input to convolution section 206 from pitch pulse waveform learning section 205. In FIG. 5A, pitch pulse learning waveform lw has its amplitude normalized to 1.0. FIG. 5B is a drawing showing pitch pulse position PPp and pitch pulse amplitude PPa of frame m input to convolution section 206 from pitch pulse information decoding section 204. Here, the pitch pulse position encoded parameter and pitch pulse amplitude encoded parameter used for decoding of frame m pitch pulse position PPp and pitch pulse amplitude PPa are transmitted from speech encoding apparatus 100 in frame m+1. In FIG. 5B, PP indicates a pitch pulse determined by pitch pulse position PPp and pitch pulse amplitude PPa. FIG. 5C shows pitch pulse waveform PPw generated by convolution section 206. Pitch pulse waveform PPw is obtained by convoluting pitch pulse learning waveform lw on the time domain so that pitch pulse position PPp and the position of the maximum amplitude of the pitch pulse learning waveform coincide, and multiplying the convoluted pitch pulse learning waveform by pitch pulse amplitude PPa. FIG. 5D is a drawing showing an excitation signal input to excitation signal compensation section 207. If there is no loss at pitch pulse position PPp of frame m, there should be a pitch peak waveform, but a pitch peak cannot be represented in this way with a concealment method in an ordinary CELP speech decoding apparatus. FIG. 5E is a drawing showing an excitation signal output to synthesis filter section 210 from excitation selection section 208. In FIG. 5E, the frame m−1 and frame m+1 excitation signals are input from decoded excitation generation section 203 to excitation selection section 208 and selected, and the frame m excitation signal is input from excitation signal compensation section 207 to excitation selection section 208 and selected. In the frame m excitation signal shown in FIG. 5E, the waveform indicated by a dashed line is a pitch pulse waveform generated by convolution section 206, and is represented by compensating a pitch peak that should exist if not lost.

The main internal configuration and operation of pitch pulse waveform learning section 205 will now be described with reference to FIG. 6 and FIG. 7.

Figure 6:
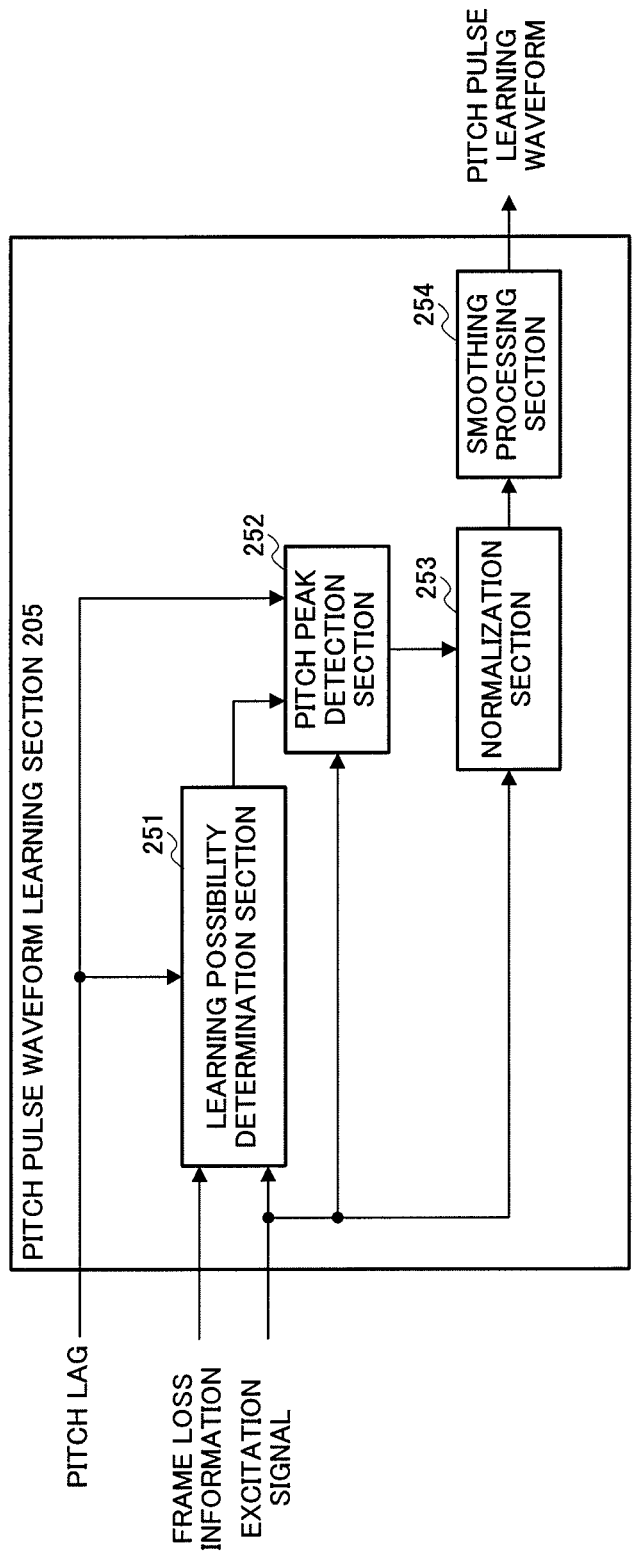
FIG. 6 is a block diagram showing the main internal configuration of a pitch pulse waveform learning section according to Embodiment 1.

FIG. 6 is a block diagram showing the main internal configuration of pitch pulse waveform learning section 205. In FIG. 6, pitch pulse waveform learning section 205 is equipped with learning possibility determination section 251, pitch peak detection section 252, normalization section 253, and smoothing processing section 254.

Figure 7:
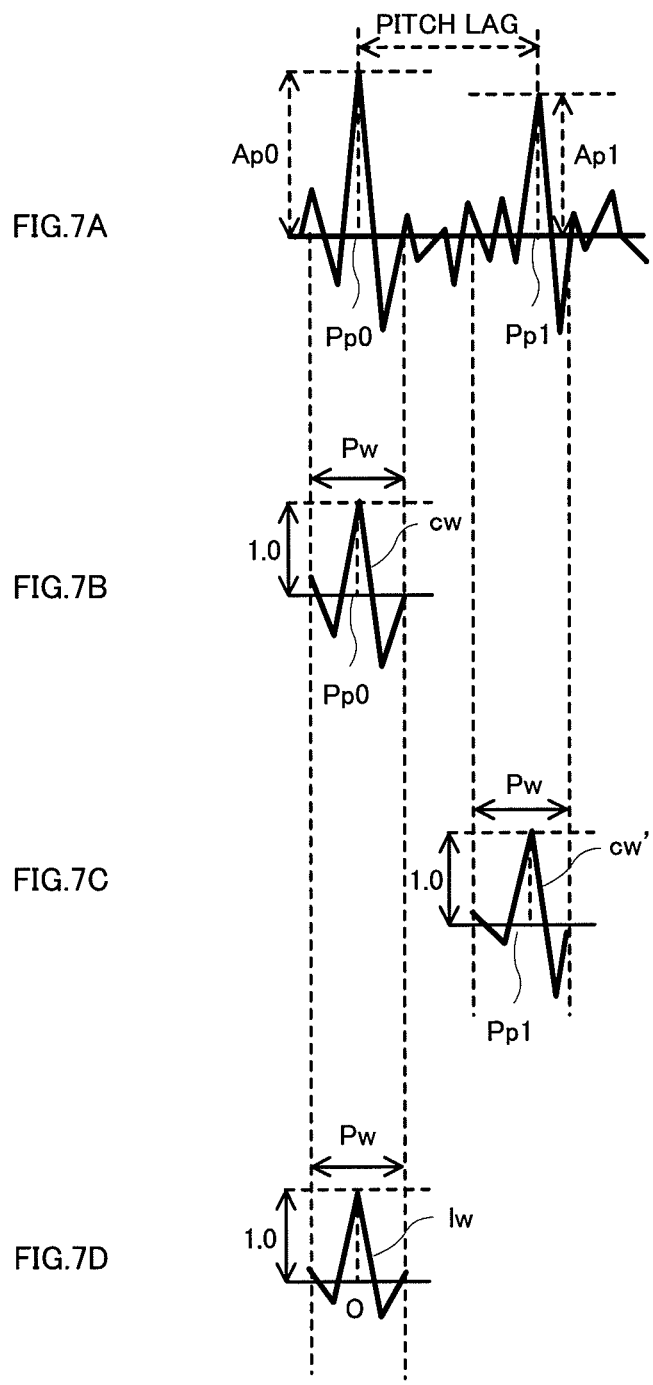
FIG. 7 is a drawing for explaining the operation of a pitch pulse waveform learning section according to Embodiment 1.

FIG. 7 is a drawing for explaining the operation of pitch pulse waveform learning section 205. In FIG. 7, FIG. 7A is a drawing for explaining the operation of pitch peak detection section 252, FIG. 7B and FIG. 7C are a drawings for explaining the operation of normalization section 253, and FIG. 7D is a drawing for explaining the operation of smoothing processing section 254.

Learning possibility determination section 251 performs determination of whether or not it is possible to perform pitch pulse waveform learning, based on a decoded excitation signal input from decoded excitation generation section 203, pitch lag input from excitation parameter decoding section 202, and frame loss information input from demultiplexing section 201, and outputs the obtained learning possibility determination result to pitch peak detection section 252. Learning possibility determination section 251 determines that it is possible to perform waveform learning in a section in which a pitch period is stable, as in a speech steady state. For example, learning possibility determination section 251 deems a case in which a pitch pulse comprising an excitation sample of greater amplitude than another excitation sample exists in a steady-state frame that is not a lost frame, and that pitch pulse is repeated with pitch lag as a period, to be a waveform learning possibility determination condition.

If the learning determination result input from learning possibility determination section 251 is "possible," pitch peak detection section 252 detects a pitch peak position using the decoded excitation signal input from decoded excitation generation section 203 and pitch lag input from excitation parameter decoding section 202, and outputs the detected peak position to normalization section 253. As shown in FIG. 7A, pitch peak detection section 252 detects position Pp0 with maximum amplitude in a frame for which learning is to be performed as a first pitch peak position. Then pitch peak detection section 252 performs detection of whether or not a second pitch peak Pp1 exists in the same frame at a position separated from first pitch peak Pp0 by the pitch lag, and if pitch peak Pp1 exists, outputs first pitch peak Pp0 to normalization section 253 as a detected pitch peak position. In FIG. 7A, Ap0 and Ap1 indicate the amplitudes at first pitch peak position Pp0 and second pitch peak position Pp1 respectively. In this example, Ap0>Ap1.

Normalization section 253 has the decoded excitation signal from decoded excitation generation section 203 and pitch peak position Pp0 from pitch peak detection section 252 as input, and from the input decoded excitation signal, extracts predetermined sample number Pw waveforms peripheral to first pitch peak Pp0 (where Pw=5 to 10 samples, for example) as pitch pulse waveforms. Normalization section 253 performs normalization on the extracted pitch pulse waveforms so that the maximum amplitude is 1.0, and outputs obtained normalized pitch pulse waveform cw to smoothing processing section 254. FIG. 7B is a drawing showing normalized pitch pulse waveform cw found by normalization section 253. FIG. 7C shows normalized pitch pulse waveform cw' found if the position of pitch peak Pp1 should be input to normalization section 253 from pitch peak detection section 252.

Smoothing processing section 254 performs long-period smoothing processing with past pitch pulse learning waveform lw' in accordance with equation 1 below on normalized pitch pulse waveform cw input from normalization section 253, and outputs obtained pitch pulse learning waveform lw to convolution section 206.

$$lw(i) = \alpha * lw'(i) + (i-\alpha) * cw(i) \quad \text{(Equation 1)}$$

In equation 1, $\alpha$ indicates a long-period smoothing coefficient (where $0<\alpha<1.0$). Here, a case in which the pitch pulse position is in the middle of normalized pitch pulse waveform cw has been taken as an example, and the range of sample number i is $-Pw/2 \leq i \leq Pw/2$. FIG. 7D is a drawing showing pitch pulse learning waveform lw found by long-period smoothing processing by smoothing processing section 254. When there are two detected pitch pulses as in this example, after pitch pulse learning waveform lw is found using normalized pitch pulse waveform cw, additional pitch pulse learning waveform lw2 may be found in the same way using normalized pitch pulse waveform cw', and pitch pulse learning waveform lw and pitch pulse learning waveform lw2 may be used for frame loss concealment.

A pitch pulse learning waveform obtained in pitch pulse waveform learning section 205 as described above is used in subsequent lost frame concealment processing. For example, a pitch pulse learning waveform learned using a past excitation signal further back in time than frame m is used in frame m lost frame concealment processing.

Thus, according to this embodiment, a speech encoding apparatus detects a pitch pulse, and encodes pitch pulse position and amplitude information as information for lost frame concealment processing use, and a speech decoding apparatus performs lost frame concealment processing using lost frame pitch pulse position and amplitude information, thereby enabling decoded signal speech quality to be improved while reducing the amount of information for lost frame concealment processing use.

In this embodiment, a case has been described by way of example in which a frame n pitch pulse position encoded parameter and pitch pulse amplitude encoded parameter, and a frame n+1 LPC encoded parameter and excitation parameter, are multiplexed in multiplexing section 110 of speech encoding apparatus 100 and transmitted to speech decoding apparatus 200, but a frame n pitch pulse position encoded parameter and pitch pulse amplitude encoded parameter, and a frame n−1 pitch pulse position encoded parameter and pitch pulse amplitude encoded parameter, may also be multiplexed in multiplexing section 110 of speech encoding apparatus 100 and transmitted to speech decoding apparatus 200.

In this embodiment, a case has been described by way of example in which normalization section 253 normalizes a pitch pulse waveform so that the maximum amplitude is 1.0, but a pitch pulse waveform may also be normalized so that power is 1.0.

In this embodiment, a case has been described by way of example in which information relating to one pitch pulse is transmitted, but a plurality of pitch pulses may also be detected, and related information may be transmitted and used in lost frame concealment processing.

In this embodiment, a case has been described by way of example in which lost frame concealment is performed in speech decoding apparatus 200 by convoluting a pitch pulse learning waveform in a lost frame, but lost frame concealment may also be performed by convoluting the pitch pulse shown in FIG. 5B in a lost frame. Furthermore, a configuration may be used whereby switching is performed among lost frame concealment processing that convolutes a pitch pulse, lost frame concealment processing that convolutes a pitch pulse learning waveform, and lost frame concealment processing that does not convolute either a pitch pulse or a pitch pulse learning waveform, according to a condition. For example, if there are many speech generation sources (speakers) and the excitation signal changes frequently, lost frame concealment processing that convolutes a pitch pulse is performed. On the other hand, if lost frame concealment processing that convolutes a pitch pulse is performed when errors occur frequently, the amplitude of only a convoluted pitch pulse position increases and a beeping noise occurs, and therefore, in this case, lost frame concealment processing that does not convolute either a pitch pulse or a pitch pulse learning waveform should be performed.

In this embodiment, a case has been described by way of example in which lost frame concealment is performed in speech decoding apparatus 200 using a pitch pulse learning waveform obtained by learning, but a pitch pulse waveform may also be encoded and transmitted by speech encoding apparatus 100. In this case, a pitch pulse learning waveform need not be learned in speech decoding apparatus 200.

In this embodiment, a case has been described by way of example in which speech decoding apparatus 200 compensates an excitation signal by convoluting a pitch pulse waveform at only one pitch pulse position PPp location transmitted from speech encoding apparatus 100, but an excitation signal may also be compensated by performing multiple pitch pulse waveform convolutions at positions at predetermined intervals in the past frame direction. In this case, if excitation signal power tends to decrease, a compensated pitch lag close to the pitch lag of a past frame should be used as the predetermined interval, and if excitation signal power tends to increase, a compensated pitch lag close to the pitch lag of the next frame should be used.

In this embodiment, a case has been described by way of example in which speech encoding apparatus 100 encodes and transmits pitch pulse amplitude, but power may be encoded and transmitted instead of amplitude, and used in lost frame concealment processing in speech decoding apparatus 200.

In this embodiment, a case has been described by way of example in which pitch pulse waveform length Pw is assumed to have a range of 5 to 10 samples, but pitch pulse waveform length Pw is not limited to this range.

In this embodiment, a case has been described by way of example in which performing compensation by means of a pitch pulse waveform is limited to a lost frame only, but compensation by means of a pitch pulse waveform may also be performed in a frame received normally after a lost frame.

Embodiment 2

Generally, if the power of a decoded excitation signal obtained by performing lost frame concealment processing in a speech decoding apparatus differs greatly from the power of an input speech signal subject to encoding by a speech encoding apparatus, subjective degradation occurs in the decoded speech signal. Therefore, it is necessary for decoded speech signal power to be adjusted in a speech decoding apparatus so as to match the power of a speech encoding apparatus input speech signal. In Embodiment 2 of the present invention, a match between speech encoding apparatus input speech signal amplitude and decoded speech signal amplitude is maintained while adjusting decoded speech signal power.

Figure 8:
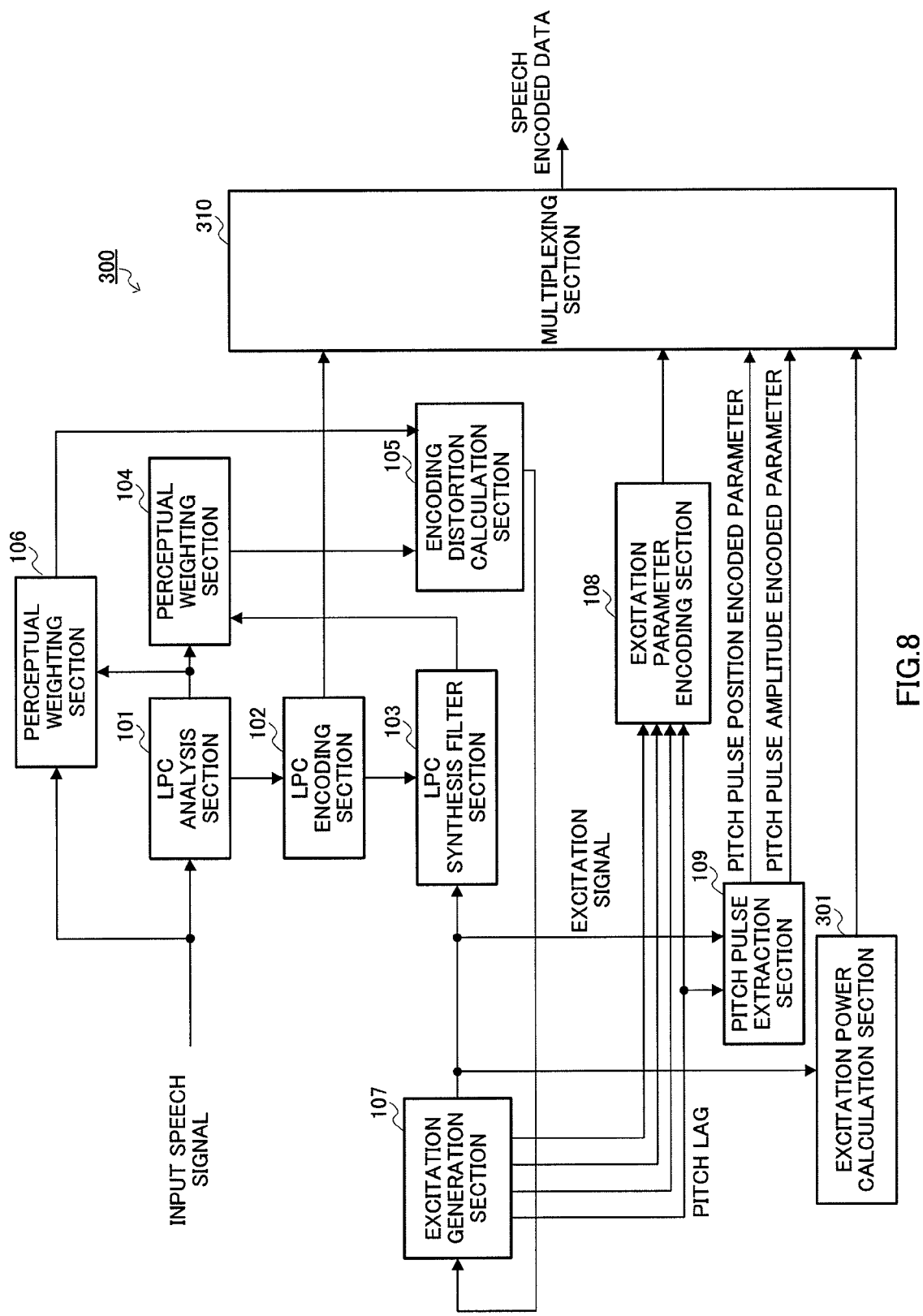
FIG. 8 is a block diagram showing the main configuration of a speech encoding apparatus according to Embodiment 2.

FIG. 8 is a block diagram showing the main configuration of speech encoding apparatus 300 according to Embodiment 2 of the present invention. Speech encoding apparatus 300 has the same kind of basic configuration as speech encoding apparatus 100 according to Embodiment 1 (see FIG. 1), and therefore identical configuration elements are assigned the same reference codes, and descriptions thereof are omitted.

Speech encoding apparatus 300 differs from speech encoding apparatus 100 in additionally having excitation power calculation section 301. Also, processing differs in part between multiplexing section 310 of speech encoding apparatus 300 and multiplexing section 110 of speech encoding apparatus 100, and therefore different reference codes are assigned to indicate this.

Excitation power calculation section 301 calculates excitation power of the current frame input from excitation generation section 107, performs encoding such as scalar quantization, and outputs an obtained excitation power encoded parameter to multiplexing section 310.

As compared with multiplexing section 110 of speech encoding apparatus 100, multiplexing section 310 also multiplexes an excitation power encoded parameter of frame n input from excitation power calculation section 301 in addition to an LPC encoded parameter of frame n+1 input from LPC encoding section 102, an excitation encoded parameter of frame n+1 input from excitation parameter encoding section 108, and a pitch pulse position encoded parameter and pitch pulse amplitude encoded parameter of frame n input from pitch pulse extraction section 109, and outputs the obtained multiplexed data as frame n+1 speech encoded data.

Figure 9:
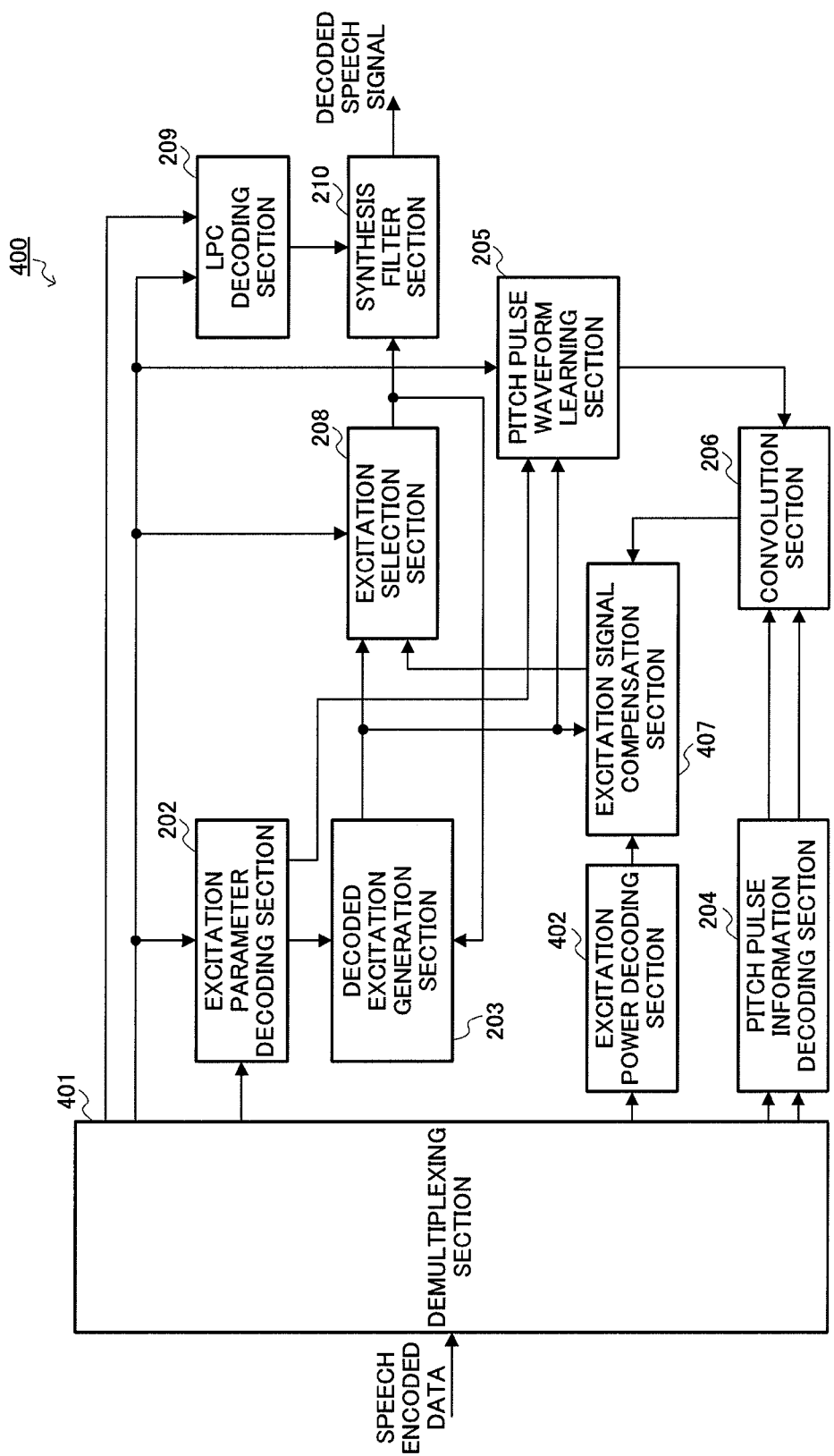
FIG. 9 is a block diagram showing the main configuration of a speech decoding apparatus according to Embodiment 2.

FIG. 9 is a block diagram showing the main configuration of speech decoding apparatus 400 according to Embodiment 2 of the present invention. Speech decoding apparatus 400 has the same kind of basic configuration as speech decoding apparatus 200 according to Embodiment 1 (see FIG. 4), and therefore identical configuration elements are assigned the same reference codes, and descriptions thereof are omitted.

Speech decoding apparatus 400 differs from speech decoding apparatus 200 in additionally having excitation power decoding section 402. Also, processing differs in part between demultiplexing section 401 and excitation signal compensation section 407 of speech decoding apparatus 400, and demultiplexing section 201 and excitation signal compensation section 207 of speech decoding apparatus 200, and therefore different reference codes are assigned to indicate this.

As compared with demultiplexing section 201 of speech decoding apparatus 200, demultiplexing section 401 also demultiplexes an excitation power encoded parameter in addition to an excitation encoded parameter, pitch pulse encoded parameter, and LPC encoded parameter, and outputs this excitation power encoded parameter to excitation power decoding section 402.

Excitation power decoding section 402 decodes an excitation power encoded parameter input from demultiplexing section 401, and outputs obtained decoded excitation power to excitation signal compensation section 407.

As compared with excitation signal compensation section 207 of speech decoding apparatus 200, excitation signal compensation section 407, in addition to processing that performs addition or replacement of a pitch pulse waveform input from convolution section 206 on a decoded excitation signal input from decoded excitation generation section 203 to obtain a compensated excitation signal, also performs power adjustment on the obtained compensated excitation signal.

Figure 10:
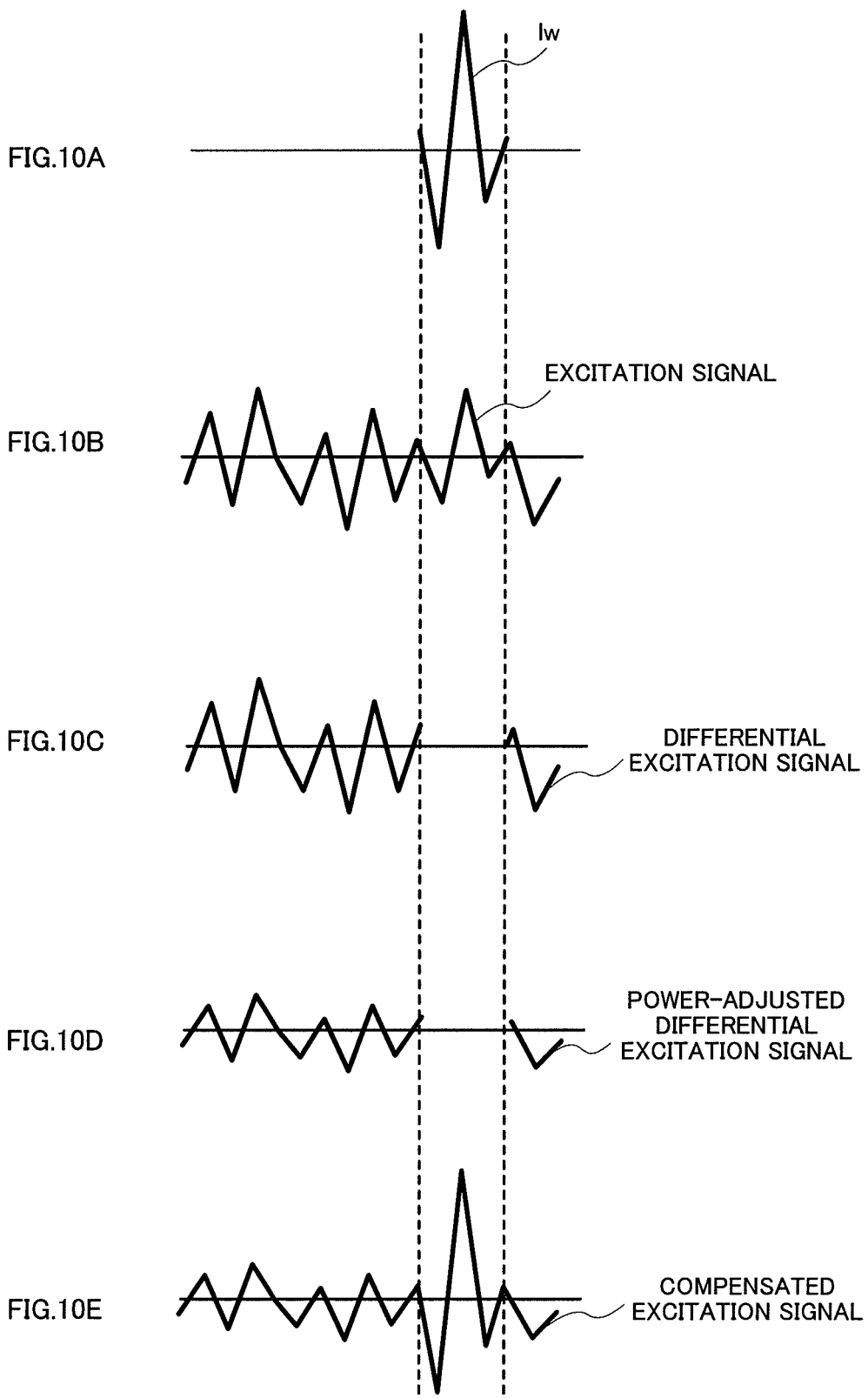
FIG. 10 is a drawing for explaining the operation of an excitation signal compensation section according to Embodiment 2.

FIG. 10 is a drawing for explaining the operation of excitation signal compensation section 407. FIG. 10A is a drawing showing pitch pulse waveform lw input to excitation signal compensation section 407 from convolution section 206, and FIG. 10B is a drawing showing a decoded excitation signal input to excitation signal compensation section 407 from decoded excitation generation section 203. FIG. 10C is a drawing showing a differential excitation signal obtained by eliminating a section corresponding to pitch pulse waveform lw shown in FIG. 10A from the excitation signal shown in FIG. 10B. FIG. 10D shows a power-adjusted differential excitation signal obtained by performing power adjustment by multiplying the differential excitation signal shown in FIG. 10C by a differential excitation amplification coefficient. FIG. 10E is a drawing showing a compensated excitation signal obtained by adding the pitch pulse waveform shown in FIG. 10A to the power-adjusted differential excitation signal shown in FIG. 10D. The excitation power of the compensated excitation signal shown in FIG. 10E matches the decoded excitation power input to excitation signal compensation section 407 from excitation power decoding section 402.

Figure 11:
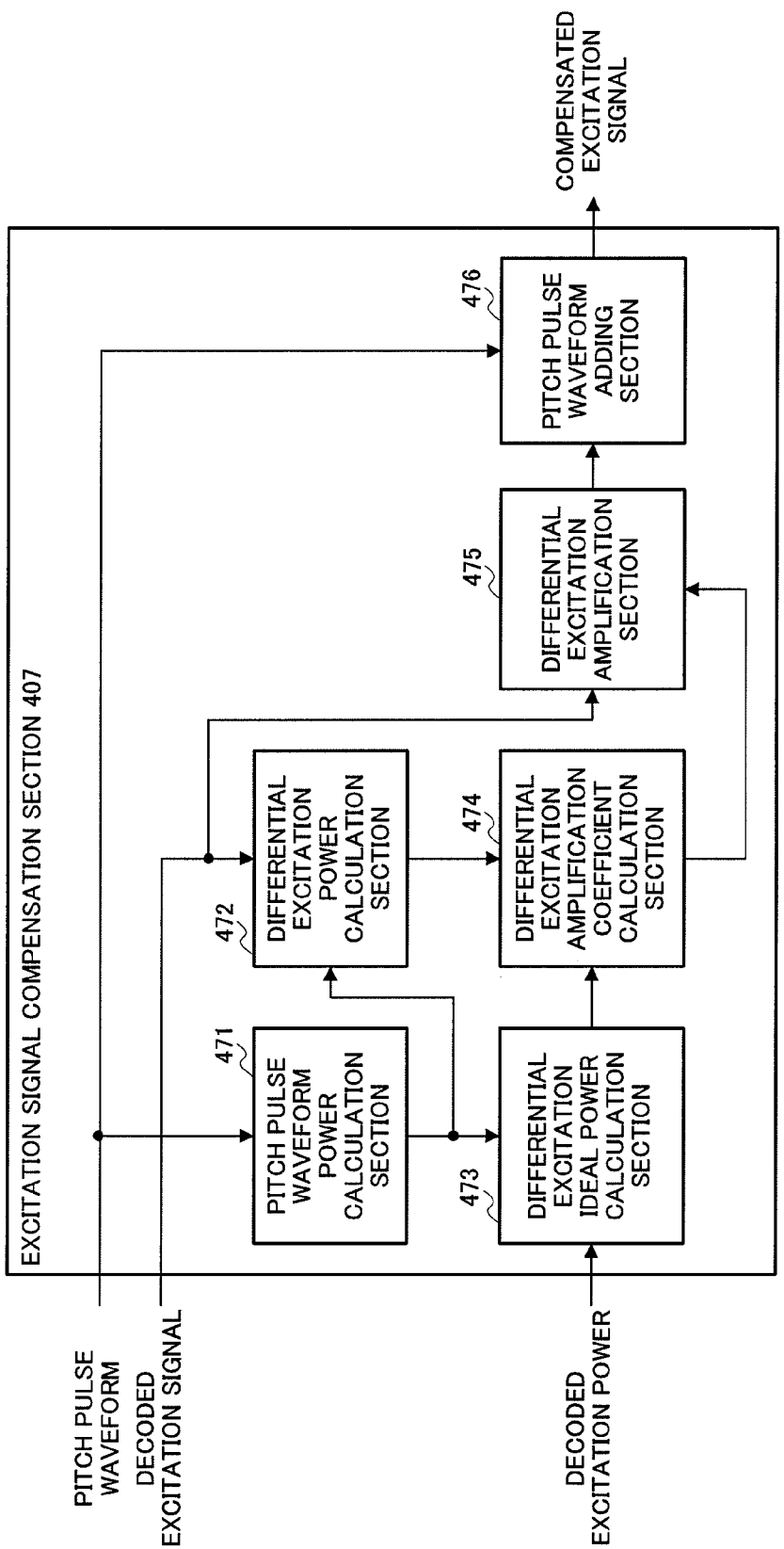
FIG. 11 is a block diagram showing the main internal configuration of an excitation signal compensation section according to Embodiment 2.

FIG. 11 is a block diagram showing the main internal configuration of excitation signal compensation section 407 that performs the operation shown in FIG. 10.

Excitation signal compensation section 407 is equipped with pitch pulse waveform power calculation section 471, differential excitation power calculation section 472, differential excitation ideal power calculation section 473, differential excitation amplification coefficient calculation section 474, differential excitation amplification section 475, and pitch pulse waveform adding section 476.

Pitch pulse waveform power calculation section 471 calculates the excitation power of a pitch pulse waveform input from convolution section 206, and outputs obtained pitch pulse waveform power Ppow to differential excitation power calculation section 472 and differential excitation ideal power calculation section 473.

Differential excitation power calculation section 472 calculates the power of a decoded excitation signal input from decoded excitation generation section 203, and also calculates the difference from pitch pulse waveform power Ppow input from pitch pulse waveform power calculation section 471, and outputs this to differential excitation amplification coefficient calculation section 474 as differential excitation power Rpow. If calculated differential excitation power Rpow is a negative number, differential excitation power calculation section 472 outputs a value of zero to differential excitation amplification coefficient calculation section 474.

Differential excitation ideal power calculation section 473 calculates the difference between decoded excitation power Hpow input from excitation power decoding section 402 and pitch pulse waveform power Ppow input from pitch pulse waveform power calculation section 471 as differential excitation ideal power IRpow, and outputs this to differential excitation amplification coefficient calculation section 474. If calculated differential excitation ideal power IRpow is a negative number, differential excitation ideal power calculation section 473 outputs a value of zero to differential excitation amplification coefficient calculation section 474.

Using differential excitation ideal power IRpow input from differential excitation ideal power calculation section 473 and differential excitation power Rpow input from differential excitation power calculation section 472, differential excitation amplification coefficient calculation section 474 calculates differential excitation amplification coefficient Rr in accordance with equation 2 below, and outputs this to differential excitation amplification section 475.

$$Rr = \sqrt{IRpow/Rpow} \quad \text{(Equation 2)}$$

If differential excitation ideal power IRpow input from differential excitation ideal power calculation section 473 or differential excitation power Rpow input from differential excitation power calculation section 472 is zero, differential excitation amplification coefficient calculation section 474 outputs a value of 1 to differential excitation amplification section 475 as differential excitation amplification coefficient Rr.

Differential excitation amplification section 475 performs power adjustment by multiplying a differential excitation signal obtained by eliminating a section corresponding to a pitch pulse waveform from the excitation signal input from decoded excitation generation section 203 by differential excitation amplification coefficient Rr input from differential excitation amplification coefficient calculation section 474, and outputs an obtained power-adjusted differential excitation signal to pitch pulse waveform adding section 476.

Pitch pulse waveform adding section 476 adds the pitch pulse waveform input from convolution section 206 to the power-adjusted differential excitation signal input from differential excitation amplification section 475, and outputs an obtained compensated excitation signal to excitation selection section 208.

Thus, according to this embodiment, the excitation power of a compensated excitation signal is made to match decoded excitation power while maintaining pitch pulse amplitude, enabling subjective degradation of a decoded speech signal to be suppressed and decoded speech signal quality to be improved.

Embodiment 3

Figure 12:
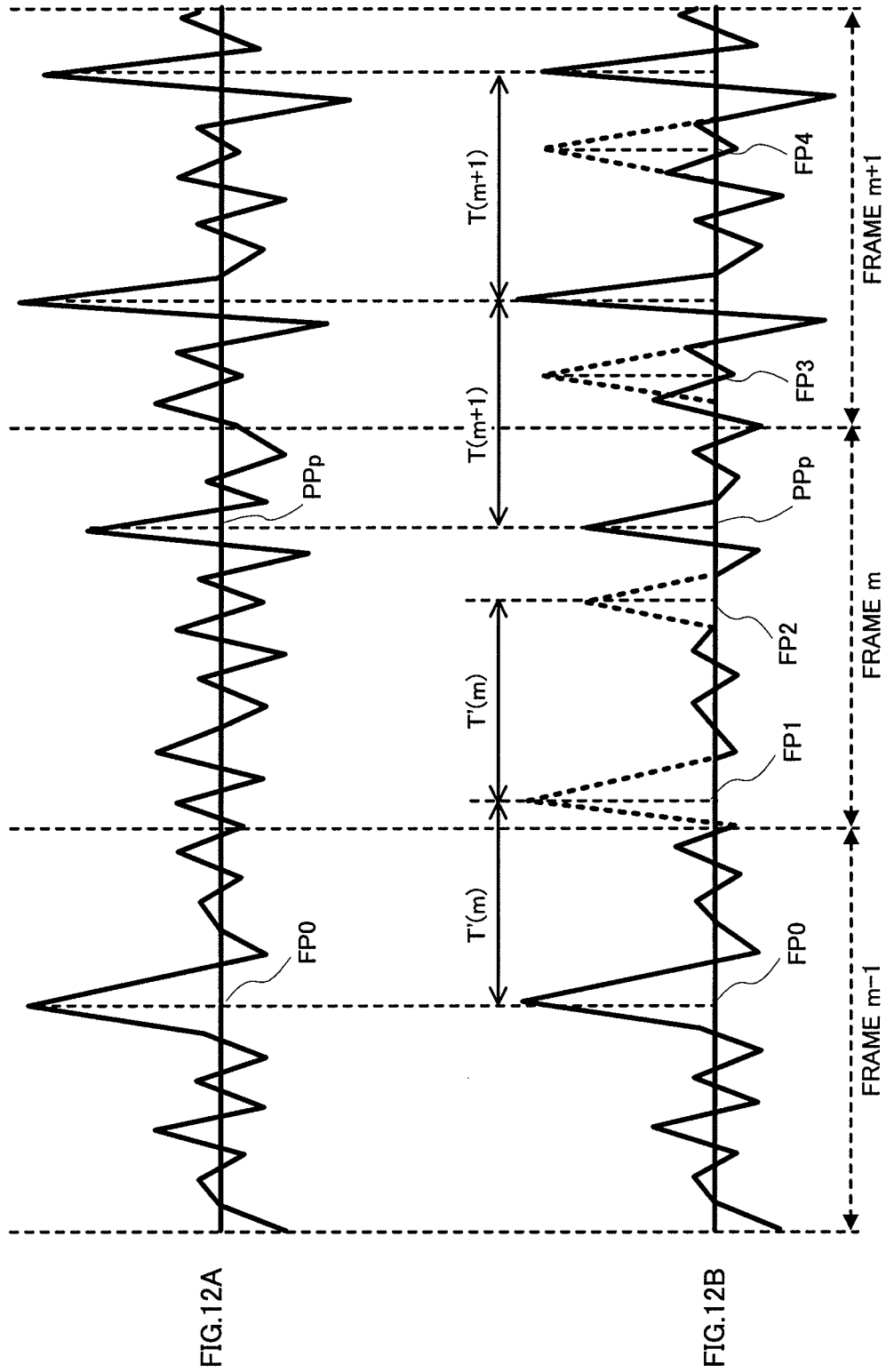
FIG. 12 is a drawing showing a decoded excitation signal obtained if an aperiodic peak waveform happens to be present in an excitation signal to be encoded, and lost frame concealment processing is performed by means of CELP encoding.

First, a decoded excitation signal obtained if an aperiodic peak waveform happens to be present in an excitation signal to be encoded and lost frame concealment processing is performed by means of CELP encoding is shown in FIG. 12.

FIG. 12A is a drawing showing the waveform of an excitation signal subject to encoding by a CELP speech encoding apparatus. As shown in FIG. 12A, the excitation signal of frame m−1 does not have periodicity, and an aperiodic peak waveform—such as a plosive consonant or sudden noise, for example—is present at position FP0. FIG. 12B shows the waveform of a decoded excitation signal obtained by a CELP speech decoding apparatus performing decoding and lost frame concealment processing on the excitation signal shown in FIG. 12A when frame m is lost. FIG. 12B illustrates a case in which frame m is lost. As shown in FIG. 12B, new pitch periodicity that was not present in the excitation signal waveform shown in FIG. 12A appears in the frame m decoded excitation signal waveform obtained by lost frame concealment processing by the CELP speech decoding apparatus. That is to say, pitch pulse waveforms appear at four positions—FP1, FP2, FP3, and FP4—at concealment pitch lag T'(m) intervals. Here, this kind of pitch waveform is referred to as a pseudo-pitch-pulse. Repeated pseudo-pitch-pulses cause major degradation in a decoded signal. In FIG. 12, PPp indicates the position of a pitch pulse waveform convoluted in an obtained frame m decoded excitation signal if Embodiment 1 of the present invention should be applied. This pitch pulse waveform is repeated at pitch lag T(m+1) intervals.

Speech decoding apparatus 500 according to Embodiment 3 of the present invention employs a configuration that enables a pseudo-pitch-pulse, which is a cause of decoded excitation signal quality degradation, to be detected and eliminated.

Figure 13:
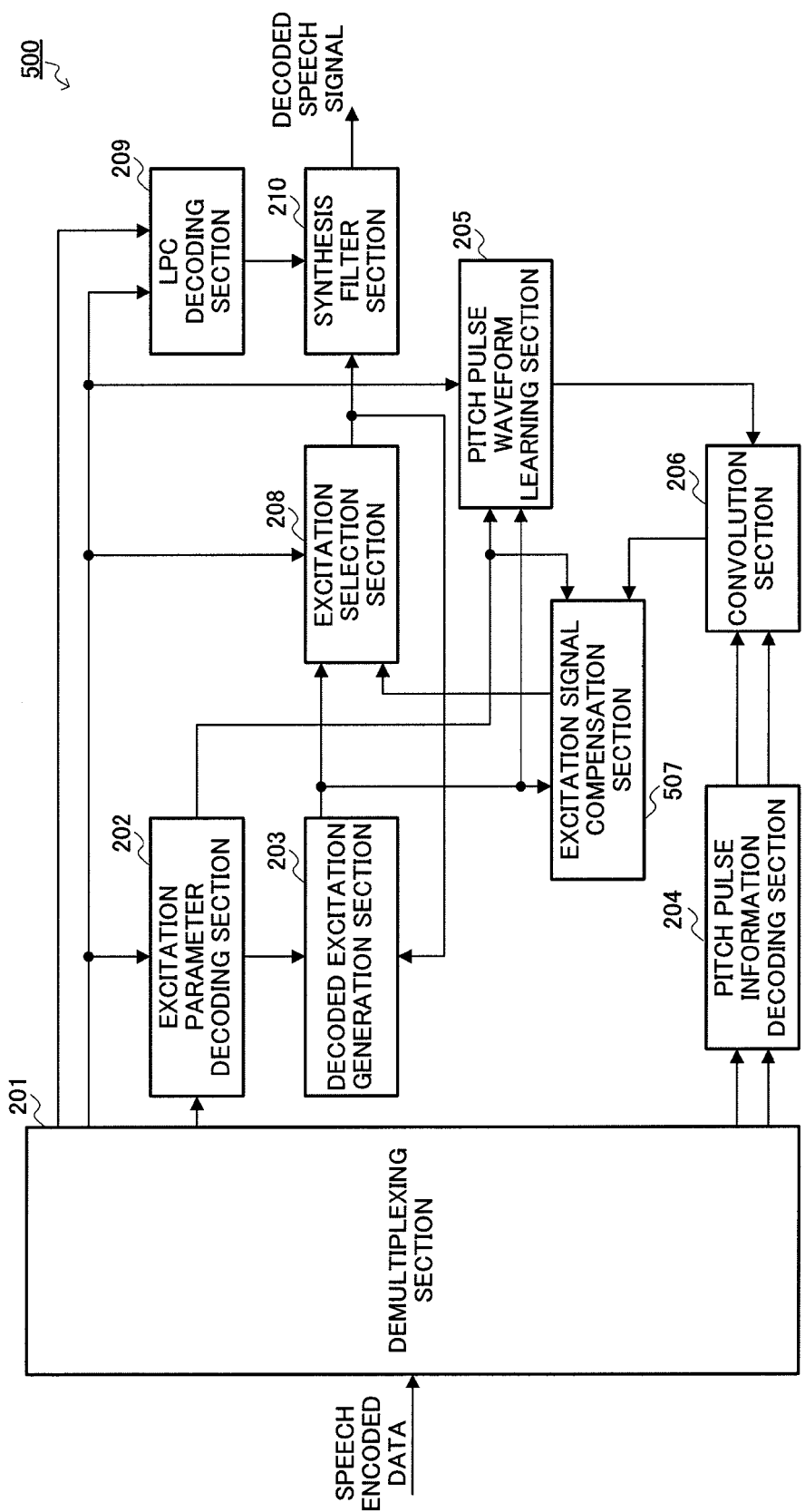
FIG. 13 is a block diagram showing the main configuration of a speech decoding apparatus according to Embodiment 3.

FIG. 13 is a block diagram showing the main configuration of speech decoding apparatus 500 according to Embodiment 3 of the present invention.

Speech decoding apparatus 500 has the same kind of basic configuration as speech decoding apparatus 200 according to Embodiment 1 (see FIG. 4), and therefore identical configuration elements are assigned the same reference codes, and descriptions thereof are omitted.

Processing differs in part between excitation signal compensation section 507 of speech decoding apparatus 500 and excitation signal compensation section 207 of speech decoding apparatus 200, and therefore different reference codes are assigned to indicate this. Also, speech decoding apparatus 500 differs from speech decoding apparatus 200 in that pitch lag obtained by decoding of an excitation encoded parameter by excitation parameter decoding section 202 is additionally output to excitation signal compensation section 507.

Figure 14:
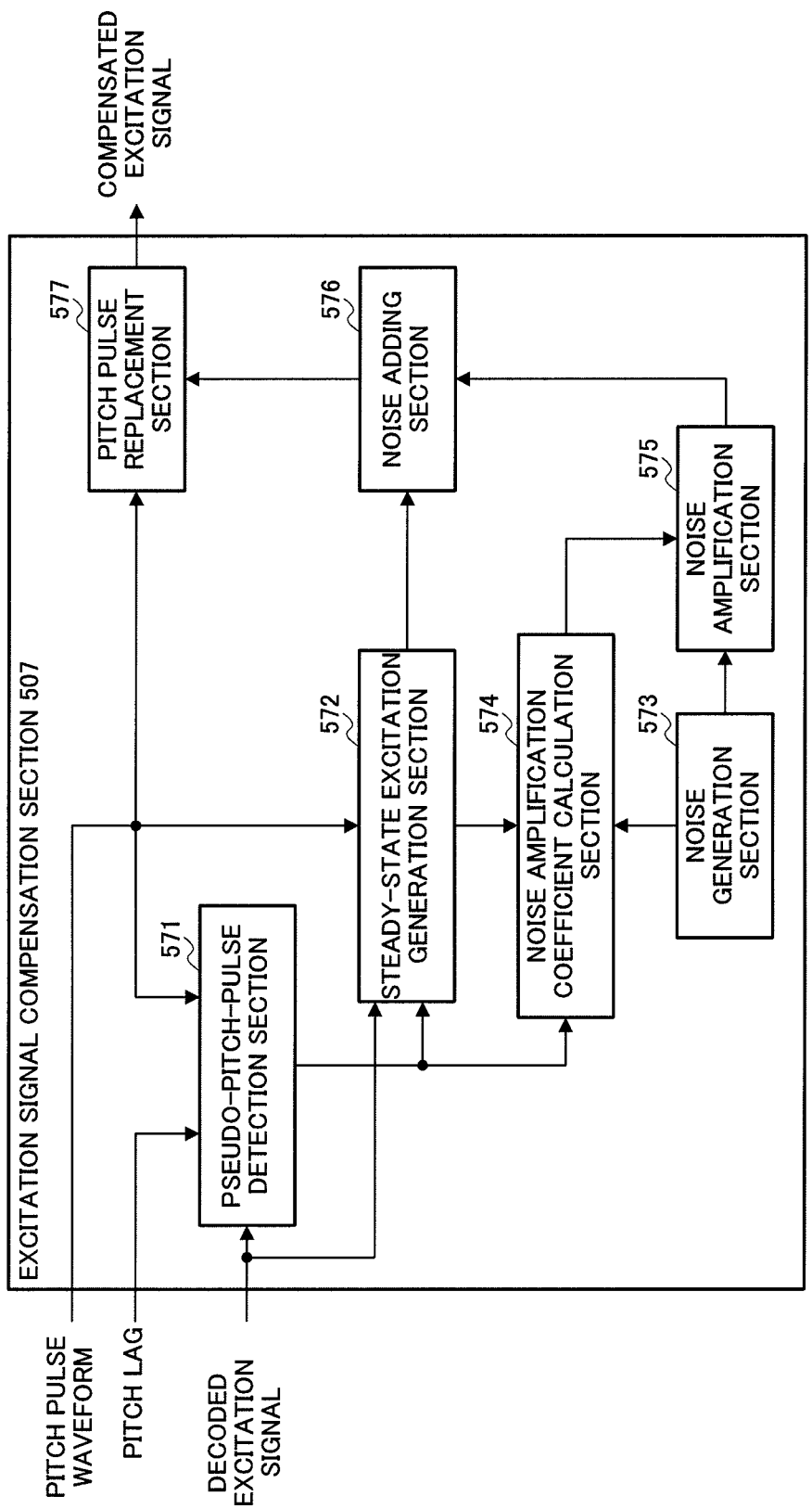
FIG. 14 is a block diagram showing the main internal configuration of an excitation signal compensation section according to Embodiment 3.

FIG. 14 is a block diagram showing the main internal configuration of excitation signal compensation section 507.

Excitation signal compensation section 507 is equipped with pseudo-pitch-pulse detection section 571, steady-state excitation generation section 572, noise generation section 573, noise amplification coefficient calculation section 574, noise amplification section 575, noise adding section 576, and pitch pulse replacement section 577.

The sections of excitation signal compensation section 507 perform the following operations. Below, the frame number of speech encoded data input to speech decoding apparatus 500 is denoted by m+1, and a decoded excitation signal output from speech decoding apparatus 500 is frame m.

Pseudo-pitch-pulse detection section 571 detects a pseudo-pitch-pulse using a decoded excitation signal input from decoded excitation generation section 203, pitch lag, and a pitch pulse waveform input from convolution section 206. As the actual pseudo-pitch-pulse detection method, first, a section with a length of pitch lag T(m+1) backward in time from the boundary between lost frame m and next frame m+1 is taken as the pseudo-pitch-pulse search range. However, a section in which a pitch pulse waveform is present is excluded from the pseudo-pitch-pulse search range. A maximum amplitude value is detected in the pseudo-pitch-pulse search range, and it is determined whether or not the detected maximum amplitude value is greater than or equal to a predetermined threshold value. A value of, for example, 3 times the average waveform amplitude of the pseudo-pitch-pulse search range, or ½ the maximum amplitude of a pitch pulse waveform input from convolution section 206, may be used as the threshold value. If pseudo-pitch-pulse detection section 571 determines that the maximum amplitude value detected in the pseudo-pitch-pulse search range is greater than or equal to the above threshold value, it takes the position of the detected maximum amplitude to be a pseudo-pitch-pulse position, and outputs this to steady-state excitation generation section 572 and noise amplification coefficient calculation section 574.

Steady-state excitation generation section 572 has a decoded excitation signal as input from decoded excitation generation section 203, a pitch pulse waveform as input from convolution section 206, and a pseudo-pitch-pulse position as input from pseudo-pitch-pulse detection section 571. Steady-state excitation generation section 572 takes a decoded excitation signal corresponding to a section of a number of samples before and after the pseudo-pitch-pulse position as a pseudo-pitch-pulse waveform, and obtains a steady-state excitation by replacing a decoded excitation signal of a section corresponding to the pitch pulse waveform and pseudo-pitch-pulse waveform with zero. Steady-state excitation generation section 572 outputs the obtained steady-state excitation to noise amplification coefficient calculation section 574 and noise adding section 576.

Using random noise, Gaussian noise, or a past steady-state excitation, noise generation section 573 generates noise with the pseudo-pitch-pulse waveform length as its length, and outputs this to noise amplification coefficient calculation section 574 and noise amplification section 575.

Noise amplification coefficient calculation section 574 calculates the excitation power of the steady-state excitation from steady-state excitation generation section 572, and normalizes this using a length (number of samples) resulting from subtracting the pitch pulse waveform length and pseudo-pitch-pulse waveform length from the frame length. Noise amplification coefficient calculation section 574 multiplies the normalized power by the pseudo-pitch-pulse length to calculate the pseudo-pitch-pulse target power. Noise amplification coefficient calculation section 574 also calculates the power of noise input from noise generation section 573, calculates the square root of the ratio between the pseudo-pitch-pulse target power and the noise power, and outputs this to noise amplification section 575 as a noise amplification coefficient.

Noise amplification section 575 amplifies noise input from noise generation section 573 using the noise amplification coefficient input from noise amplification coefficient calculation section 574, and outputs the amplified noise to noise adding section 576.

Noise adding section 576 obtains a decoded excitation signal from which a pseudo-pitch-pulse has been eliminated by adding together the steady-state excitation input from steady-state excitation generation section 572 and the amplitude-adjusted noise input from noise amplification section 575, and outputs this to pitch pulse replacement section 577.

Pitch pulse replacement section 577 adds together the decoded excitation signal from which a pseudo-pitch-pulse has been eliminated input from noise adding section 576 and the pitch pulse waveform input from convolution section 206, and outputs the obtained compensated excitation signal to excitation selection section 208.

Thus, according to this embodiment, a pseudo-pitch-pulse is detected and is replaced using power-adjusted noise, enabling decoded excitation signal quality degradation due to a pseudo-pitch-pulse to be avoided and the speech quality of a decoded speech signal to be improved.

In this embodiment, a case has been described by way of example in which decoded excitation generation section 203 performs CELP decoding and lost frame concealment processing using a concealment pitch period, but lost frame concealment may also be performed using random noise or steady-state noise directly, instead of performing excitation signal concealment using a concealment pitch period. By this means, repetition of a pseudo-pitch-pulse waveform at concealment pitch period is avoided, and it is no longer necessary to detect and eliminate a pseudo-pitch-pulse waveform.

Embodiment 4

In Embodiment 4 of the present invention, a decoded excitation signal is compensated using a pitch pulse sequence comprising a plurality of pitch pulse waveforms in order to conceal for the difference between the power of an excitation signal generated by a speech encoding apparatus and the power of a decoded excitation signal generated by a speech decoding apparatus.

Figure 15:
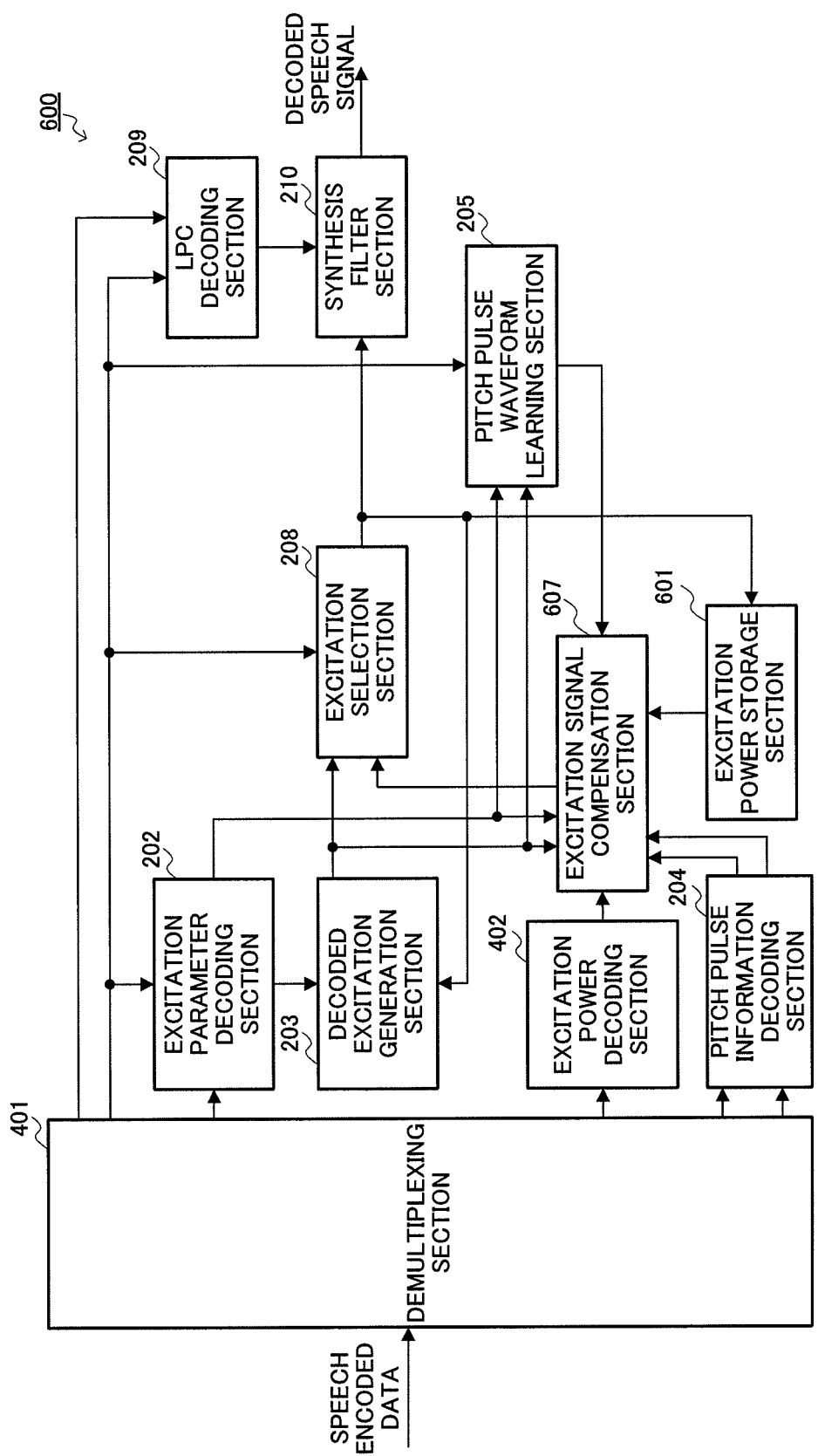
FIG. 15 is a block diagram showing the main configuration of a speech decoding apparatus according to Embodiment 4.

FIG. 15 is a block diagram showing the main configuration of speech decoding apparatus 600 according to this embodiment. Speech decoding apparatus 600 has the same kind of basic configuration as speech decoding apparatus 400 according to Embodiment 2 (see FIG. 9), and therefore identical configuration elements are assigned the same reference codes, and descriptions thereof are omitted.

Speech decoding apparatus 600 differs from speech decoding apparatus 400 in being equipped with excitation power storage section 601 instead of convolution section 206. Also, there are differences in internal configuration and operation between excitation signal compensation section 607 of speech decoding apparatus 600 and excitation signal compensation section 407 of speech decoding apparatus 400, and therefore different reference codes are assigned to these sections.

Excitation power storage section 601 calculates the power of an excitation signal input from excitation selection section 208 in accordance with equation 3 below and stores this power, and outputs the power of an excitation signal of a past frame (past frame excitation power) to excitation signal compensation section 607. Here, a case is described by way of example in which the excitation power of one frame earlier is output as past frame excitation power.

(Equation 3)

$$Epow(m-1) = \sum_{i=1}^{L\_FRAME} exc\_s(m-1)(i) * exc\_s(m-1)(i) \quad [2]$$

In this equation, i indicates the sample number, m−1 indicates the number of the frame immediately preceding the current frame, L_FRAME indicates the frame length, and exe_s(m−1) (i) indicates an excitation signal of frame m−1.

Excitation signal compensation section 607 generates a pitch pulse sequence using pitch lag input from excitation parameter decoding section 202, a decoded excitation signal input from decoded excitation generation section 203, a pitch pulse position and pitch pulse amplitude input from pitch pulse information decoding section 204, a pitch pulse learning waveform input from pitch pulse waveform learning section 205, decoded excitation power input from excitation power decoding section 402, and past frame excitation power input from excitation power storage section 601. Excitation signal compensation section 607 compensates the decoded excitation signal using the generated pitch pulse sequence, and outputs the obtained compensated excitation signal to excitation selection section 208.

Figure 16:
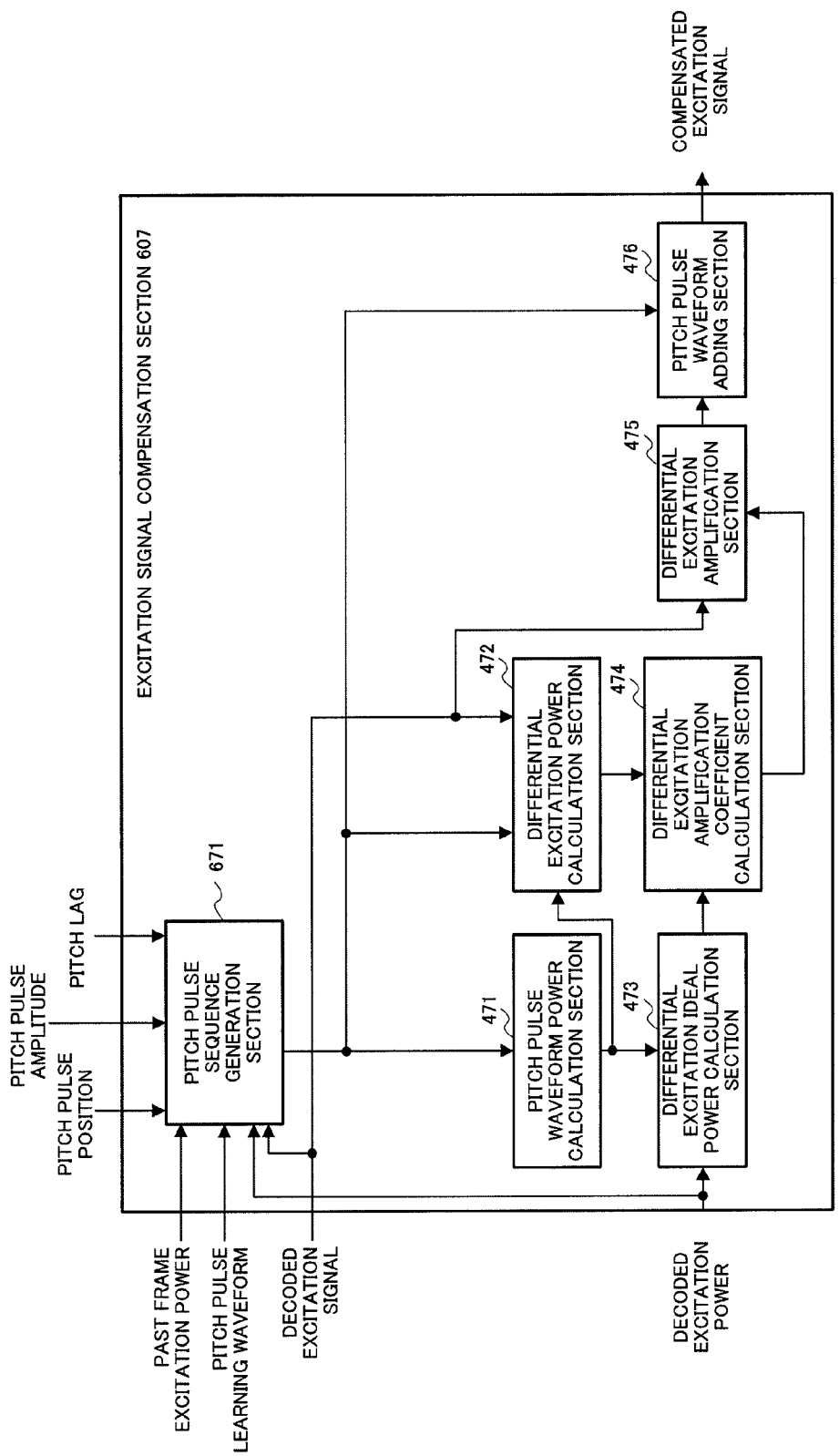
FIG. 16 is a block diagram showing the main internal configuration of an excitation signal compensation section according to Embodiment 4.

FIG. 16 is a block diagram showing the main internal configuration of excitation signal compensation section 607. Excitation signal compensation section 607 has the same kind of basic configuration as excitation signal compensation section 407 according to Embodiment 2 (see FIG. 11), and therefore identical configuration elements are assigned the same reference codes, and descriptions thereof are omitted.

Excitation signal compensation section 607 differs from excitation signal compensation section 407 according to Embodiment 2 in additionally being equipped with pitch pulse sequence generation section 671. Pitch pulse waveform power calculation section 471, differential excitation power calculation section 472, and pitch pulse waveform adding section 476 of excitation signal compensation section 607 differ from pitch pulse waveform power calculation section 471, differential excitation power calculation section 472, and pitch pulse waveform adding section 476 of excitation signal compensation section 407 only in using a pitch pulse sequence input from pitch pulse sequence generation section 671 instead of a pitch pulse waveform input from convolution section 206, and therefore they are assigned the same reference codes here and descriptions thereof are omitted.

Pitch pulse sequence generation section 671 generates a pitch pulse sequence using a pitch pulse position and pitch pulse amplitude input from pitch pulse information decoding section 204, a pitch pulse learning waveform input from pitch pulse waveform learning section 205, a decoded excitation signal input from decoded excitation generation section 203, decoded excitation power input from excitation power decoding section 402, past frame excitation power input from excitation power storage section 601, and pitch lag input from excitation parameter decoding section 202. Pitch pulse sequence generation section 671 generates a pitch pulse sequence by repeatedly placing pitch pulse learning waveforms at pitch lag intervals in the past direction (reverse direction) of the time domain, with pitch pulse position PPp as the starting point. The amplitudes of individual pitch pulse waveforms composing the pitch pulse sequence are attenuated proportionally the farther a pitch pulse waveform is positioned in the past direction of the time domain, taking the pitch pulse amplitude input from pitch pulse information decoding section 204 as a reference. Here, an amplitude attenuation coefficient is calculated by pitch pulse attenuation coefficient calculation section 678 described later herein using decoded excitation power and past frame excitation power. The number of pitch pulse waveforms composing a pitch pulse sequence is determined taking into account the result of comparing the power of a compensated excitation signal obtained by compensation of a pitch pulse sequence with the decoded excitation power. Pitch pulse sequence generation section 671 outputs the obtained pitch pulse sequence to pitch pulse waveform power calculation section 471, differential excitation power calculation section 472, and pitch pulse waveform adding section 476.

Figure 17:
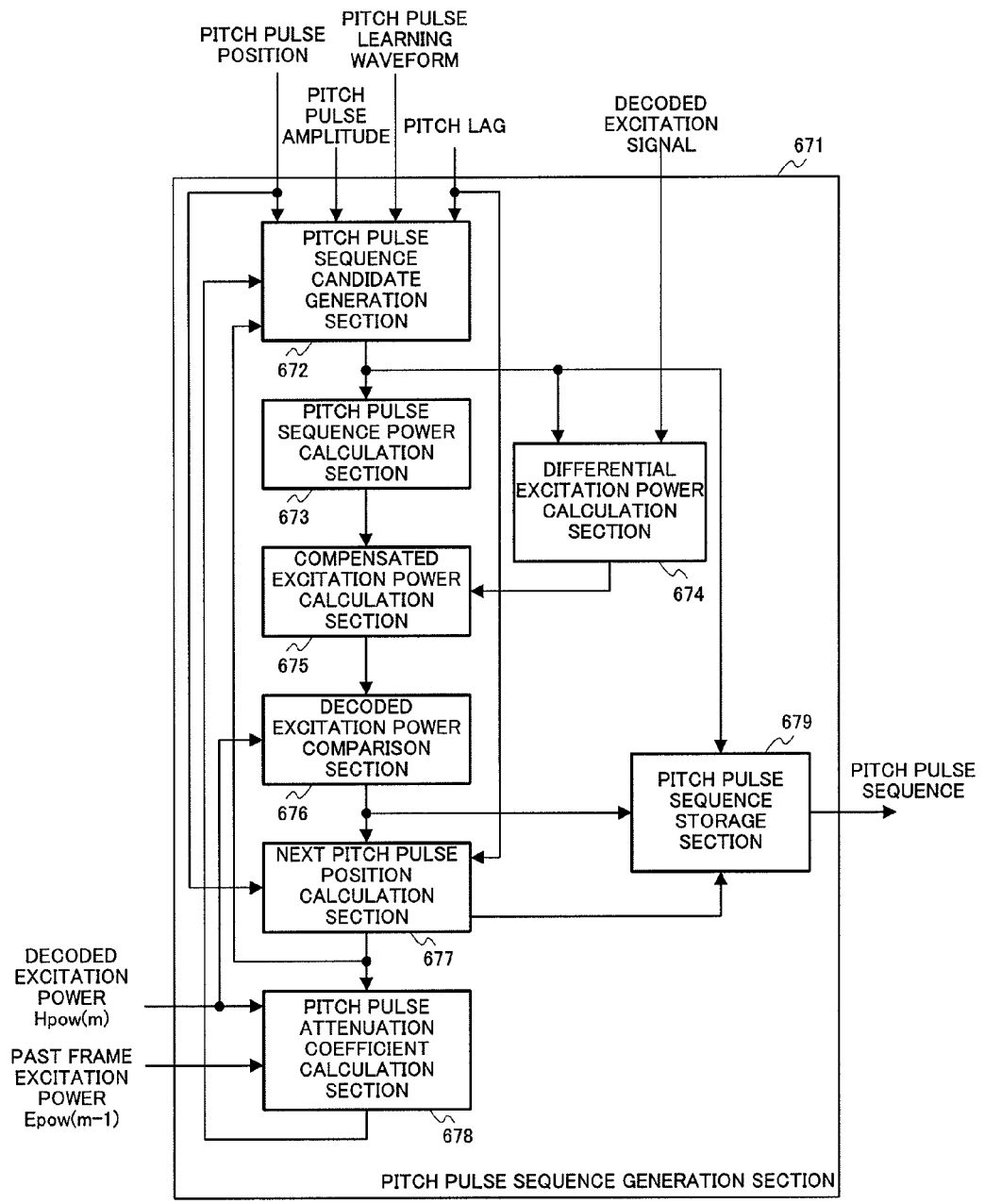
FIG. 17 is a block diagram showing the main internal configuration of a pitch pulse sequence generation section according to Embodiment 4.

FIG. 17 is a block diagram showing the main internal configuration of pitch pulse sequence generation section 671.

In FIG. 17, pitch pulse sequence generation section 671 is equipped with pitch pulse sequence candidate generation section 672, pitch pulse sequence power calculation section 673, differential excitation power calculation section 674, compensated excitation power calculation section 675, decoded excitation power comparison section 676, next pitch pulse position calculation section 677, pitch pulse attenuation coefficient calculation section 678, and pitch pulse sequence storage section 679.

Pitch pulse sequence candidate generation section 672 generates pitch pulse sequence candidates using pitch lag input from excitation parameter decoding section 202, a pitch pulse position and pitch pulse amplitude value input from pitch pulse information decoding section 204, a pitch pulse learning waveform input from pitch pulse waveform learning section 205, past frame excitation power input from excitation power storage section 601, a next pitch pulse position input from next pitch pulse position calculation section 677, and a pitch pulse attenuation coefficient input from pitch pulse attenuation coefficient calculation section 678. Specifically, pitch pulse sequence candidate generation section 672 incorporates a buffer with a frame length as its length, initializes the internal buffer as "empty"—that is, makes the buffer value "all 0s"—at the start of frame processing, takes a pitch pulse position input from pitch pulse information decoding section 204 as a starting point, takes a pitch pulse learning waveform multiplied by a pitch pulse attenuation coefficient as a pitch pulse waveform, and repeatedly adds pitch pulse waveforms to the internal buffer in the past direction of the time domain at pitch lag intervals so that the position of the pitch pulse waveform amplitude absolute value maximum value and the next pitch pulse position coincide. Pitch pulse sequence candidate generation section 672 outputs the buffer to which a plurality of pitch pulse waveforms have been added to pitch pulse sequence power calculation section 673, differential excitation power calculation section 674, and pitch pulse sequence storage section 679 as a pitch pulse sequence candidate.

Figure 18:
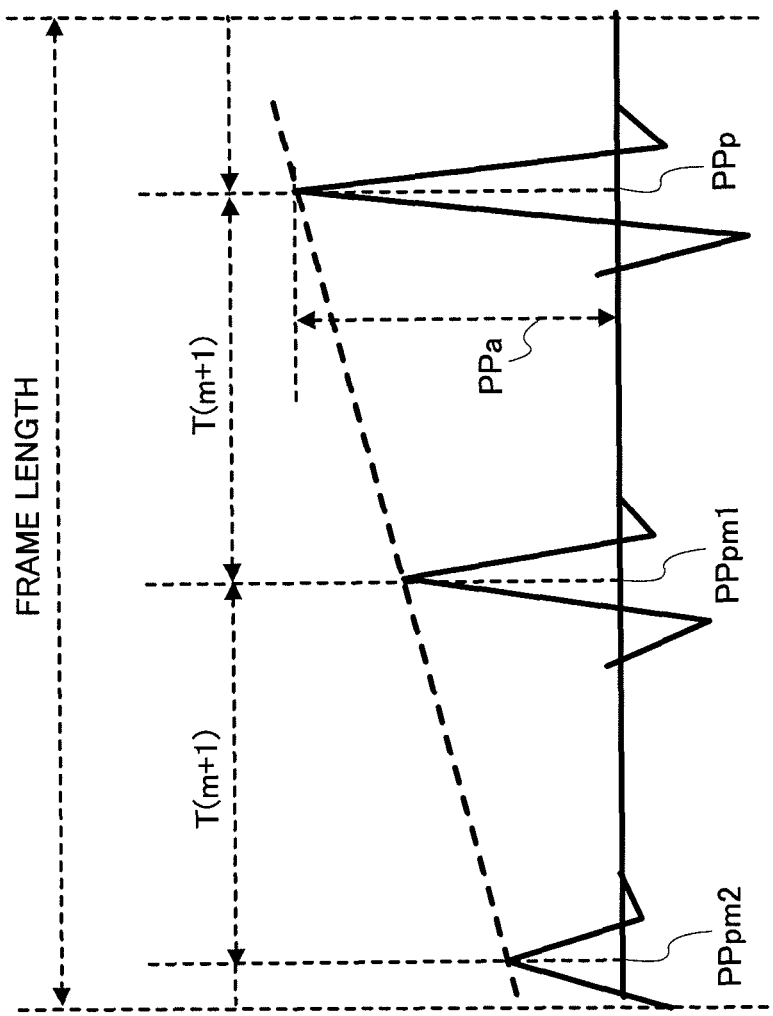
FIG. 18 is a drawing showing a representation of a pitch pulse sequence candidate generated by a pitch pulse sequence candidate generation section according to Embodiment 4.

FIG. 18 is a drawing showing a representation of a pitch pulse sequence candidate generated by pitch pulse sequence candidate generation section 672.

As the initial state of frame processing, the internal buffer of pitch pulse sequence candidate generation section 672 is "empty" (the buffer value is "all 0s"). Pitch pulse sequence candidate generation section 672 first takes a pitch pulse learning waveform with pitch pulse amplitude PPa as a first pitch pulse waveform, and adds the first pitch pulse waveform to the internal buffer so that the position of the pitch pulse waveform amplitude value maximum value and pitch pulse position PPp coincide—that is, at position PPp. Next, pitch pulse sequence candidate generation section 672 takes a pitch pulse learning waveform multiplied by a pitch pulse attenuation coefficient as a second pitch pulse waveform, and adds the second pitch pulse waveform to the internal buffer at a position separated from pitch pulse position PPp by pitch lag T(m+1) in the past direction of the time domain—that is, at position PPpm1. Similarly, pitch pulse sequence candidate generation section 672 takes a pitch pulse learning waveform multiplied by a pitch pulse attenuation coefficient different from the pitch pulse attenuation coefficient used for the second pitch pulse waveform as a third pitch pulse waveform, and adds the third pitch pulse waveform to the internal buffer at a position separated from pitch pulse position PPpm1 by pitch lag T(m+1) in the past direction of the time domain—that is, at position PPpm2. Pitch pulse sequence candidate generation section 672 generates a pitch pulse sequence candidate by repeating such addition operations.

Pitch pulse sequence power calculation section 673 calculates the power of a pitch pulse sequence candidate input from pitch pulse sequence candidate generation section 672 in accordance with equation 4 below, and outputs this to compensated excitation power calculation section 675 as pitch pulse sequence power RPpow(P).

(Equation 4)

$$RPpow(P) = \sum_{p=1}^{P} Ppow(1) * \text{Att\_r}(p)^2 \quad [3]$$

In equation 4, P indicates the total number of pitch pulse waveforms added to a pitch pulse sequence, RPpow(P) indicates pitch pulse sequence power, Ppow(1) indicates the power of the first pitch pulse waveform composing a pitch pulse sequence, and Att_r(p) indicates a pitch pulse attenuation coefficient that is multiplied by the p'th pitch pulse waveform composing a pitch pulse sequence.

Differential excitation power calculation section 674 generates a differential excitation signal by eliminating a pitch pulse sequence candidate input from pitch pulse sequence candidate generation section 672 from a decoded excitation signal input from decoded excitation generation section 203, calculates the power of the generated differential excitation signal as differential excitation power Rpow(P), and outputs this to compensated excitation power calculation section 675. If calculated differential excitation power Rpow is a negative number, differential excitation power calculation section 674 outputs a value of zero to compensated excitation power calculation section 675.

Compensated excitation power calculation section 675 adds together pitch pulse sequence power RPpow(P) input from pitch pulse sequence power calculation section 673 and differential excitation power Rpow(P) input from differential excitation power calculation section 674 in accordance with equation 5 below, and outputs the addition result to decoded excitation power comparison section 676 as compensated excitation power Hpow(P).

[4]

$$Hpow(P) = RPpow(P) + Rpow(P) \quad \text{(Equation 5)}$$

Decoded excitation power comparison section 676 compares compensated excitation power input from compensated excitation power calculation section 675 with decoded excitation power input from excitation power decoding section 402, and outputs the power comparison result to next pitch pulse position calculation section 677 and pitch pulse sequence storage section 679. There may be three power comparison results, for example: "large," "close," and "small." Specifically, for example, the result may be "large" when compensated excitation power is greater than decoded excitation power, "close" when compensated excitation power is less than or equal to decoded excitation power and at least 0.8 times decoded excitation power, and "small" when compensated excitation power is less than 0.8 times decoded excitation power.

Only if the power comparison result input from decoded excitation power comparison section 676 is "small," next pitch pulse position calculation section 677 calculates addition possibility information indicating whether or not it is possible next to add a pitch pulse waveform to a pitch pulse sequence candidate using pitch lag input from excitation parameter decoding section 202 and a pitch pulse position input from pitch pulse information decoding section 204. Next pitch pulse position calculation section 677 also calculates the position of a pitch pulse waveform to be added next as a next pitch pulse position, and outputs this to pitch pulse sequence candidate generation section 672, pitch pulse attenuation coefficient calculation section 678, and pitch pulse sequence storage section 679. Specifically, next pitch pulse position calculation section 677 calculates a position separated from the pitch pulse position input from pitch pulse information decoding section 204 by P pitch lags in the past direction of the time domain as the position of the P'th pitch pulse waveform to be added to the pitch pulse sequence—that is, as the next pitch pulse position. If the calculated next pitch pulse position is not within the frame range, next pitch pulse position calculation section 677 does not output the next pitch pulse position, but generates and outputs "impossible" pitch pulse addition possibility information. On the other hand, if the calculated next pitch pulse position is within the frame range, next pitch pulse position calculation section 677 outputs the next pitch pulse position and also generates and outputs "possible" pitch pulse addition possibility information.

Pitch pulse attenuation coefficient calculation section 678 calculates a pitch pulse attenuation coefficient to be multiplied by a pitch pulse learning waveform to be added to a pitch pulse sequence in accordance with equation 6 below, using decoded excitation power input from excitation power decoding section 402, past frame excitation power input from excitation power storage section 601, and a next pitch pulse position and pitch pulse addition possibility information input from next pitch pulse position calculation section 677, and outputs this pitch pulse attenuation coefficient to pitch pulse sequence candidate generation section 672.

(Equation 6)

$$\text{Att\_r}(p) = \left(1.0 - \sqrt{\frac{Epow(m-1)}{Hpow(m)}}\right) * \frac{\text{peak\_pos}(p)}{\text{peak\_pos}(1)} + \sqrt{\frac{Epow(m-1)}{Hpow(m)}} \quad [5]$$

In this equation, p indicates the number of a pitch pulse waveform to be added to a pitch pulse sequence as a pitch pulse addition number, Att_r(p) indicates a pitch pulse attenuation coefficient for the p'th pitch pulse waveform, peak_pos (p) indicates the position of the amplitude absolute value maximum value of the p'th pitch pulse waveform, Epow(m−1) indicates the excitation power of a past frame, and Hpow(m) indicates decoded excitation power. Here, peak_pos(p) is expressed as a relative position with the start position of the current frame as zero. According to equation 6, peak_pos (p) decreases as p increases. Also, when pitch pulse attenuation coefficient Att_r(1) corresponding to the first pitch pulse waveform is 1.0, and peak_pos(p) is zero (that is, at the frame start position), corresponding pitch pulse attenuation coefficient Att_r(p) is $\sqrt{(Epow(n-1)/Hpow(n))}$, and when peak_pos (p) is between zero and peak_pos(1), pitch pulse attenuation coefficient Att_r(p) is at an internally dividing point between $\sqrt{(Epow(n-1)/Hpow(n))}$ and 1.0.

Using a power comparison result input from decoded excitation power comparison section 676 and a next pitch pulse position input from next pitch pulse position calculation section 677, pitch pulse sequence storage section 679 selects one from a pitch pulse sequence candidate comprising P pitch pulse waveforms input from pitch pulse sequence candidate generation section 672 and a pitch pulse sequence candidate comprising stored P−1 pitch pulse waveforms. Pitch pulse sequence storage section 679 outputs the selected single pitch pulse candidate as a pitch pulse sequence to pitch pulse waveform power calculation section 471, differential excitation power calculation section 472, and pitch pulse waveform adding section 476. Specifically, pitch pulse sequence storage section 679 first performs pitch pulse sequence candidate selection according to the power comparison result. If the power comparison result is "large," pitch pulse sequence storage section 679 determines that if a decoded excitation signal were to be compensated using a pitch pulse sequence comprising P pitch pulse waveforms, the compensated excitation power would exceed the decoded excitation power, and selects and outputs a pitch pulse sequence candidate comprising stored P−1 pitch pulse waveforms. If the power comparison result is "close," pitch pulse sequence storage section 679 determines that if a decoded excitation signal were to be compensated using a pitch pulse sequence comprising P pitch pulse waveforms, the compensated excitation power and the decoded excitation power would be close, and selects and outputs a pitch pulse sequence candidate comprising P pitch pulse waveforms. If the power comparison result is "small," pitch pulse sequence storage section 679 performs pitch pulse sequence candidate selection using next pitch pulse addition possibility information. That is to say, if the power comparison result is "small" and the next pitch pulse addition possibility information is "possible," pitch pulse sequence storage section 679 determines that another pitch pulse waveform can be added to a pitch pulse sequence candidate, and does not perform pitch pulse sequence candidate selection and output. On the other hand, if the power comparison result is "small" and the next pitch pulse addition possibility information is "impossible," pitch pulse sequence storage section 679 determines that another pitch pulse waveform cannot be added to a pitch pulse sequence candidate, and selects and outputs a pitch pulse sequence candidate comprising P pitch pulse waveforms that makes possible compensation bringing the maximum proximity to decoded excitation power.

Figure 19:
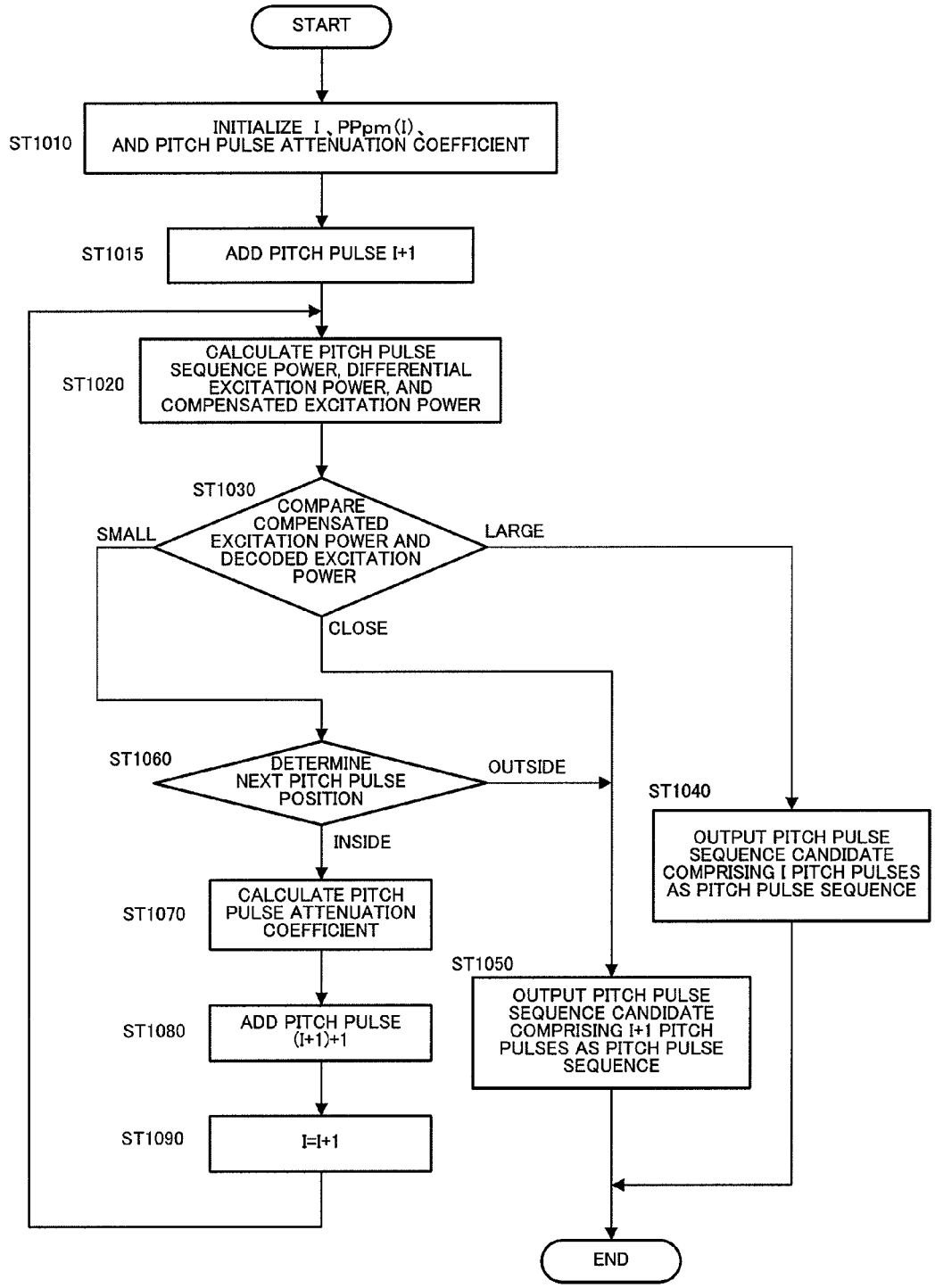
FIG. 19 is a flowchart showing the processing procedure whereby a pitch pulse sequence is generated in a pitch pulse sequence generation section according to Embodiment 4.

FIG. 19 is a flowchart showing the processing procedure whereby a pitch pulse sequence is generated in pitch pulse sequence generation section 671.

First, pitch pulse sequence candidate generation section 672 initializes variable I that counts pitch pulse waveforms added to a pitch pulse sequence to "0," initializes PPpm(I) according to the value of a pitch pulse position input from pitch pulse information decoding section 204, and initializes a pitch pulse attenuation coefficient corresponding to pitch pulse I+1 to a value of [1.0] (ST1010). Next, pitch pulse sequence candidate generation section 672 adds pitch pulse learning waveform multiplied by a pitch pulse attenuation coefficient corresponding to pitch pulse I+1, to pitch pulse position PPpm(I) (ST1015). Then pitch pulse sequence power calculation section 673 calculates pitch pulse sequence power, differential excitation power calculation section 674 calculates differential excitation power, and compensated excitation power calculation section 675 calculates compensated excitation power (ST1020). Next, decoded excitation power comparison section 676 compares the decoded excitation power with the compensated excitation power and obtains a power comparison result (ST1030) If the power comparison result obtained in ST1030 is "small" (ST1030: SMALL), next pitch pulse position calculation section 677 calculates the position at which the next pitch pulse waveform (number (I+1)+1) after pitch pulse waveform I+1 is added as the next pitch pulse position, and also determines whether or not the calculated next pitch pulse position is within the frame range (ST1060). If the next pitch pulse position calculated in ST1060 is not within the frame range (ST1060: OUTSIDE), processing proceeds to ST1050. On the other hand, if the next pitch pulse position calculated in ST1060 is within the frame range (ST1060: INSIDE), pitch pulse attenuation coefficient calculation section 678 calculates a pitch pulse attenuation coefficient corresponding to pitch pulse waveform (I+1)+1 (ST1070). Next, pitch pulse sequence candidate generation section 672 adds a pitch pulse learning waveform multiplied by the pitch pulse attenuation coefficient calculated in ST1070 at the next pitch pulse position calculated in ST1060 as pitch pulse waveform (I+1)+1, and generates a pitch pulse sequence candidate (ST1080). Then pitch pulse sequence candidate generation section 672 increments I by 1 so that I=I+1, and shifts the processing to ST1020 (ST1090).

On the other hand, if the power comparison result obtained in ST1030 is "large" (ST1030: LARGE), pitch pulse sequence storage section 679 outputs a pitch pulse sequence candidate comprising I pitch pulses as a pitch pulse sequence generated by pitch pulse sequence generation section 671 (ST1040).

If the power comparison result obtained in ST1030 is "close" (ST1030: CLOSE), and the next pitch pulse position calculated in ST1060 is not within the frame range (ST1060: OUTSIDE), pitch pulse sequence storage section 679 outputs a pitch pulse sequence candidate comprising I+1 pitch pulses as a pitch pulse sequence generated by pitch pulse sequence generation section 671 (ST1050).

Compensation of a decoded excitation signal by means of a pitch pulse sequence according to this embodiment will be described below using FIG. 20 through FIG. 27. Here, a case will be described by way of example in which frame m−1 and frame m+1 are received normally, but frame m is lost.

Figure 20:
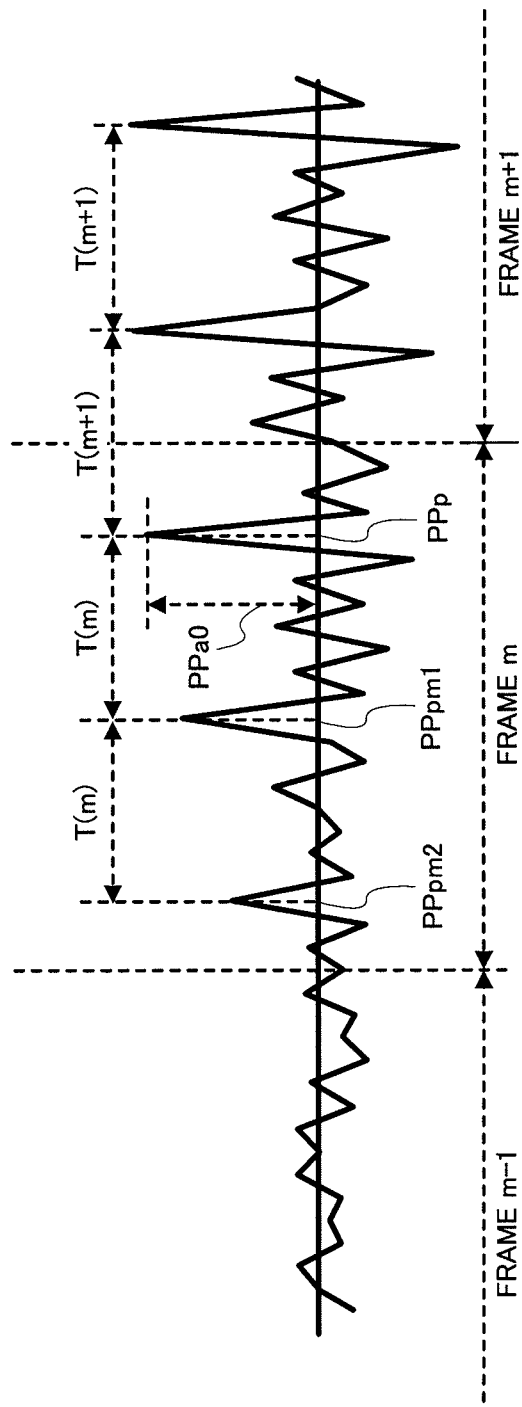
FIG. 20 is a drawing showing a waveform of a decoded excitation signal when frame loss does not occur according to Embodiment 4.
Figure 21:
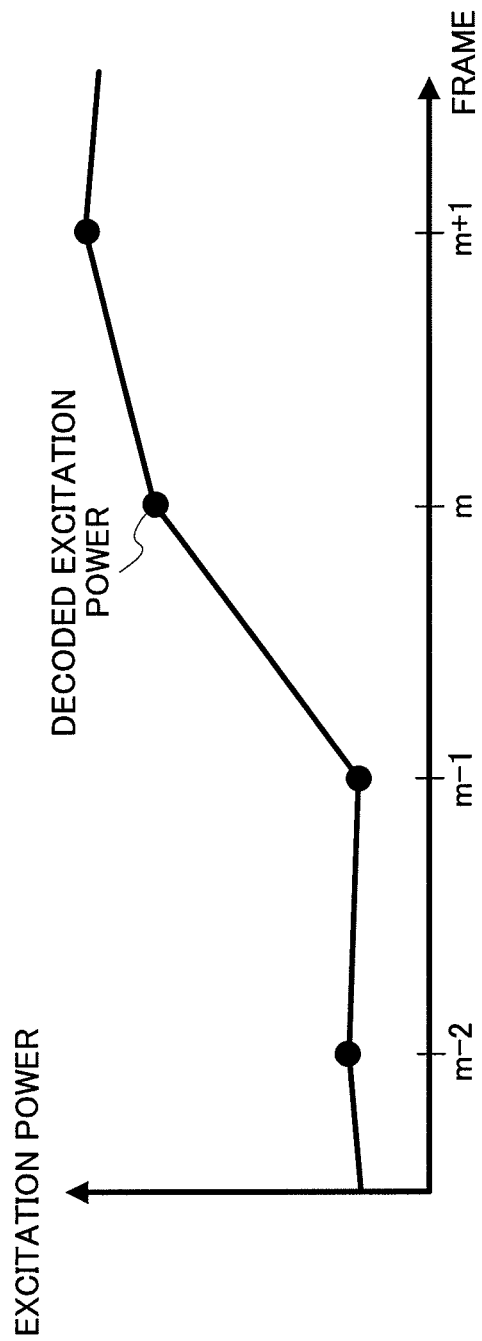
FIG. 21 is a drawing showing decoded excitation power in each frame when frame loss does not occur according to Embodiment 4.
Figure 22:
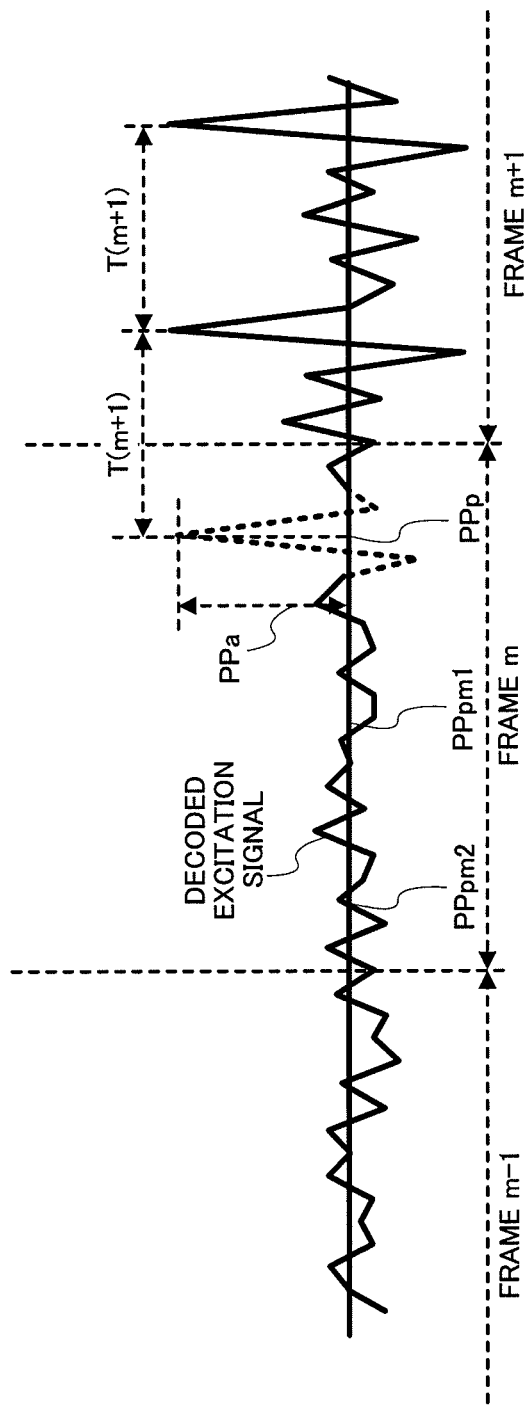
FIG. 22 is a drawing showing a waveform of a decoded excitation signal obtained by compensating a decoded excitation signal using one pitch pulse waveform according to Embodiment 4.
Figure 23:
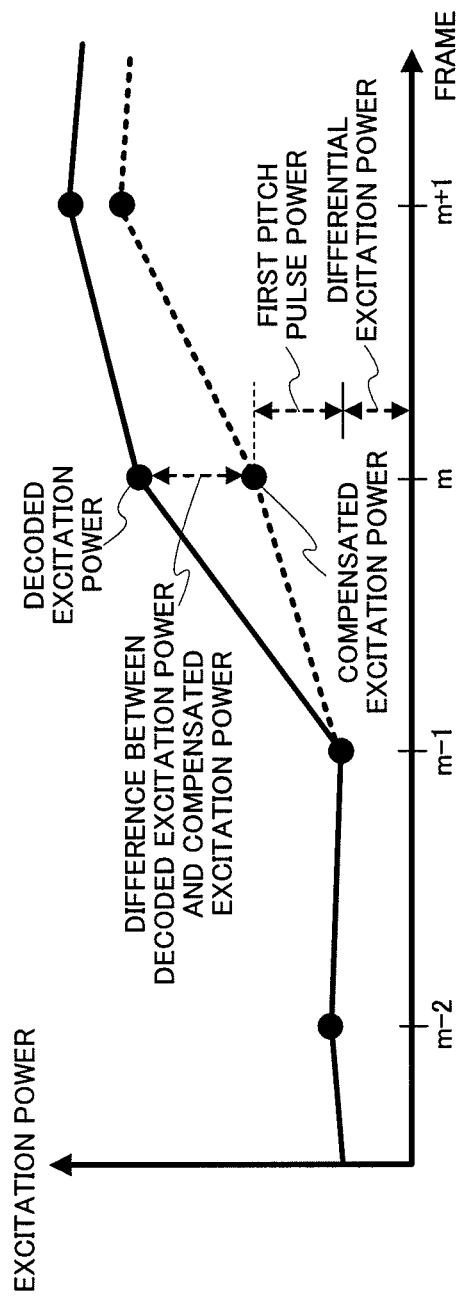
FIG. 23 is a drawing illustrating excitation power when a decoded excitation signal is compensated using one pitch pulse waveform according to Embodiment 4.
Figure 24:
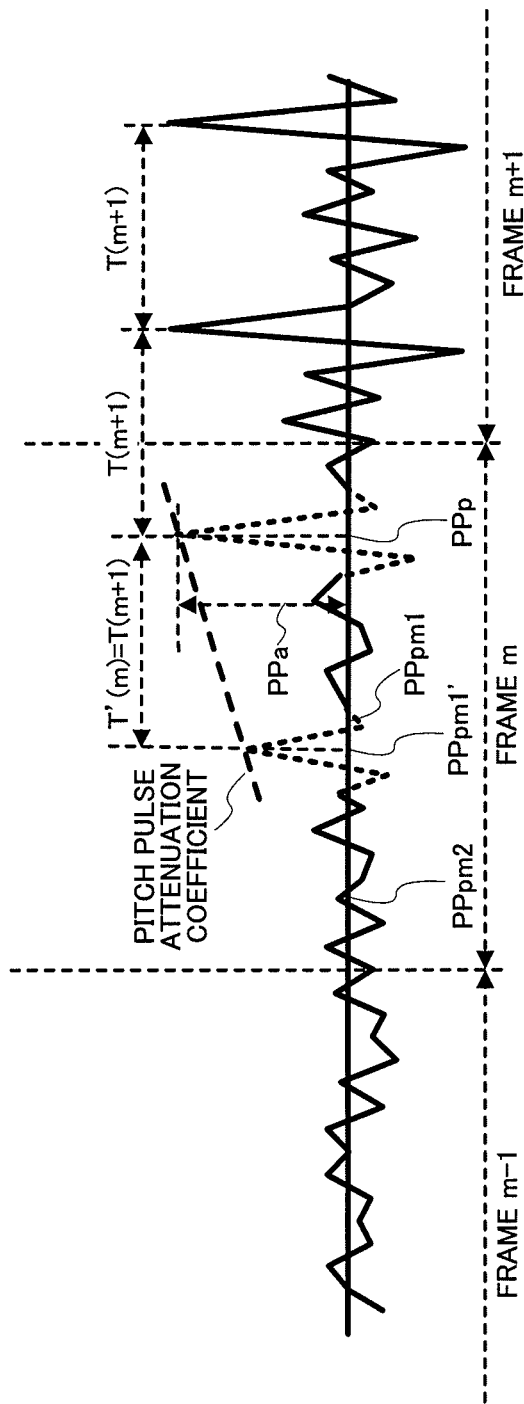
FIG. 24 is a drawing showing a waveform of a decoded excitation signal obtained by compensating a decoded excitation signal using two pitch pulse waveforms according to Embodiment 4.
Figure 25:
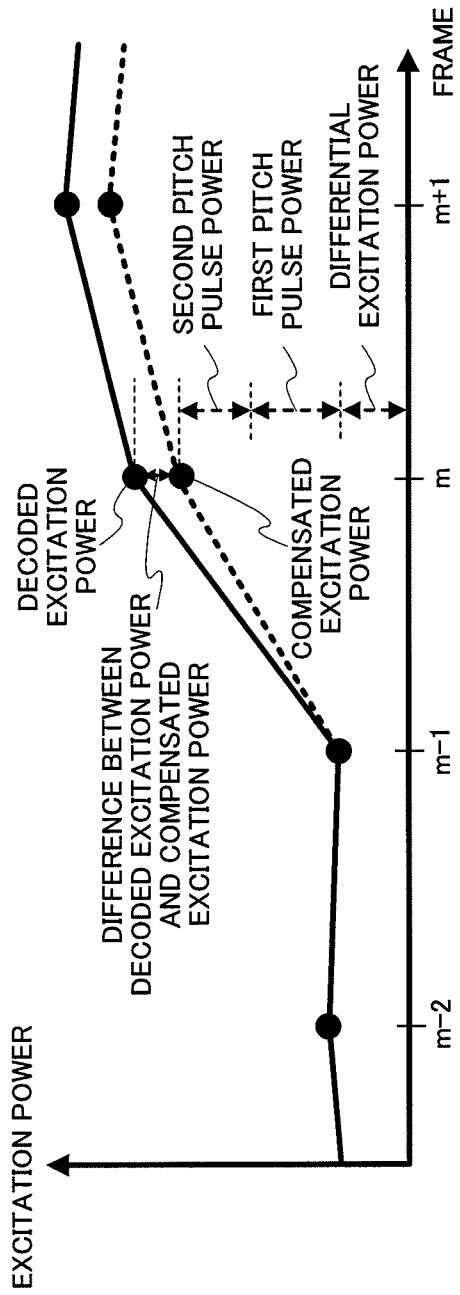
FIG. 25 is a drawing illustrating excitation power when a decoded excitation signal is compensated using two pitch pulse waveforms according to Embodiment 4.
Figure 26:
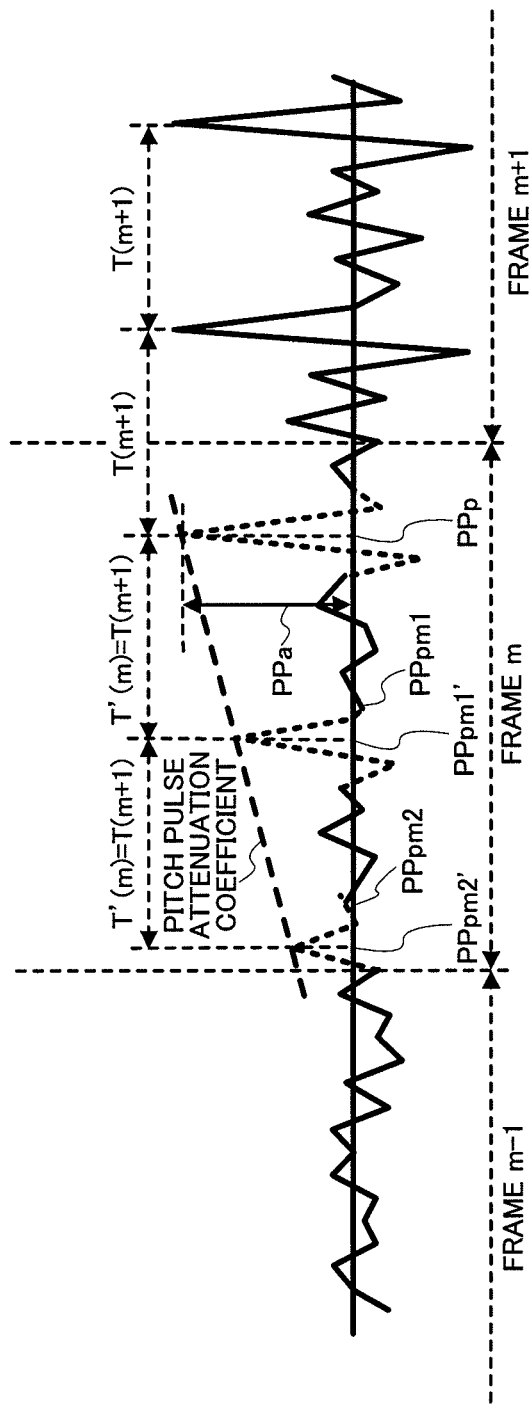
FIG. 26 is a drawing showing a waveform of a decoded excitation signal obtained by compensating a decoded excitation signal using three pitch pulse waveforms according to Embodiment 4.

FIG. 20 shows a waveform of a decoded excitation signal when frame loss does not occur—that is, an ideal decoded excitation signal waveform—and FIG. 22, FIG. 24, and FIG. 26 show waveforms of compensated excitation signals obtained when frame m is lost and a decoded excitation signal is compensated using a pitch pulse sequence comprising one, two, and three pitch pulse waveforms respectively. FIG. 21, FIG. 23, FIG. 25, and FIG. 27 illustrate excitation power in the decoded excitation compensation processing shown in FIG. 20, FIG. 22, FIG. 24, and FIG. 26.

FIG. 20 is a drawing showing a waveform of a decoded excitation signal when frame loss does not occur—that is, an ideal decoded excitation signal waveform. In FIG. 20, frame m contains three pitch pulse waveforms. FIG. 21 shows decoded excitation power in each frame including frame m.

FIG. 22 is a drawing showing a waveform of a compensated excitation signal obtained by compensating a decoded excitation signal using one pitch pulse waveform. In this case, the one pitch pulse waveform used for decoded excitation signal compensation—that is, the pitch pulse waveform indicated by a dotted line—is a pitch pulse learning waveform itself, and the position of the amplitude absolute value maximum value of this pitch pulse waveform coincides with pitch pulse position PPp obtained by pitch pulse information decoding section 204.

FIG. 23 is a drawing illustrating excitation power when a decoded excitation signal is compensated using one pitch pulse waveform. As shown in FIG. 23, when a decoded excitation signal is compensated using one pitch pulse waveform, compensated excitation power is the sum total of differential excitation power and the power of the one pitch pulse waveform used for compensation. In FIG. 23, a case is shown by way of example in which the power comparison result for compensated excitation power obtained by compensation of one pitch pulse waveform and decoded excitation power is "small"—that is, the ratio between compensated excitation power and decoded excitation power is less than 0.8. In other words, this is a case in which the difference between decoded excitation power and compensated excitation power is greater than a predetermined value, and in such a case decoded excitation signal quality degrades, and it is therefore necessary to perform further concealment of the compensated excitation signal power. Possible compensated excitation signal power concealment methods are to amplify the decoded excitation signal or to amplify a pitch pulse waveform used for compensation. However, a problem with the method whereby the decoded excitation signal is amplified is that noise is amplified, while a problem with the method whereby a pitch pulse waveform used for compensation is amplified is that decoded speech has localized excessive audibility, giving a sense of fluctuation. Furthermore, even combining the two methods is of limited efficacy. In this embodiment, the number of pitch pulse waveforms used for compensation is increased—that is, a decoded speech signal is compensated using a pitch pulse sequence. That is to say, in this embodiment a pitch pulsed signal is compensated using a pitch pulsed waveform, and therefore problems associated with the method involving amplification of the decoded excitation signal or the method involving amplification of a pitch pulse waveform used for compensation are solved.

FIG. 24 is a drawing showing a waveform of a compensated excitation signal obtained by compensating a decoded excitation signal using two pitch pulse waveforms. In this case, the second pitch pulse waveform used for decoded excitation signal compensation—that is, the pitch pulse waveform with the smaller amplitude of the two pitch pulse waveforms indicated by a dotted line—is obtained by multiplying a pitch pulse attenuation coefficient corresponding to the second pitch pulse by a pitch pulse learning waveform. Position PPpm1' of the amplitude absolute value maximum value of this pitch pulse waveform coincides with a position separated from position PPp by pitch lag T(m+1) in the past direction of the time domain. As shown in FIG. 24, there is a slight displacement between position PPpm1' and position PPpm1.

FIG. 25 is a drawing illustrating excitation power when a decoded excitation signal is compensated using two pitch pulse waveforms. As shown in FIG. 25, when a decoded excitation signal is compensated using two pitch pulse waveforms, compensated excitation power is the sum total of differential excitation power, the power of the first pitch pulse waveform used for compensation, and the power of the second pitch pulse waveform used for compensation. In FIG. 25, a case is shown by way of example in which the power comparison result for compensated excitation power obtained by compensation of two pitch pulse waveforms and decoded excitation power is "small." When the power comparison result is "small," the decoded excitation signal is compensated by adding a further pitch pulse waveform as shown in following FIG. 26.

FIG. 26 is a drawing showing a waveform of a compensated excitation signal obtained by compensating a decoded excitation signal using three pitch pulse waveforms. In this case, the third pitch pulse waveform used for decoded excitation signal compensation—that is, the pitch pulse waveform with the smallest amplitude of the three pitch pulse waveforms indicated by a dotted line—is obtained by multiplying a pitch pulse attenuation coefficient corresponding to the third pitch pulse by a pitch pulse learning waveform, and position PPpm2' of the amplitude absolute value maximum value of this pitch pulse waveform coincides with a position separated from position PPp by 2×T(m+1) in the past direction of the time domain. As shown in FIG. 26, there is a slight displacement between position PPpm2' and position PPpm2.

Figure 27:
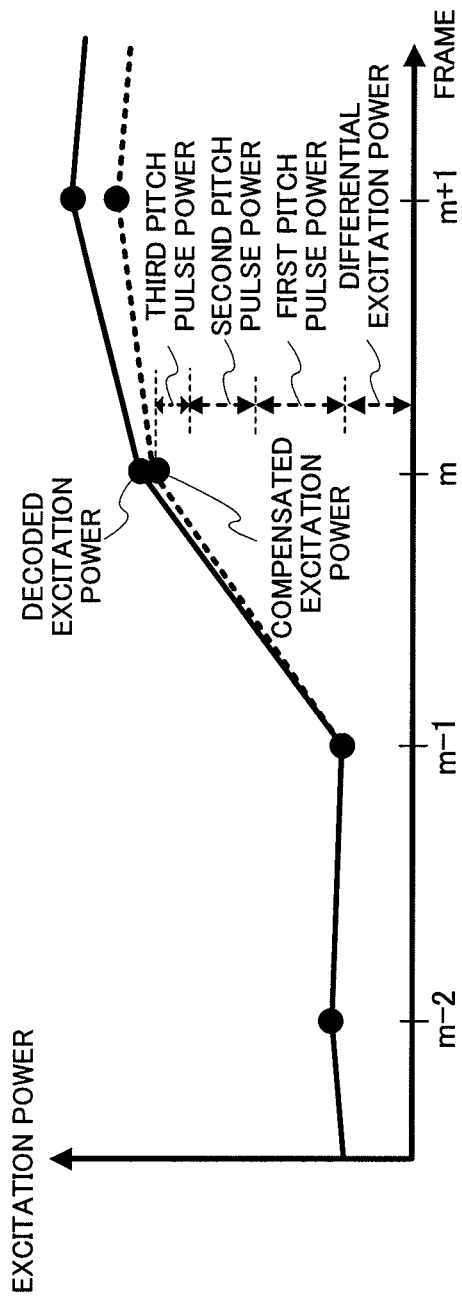
FIG. 27 is a drawing illustrating excitation power when a decoded excitation signal is compensated using three pitch pulse waveforms according to Embodiment 4.

FIG. 27 is a drawing illustrating excitation power when a decoded excitation signal is compensated using three pitch pulse waveforms. As shown in FIG. 27, when a decoded excitation signal is compensated using three pitch pulse waveforms, compensated excitation power is the sum total of differential excitation power, the power of the first pitch pulse waveform used for compensation, the power of the second pitch pulse waveform used for compensation, and the power of the third pitch pulse waveform used for compensation. In FIG. 27, a case is shown by way of example in which the power comparison result for compensated excitation power obtained by compensation of three pitch pulse waveforms and decoded excitation power is "close." Since the power comparison result is "close," decoded excitation signal compensation is terminated here.

Even if the power comparison result in FIG. 27 were "small," since, as can be seen from FIG. 26, the position at which a fourth pitch pulse waveform would be added is not within the frame m range but belongs to the frame m−1 range, a fourth pitch pulse waveform would not be added and decoded excitation signal compensation would be terminated in the same way as when the power comparison result is "close."

In FIG. 24 and FIG. 26, although second pitch pulse position PPpm1' and third pitch pulse position PPpm2' are slightly displaced from respective ideal decoded excitation signal pitch pulse waveform positions PPpm1 and PPpm2, since a pitch pulsed signal is compensated using pitch pulsed waveforms the obtained compensated excitation signal is closer to an ideal decoded excitation signal than with a method whereby the decoded excitation signal is amplified or a method whereby a pitch pulse waveform used for compensation is amplified. If a decoded excitation signal compensation method according to this embodiment is applied to speech encoding and decoding of a speech onset portion, in particular, more natural decoded speech can be obtained.

Thus, according to this embodiment, addition positions and pitch pulse attenuation coefficients are calculated for a plurality of pitch pulse waveforms composing a pitch pulse sequence, without increasing the amount of information transmitted from a speech encoding apparatus to a speech decoding apparatus, and a decoded excitation signal is compensated using a pitch pulse sequence, enabling a decoded excitation signal to be compensated without increasing noise or a sense of fluctuation, and enabling decoded speech signal quality to be improved, while reducing the amount of encoded information.

In this embodiment, a case in which a power comparison result is "close" or "large," and a case in which the next pitch pulse position is not within the frame range, have been described by way of example as conditions for stopping the addition of a pitch pulse waveform to a pitch pulse sequence, but the present invention is not limited to this, and a case in which the amplitude of a pitch pulse obtained by multiplication by a pitch pulse attenuation coefficient is less than the amplitude of a decoded excitation in the vicinity of that pitch pulse position may also be added as a condition for stopping the addition of a pitch pulse waveform.

In this embodiment, a case has been described by way of example in which the pitch lag of the next frame after a lost frame is used when calculating a position at which a pitch pulse waveform is to be added to a pitch pulse sequence, but the present invention is not limited to this, and the pitch lag of a past frame relative to a lost frame may be used, or an interpolated value between the pitch lags of a past frame and the next frame may be used.

Embodiment 5

In Embodiment 5 of the present invention, the position of each pitch pulse waveform contained in a pitch pulse sequence is further compensated so that a decoded excitation signal compensated using a pitch pulse sequence becomes closer to an ideal decoded excitation signal when frame loss does not occur than a compensated decoded excitation signal obtained in Embodiment 4.

FIG. 28 is a drawing for explaining a method of compensating a decoded excitation signal using a pitch pulse sequence. FIG. 28 is a drawing chiefly for explaining the position of each pitch pulse waveform, and does not show accurate amplitude values of each pitch pulse waveform.

Figure 28A:
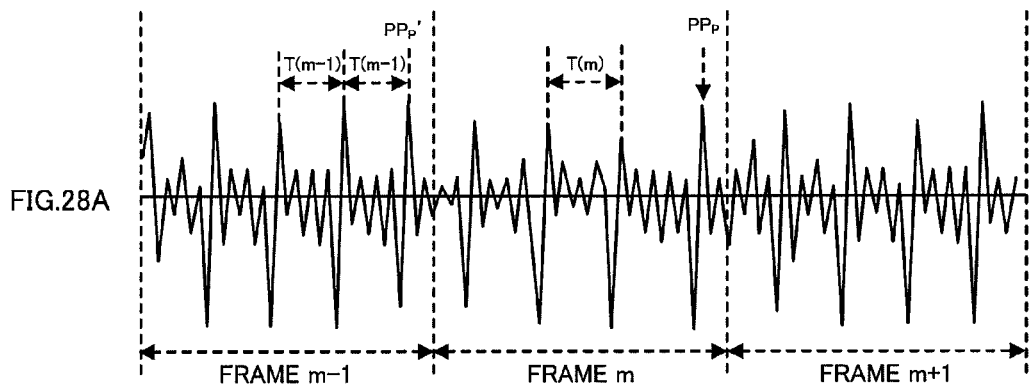
FIG. 28 is a drawing for explaining a method of compensating a decoded excitation signal using a pitch pulse sequence according to Embodiment 5.

FIG. 28A is a drawing showing a waveform of an ideal decoded excitation signal when frame loss does not occur. FIG. 28A shows pitch lag T(m−1) of frame m−1, pitch lag T(m) of frame m, position PPp of the rearmost pitch pulse of frame m detected on the speech encoding side, and pitch pulse position PPp' of frame m−1. Here, pitch pulse position PPp of frame m detected on the speech encoding side is pitch pulse position PPp decoded by pitch pulse information decoding section 204, and the rearmost pitch pulse of frame m is hereinafter referred to as the frame m last pitch pulse.

Figure 28B:
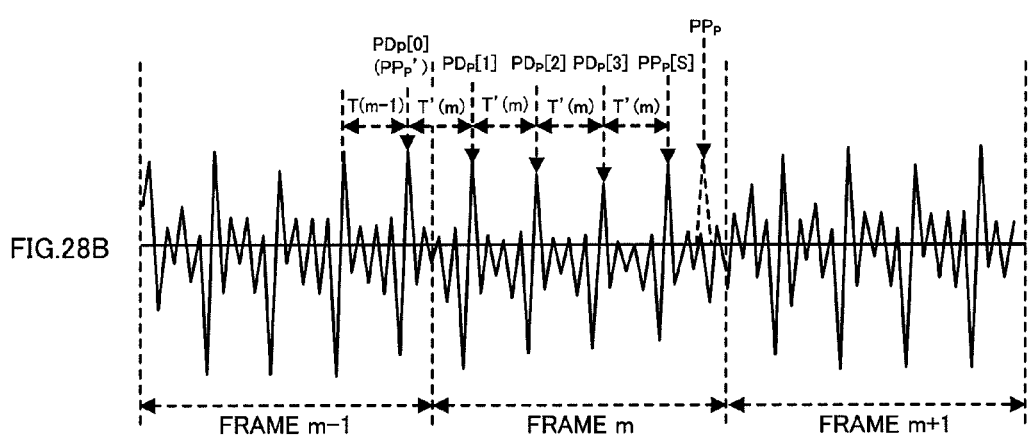

FIG. 28B is a drawing showing a waveform of a compensated decoded excitation signal obtained by adding a sequence of pitch pulse waveforms at concealment pitch lag T'(m) intervals to frame m when frame m−1 and frame m+1 are received normally but frame m is lost. As shown in FIG. 28B, when T(m−1) is used as concealment pitch lag T'(m), and a pitch pulse sequence is added to a decoded excitation signal taking frame m−1 last pitch pulse position PPp' as the starting point, the pitch pulse waveform positions are PDp [1], PDp [2], . . . , PDp [S]. Here, S indicates the total number of pitch pulse waveforms added to frame m. For convenience, PPp' is also referred to as PDp [0] in the following description. As shown in FIG. 28B, pitch pulse waveforms are placed at concealment pitch lag T'(m) intervals, and PDp [S] and PPp no longer coincide. That is to say, as can be seen by comparing FIG. 28A and FIG. 28B, the position of a pitch pulse waveforms added to the decoded excitation signal shown in FIG. 28B and the position of a pitch pulse contained in the ideal decoded excitation signal shown in FIG. 28A do not coincide, and the compensated decoded excitation signal shown in FIG. 28B contains a pseudo-pitch-pulse not contained in the ideal decoded excitation signal shown in FIG. 28A, causing degradation of decoded speech quality.

Figure 28C:
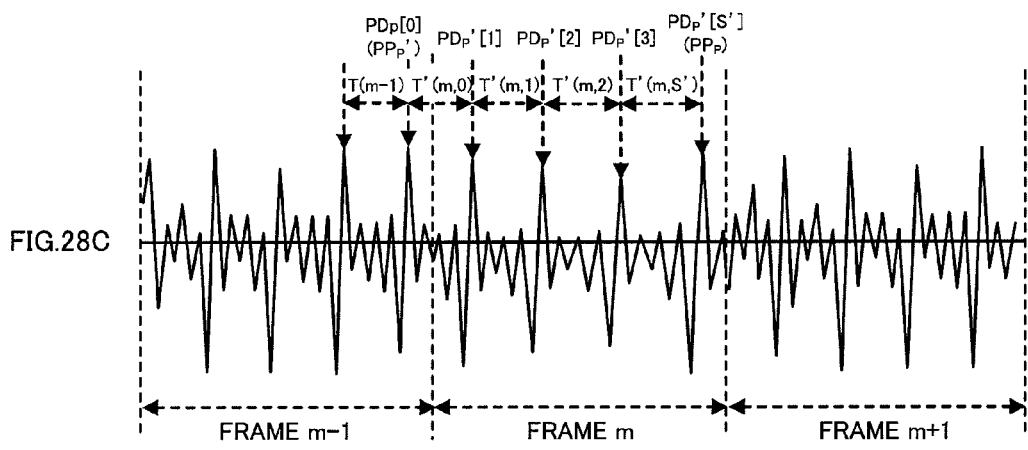

FIG. 28C shows a case in which T'(m,0) T'(m,1), . . . , T'(m,S'−1) obtained by further compensating concealment pitch lag T'(m) are used, and a decoded excitation signal is compensated by adding a pitch pulse sequence, taking PPp' as the starting point. In this case, the pitch pulse waveform positions are PDp'[1], PDp'[2], . . . , PDp'[S']. Here, the sum total of T'(m,0), T'(m, 1), . . . , T'(m, S'−1) is equal to the distance between PPp' and PPp, and PDp'[S'] and PPp coincide.

Below, PDp'[1], PDp'[2], . . . , PDp'[S'] shown in FIG. 28C are referred to respectively as the first concealment pitch pulse position, second concealment pitch pulse position, third concealment pitch pulse position, and S'th concealment pitch pulse position.

Figure 29:
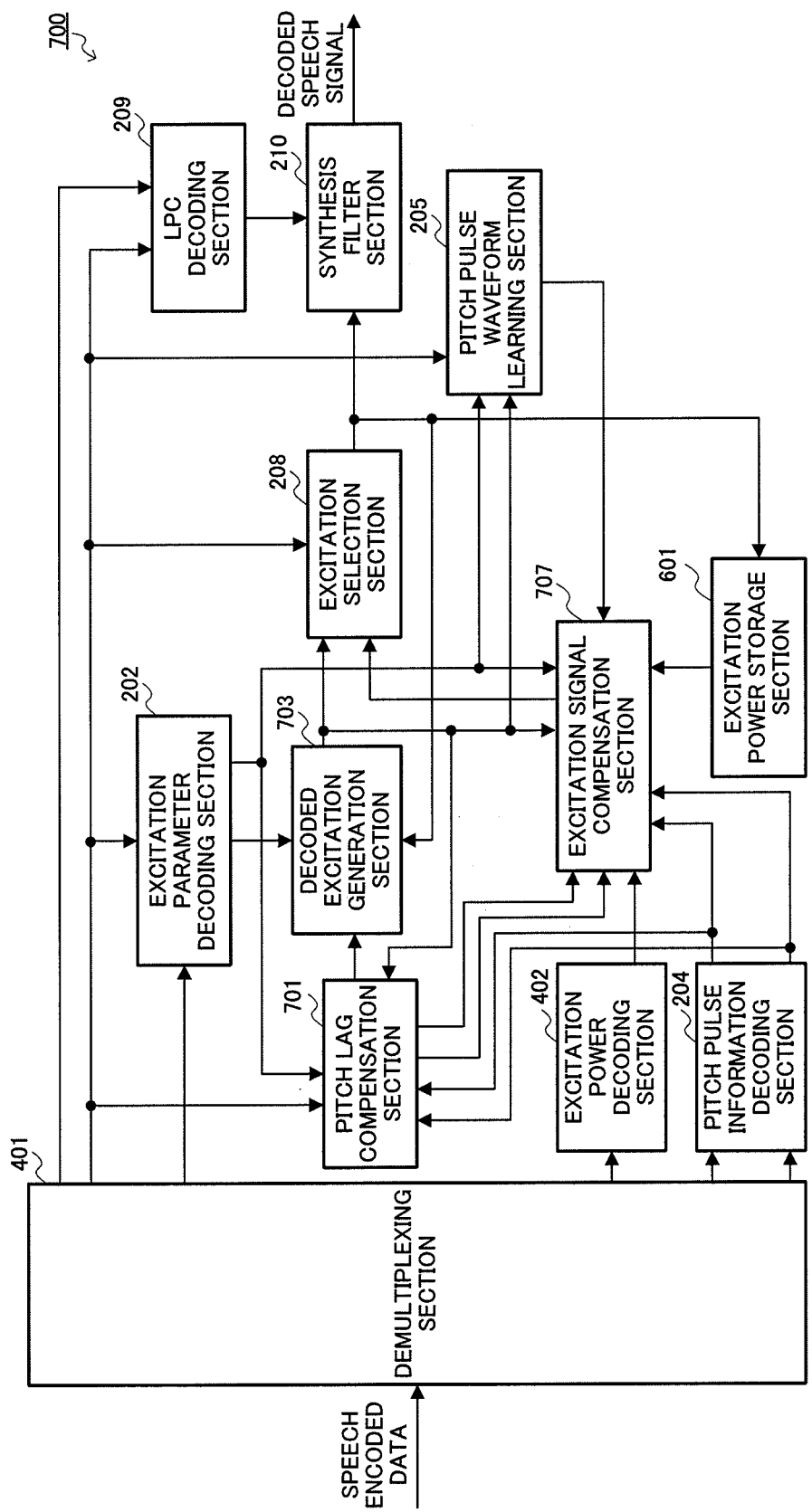
FIG. 29 is a block diagram showing the main configuration of a speech decoding apparatus according to Embodiment 5.

FIG. 29 is a block diagram showing the main configuration of speech decoding apparatus 700 according to Embodiment 5 of the present invention. Speech decoding apparatus 700 has the same kind of basic configuration as speech decoding apparatus 600 according to Embodiment 4 (see FIG. 15), and therefore identical configuration elements are assigned the same reference codes, and descriptions thereof are omitted.

Speech decoding apparatus 700 differs from speech decoding apparatus 600 in additionally being equipped with pitch lag compensation section 701. Also, there are differences in internal configuration and operation between decoded excitation generation section 703 and excitation signal compensation section 707 of speech decoding apparatus 700 and decoded excitation generation section 203 and excitation signal compensation section 607 of speech decoding apparatus 600, and therefore different reference codes are assigned to indicate this.

Pitch lag compensation section 701 generates compensated pitch lag, pitch lag compensation possibility information, and a concealment pitch pulse position, using pitch lag input from excitation parameter decoding section 202, a pitch pulse position and pitch pulse amplitude input from pitch pulse information decoding section 204, and a decoded excitation signal fed back from decoded excitation generation section 703, outputs the pitch lag or compensated pitch lag to decoded excitation generation section 703, and outputs the pitch lag compensation possibility information and concealment pitch pulse position to excitation signal compensation section 707. Details of pitch lag compensation section 701 will be given later herein.

Decoded excitation generation section 703 differs from decoded excitation generation section 203 according to Embodiment 4 only in using compensated pitch lag or pitch lag input from pitch lag compensation section 701 instead of pitch lag input from excitation parameter decoding section 202 when performing CELP decoding, concealment, and smoothing processing, and therefore a detailed description thereof is omitted here.

Excitation signal compensation section 707 differs from excitation signal compensation section 607 according to Embodiment 4 in additionally using a concealment pitch pulse position from concealment pitch pulse position calculation section 714 described later herein, and pitch lag compensation possibility information from pitch lag compensation possibility determination section 713 described later herein, when generating a pitch pulse sequence. Details of excitation signal compensation section 707 will be given later herein.

Figure 30:
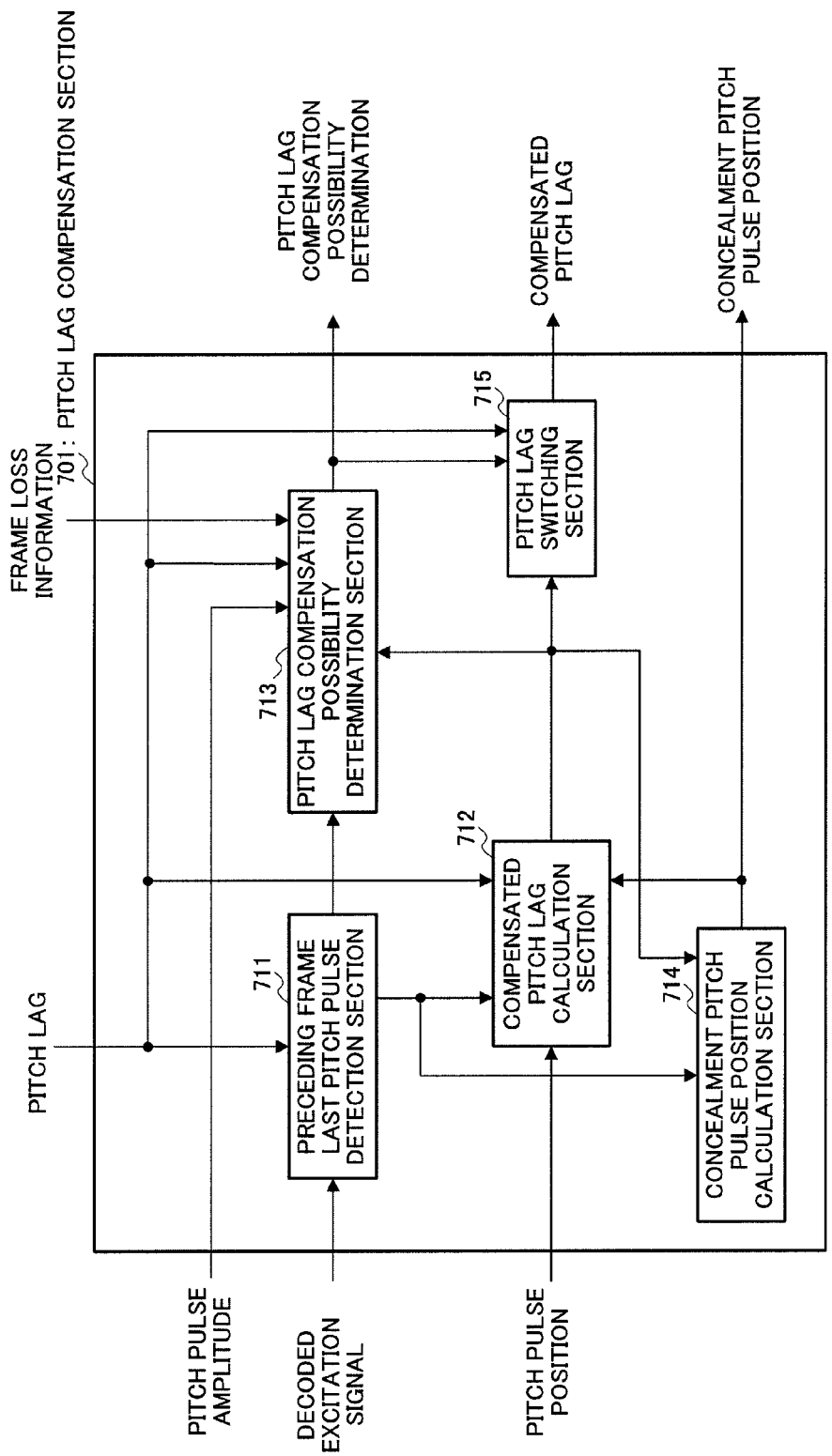
FIG. 30 is a block diagram showing the internal configuration of a pitch lag compensation section according to Embodiment 5.

FIG. 30 is a block diagram showing the internal configuration of pitch lag compensation section 701.

In FIG. 30, pitch lag compensation section 701 is equipped with preceding frame last pitch pulse detection section 711, compensated pitch lag calculation section 712, pitch lag compensation possibility determination section 713, concealment pitch pulse position calculation section 714, and pitch lag switching section 715. In the following description of the operation of the sections of pitch lag compensation section 701, the parameters used in FIG. 28 will be employed.

Using a decoded excitation signal input from decoded excitation generation section 703 and pitch lag input from excitation parameter decoding section 202, preceding frame last pitch pulse detection section 711 detects the first pitch pulse from the rear-end of the frame immediately preceding a lost frame—that is, position PPp' (PDp [0]) of the frame m−1 last pitch pulse—and outputs this to compensated pitch lag calculation section 712, pitch lag compensation possibility determination section 713, and concealment pitch pulse position calculation section 714. Preceding frame last pitch pulse detection section 711 also outputs the amplitude of the detected frame m−1 last pitch pulse to pitch lag compensation possibility determination section 713. The method of detecting the frame m−1 last pitch pulse in preceding frame last pitch pulse detection section 711 is basically the same as the method of detecting the frame n last pitch pulse position in pitch pulse detection section 192 on the speech encoding apparatus side. However, since frame m is lost, T(m) cannot be used in preceding frame last pitch pulse detection section 711, and concealment pitch lag T'(m) is used instead of T(m). T(m−1), or T(m+1), or a value obtained by interpolating T(m−1) and T(m+1), is used as concealment pitch lag T'(m). To simplify the explanation, a case in which T(m−1) is used as concealment pitch lag T'(m) will be described below as an example.

Compensated pitch lag calculation section 712 calculates compensated pitch lags T'(m, 0), T'(m, 1), . . . , T'(m,S'−1) using pitch lag input from excitation parameter decoding section 202, frame m last pitch pulse position PPp input from pitch pulse information decoding section 204, frame m−1 last pitch pulse position PDp' input from preceding frame last pitch pulse detection section 711, and concealment pitch pulse positions input from concealment pitch pulse position calculation section 714. Compensated pitch lag calculation section 712 outputs calculated compensated pitch lags T'(m, 0), T'(m,1), . . . , T'(m,S'−1) to pitch lag switching section 715, and also feeds them back to concealment pitch pulse position calculation section 714. Specifically, compensated pitch lag calculation section 712 calculates compensated pitch lag T'(m, i) in accordance with equation 7 and equation 8 below so that the distance between concealment pitch pulse position PDp'[i] and PPp (hereinafter referred to as the inter-pitch-pulse distance) is an integral multiple of compensated pitch lag T'(m, i), where i=0 to S'−1, PDp'[0] is frame m−1 last pitch pulse position PDp [0], and PPp is the frame m last pitch pulse position.

(Equation 7)

$$Dpp[s] = PPp - PDp'[s] \quad [6]$$

(Equation 8)

$$\begin{cases} T'(m, s) = (\text{int})\left(\dfrac{Dpp[s]/}{(\text{int})(Dpp[s]/tT)}\right) & \text{if} \quad \dfrac{(Dpp[s]/tT) -}{(\text{int})(Dpp[s]/tT)} < 0.5 \\ T'(m, s) = (\text{int})\left(\dfrac{Dpp[s]/}{((\text{int})(Dpp[s]/tT) + 1)}\right) & \text{if} \quad \dfrac{(Dpp[s]/tT) -}{(\text{int})(Dpp[s]/tT)} \geq 0.5 \end{cases} \quad [7]$$

In equation 7, the range of s is 0≤s≤S', PDp'[s] indicates the s'th concealment pitch pulse position, and Dpp [s] indicates the s'th inter-pitch-pulse distance. In equation 8, m indicates the frame number, T'(m,s) indicates compensated pitch lag, and int( ) indicates a function that truncates a fractional part of a number. Also, tT indicates a provisional pitch lag, T'(m,s−1) or T(m−1) being used.

Using frame m last pitch pulse amplitude input from pitch pulse information decoding section 204, frame m−1 last pitch pulse amplitude input from preceding frame last pitch pulse detection section 711, pitch lag input from excitation parameter decoding section 202, and compensated pitch lag input from compensated pitch lag calculation section 712, pitch lag compensation possibility determination section 713 determines whether or not pitch lag compensation is possible on a frame-by-frame basis, and outputs "possible" or "impossible" pitch lag compensation possibility information to pitch lag switching section 715 and excitation signal compensation section 707. Pitch lag compensation possibility determination section 713 performs pitch lag compensation possibility determination by determining whether or not it is appropriate to successively line up concealment pitch pulses between the frame m−1 last pitch pulse and the frame m last pitch pulse. For example, if positivity/negativity is opposite for the frame m−1 last pitch pulse and the frame m last pitch pulse, there can be considered to be a high probability of the pitch waveform changing between frames or of there being an error in the detection of one pitch pulse or another. In such a case, an improvement in concealment performance is not obtained by successively lining up concealment pitch pulses, and therefore compensation is determined to be "impossible." Also, if the amplitude of a last pitch pulse is extremely small, there is a possibility of the signal having no pitch periodicity, and therefore in this case also, compensation is determined to be "impossible." Furthermore, if there is a large difference between the pitch lags of frames before and after the frame for which concealment is to be attempted, there is a possibility of the frame having no pitch periodicity, or of a pitch error occurring in the preceding or succeeding frame, and therefore compensation is determined to be "impossible" in this case also.

Figure 31:
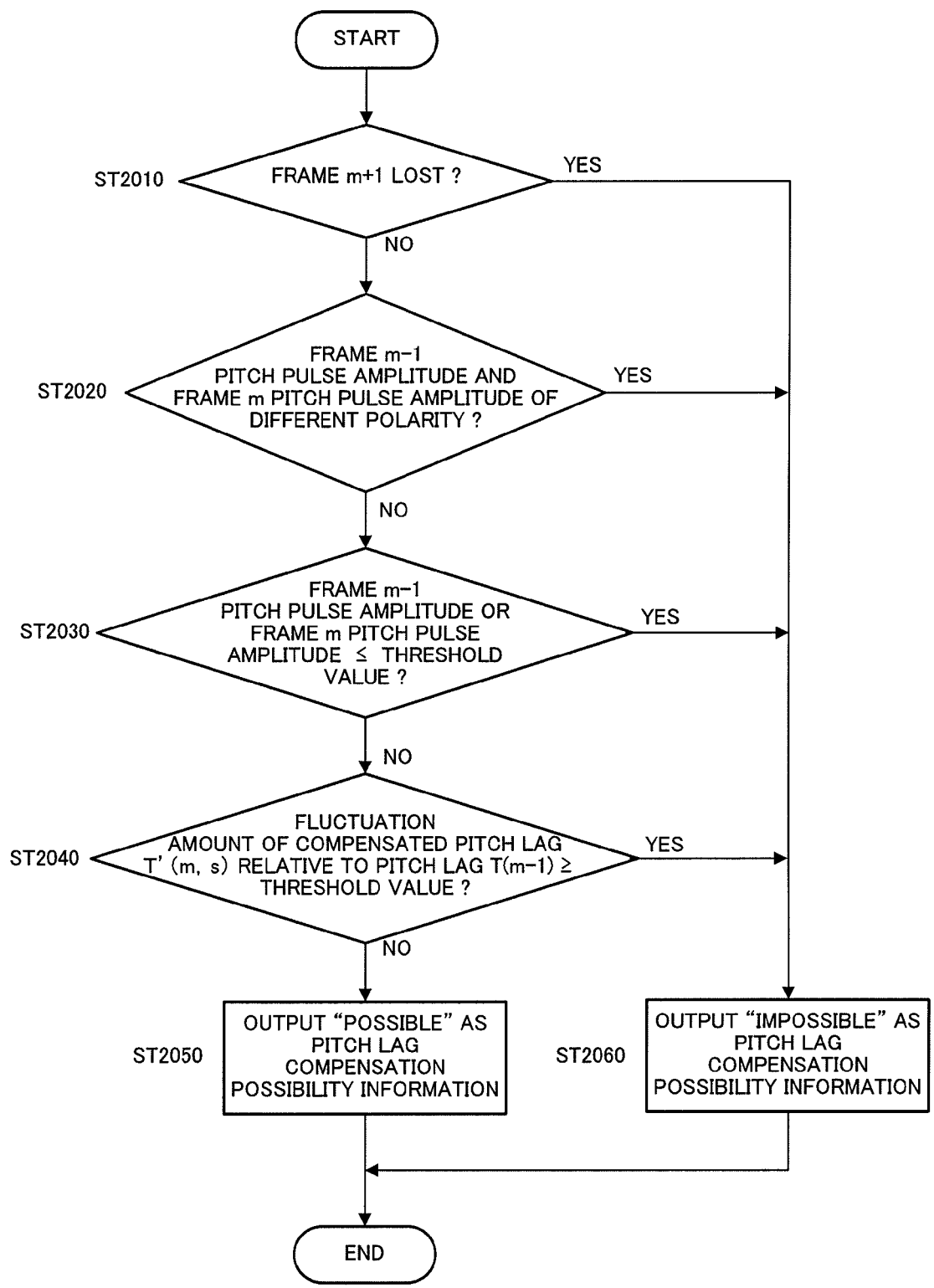
FIG. 31 is a flowchart showing the procedure whereby pitch lag compensation possibility determination is performed in a pitch lag compensation possibility determination section according to Embodiment 5.

FIG. 31 is a flowchart showing the procedure whereby pitch lag compensation possibility determination is performed in pitch lag compensation possibility determination section 713.

First, in step (ST) 2010, pitch lag compensation possibility determination section 713 determines, based on frame loss information, whether or not encoded data of frame m+1 in which frame m last pitch pulse information is included has been lost.

If it is determined in ST2010 that frame m+1 encoded data has been lost (ST2010: "YES"), pitch lag compensation is impossible, and therefore pitch lag compensation possibility determination section 713 outputs "impossible" pitch lag compensation possibility information in ST2060.

On the other hand, if it is determined in ST2010 that frame m+1 encoded data has not been lost (ST2010: "NO"), in ST2020 pitch lag compensation possibility determination section 713 determines whether or not the frame m−1 last pitch pulse amplitude and the frame m last pitch pulse amplitude have the same polarity.

If it is determined in ST2020 that the frame m−1 last pitch pulse amplitude and the frame m last pitch pulse amplitude have different polarities (ST2020: "YES"), pitch lag compensation possibility determination section 713 outputs "impossible" pitch lag compensation possibility information in ST2060.

On the other hand, if it is determined in ST2020 that the frame m−1 last pitch pulse amplitude and the frame m last pitch pulse amplitude have the same polarity (ST2020: "NO"), in ST2030 pitch lag compensation possibility determination section 713 determines whether or not the frame m−1 last pitch pulse amplitude or frame m last pitch pulse amplitude is sufficiently small to be less than or equal to a predetermined threshold value.

If it is determined in ST2030 that the frame m−1 last pitch pulse amplitude or frame m last pitch pulse amplitude is less than or equal to a predetermined threshold value (ST2030: "YES"), pitch lag compensation possibility determination section 713 outputs "impossible" pitch lag compensation possibility information in ST2060.

On the other hand, if it is determined in ST2030 that neither the frame m−1 last pitch pulse amplitude nor the frame m last pitch pulse amplitude is less than or equal to a predetermined threshold value (ST2030: "NO"), in ST2040 pitch lag compensation possibility determination section 713 determines whether or not the amount of fluctuation of compensated pitch lag T'(m,s) with respect to pitch lag T(m−1) is greater than or equal to a predetermined threshold value.

If it is determined in ST2040 that the amount of fluctuation between compensated pitch lag T'(m,s) and pitch lag T(m−1) is greater than or equal to a predetermined threshold value (ST2040: "YES"), pitch lag compensation possibility determination section 713 outputs "impossible" pitch lag compensation possibility information in ST2060. In ST2040, it is determined that pitch lag compensation is to be aborted if the compensated pitch lag fluctuates greatly with respect to a past pitch lag. In this determination, it can be determined whether or not the ratio between past pitch lag and the difference between past pitch lag and compensated pitch lag exceeds a previously decided threshold value. The threshold value only needs to be decided in advance. For example, pitch lag compensation possibility determination section 713 may determine in ST2040 that the pitch lag fluctuation amount is greater than or equal to a threshold value (ST2040: "YES") if the following mathematical expression is satisfied.

$$|T(m-1)-T'(m,s)|/T'(m,s) \geq 0.1 \quad \text{(Equation 9)}$$

On the other hand, if it is determined in ST2040 that the amount of fluctuation between compensated pitch lag T'(m,s) and pitch lag T(m−1) is not greater than or equal to a predetermined threshold value (ST2040: "NO"), pitch lag compensation possibility determination section 713 outputs "possible" pitch lag compensation possibility information in ST2050. For example, pitch lag compensation possibility determination section 713 may determine in ST2040 that the pitch lag fluctuation amount is not greater than or equal to a threshold value (ST2040: "NO") if the following mathematical expression is satisfied.

$$|T(m-1)-T'(m,s)|/T'(m,s) < 0.1 \quad \text{(Equation 10)}$$

Returning once more to FIG. 30, using a frame m−1 last pitch pulse position input from preceding frame last pitch pulse detection section 711 and compensated pitch lag T'(m,s) (where $0 \leq s \leq S'$) input from compensated pitch lag calculation section 712, concealment pitch pulse position calculation section 714 calculates concealment pitch pulse position PDp'[s] (where $0 \leq s \leq S'$) in accordance with equation 11 below, and outputs this to compensated pitch lag calculation section 712 and excitation signal compensation section 707. Specifically, concealment pitch pulse position calculation section 714 first calculates PDp'[1] in accordance with equation 11 below using frame m−1 last pitch pulse position PDp[0] input from preceding frame last pitch pulse detection section 711 and compensated pitch lag T'(m,0) input from compensated pitch lag calculation section 712, outputs this to excitation signal compensation section 707, and also feeds it back to compensated pitch lag calculation section 712. Then compensated pitch lag calculation section 712 calculates compensated pitch lag T'(m,1) in accordance with equation 7 and equation 8 above using PDp [1], and outputs this to concealment pitch pulse position calculation section 714. By repeating such calculations, concealment pitch pulse position calculation section 714 and compensated pitch lag calculation section 712 successively calculate concealment pitch pulse position PDp'[s] and compensated pitch lag T'(m,s) until PDp'[S'] coincides with frame m last pitch pulse position PPp.

$$PDp'[s]=PDp[s-1]+T'(m,s-1) \text{ if } (s>0) \text{ and } PDp'[s] \leq PPp \quad \text{(Equation 11)}$$

If the pitch lag compensation possibility determination result input from pitch lag compensation possibility determination section 713 is "possible," pitch lag switching section 715 outputs compensated pitch lag T'(m, s) input from compensated pitch lag calculation section 712 to decoded excitation generation section 703, and if the pitch lag compensation possibility determination result is "impossible," pitch lag switching section 715 outputs pitch lag T(m) input from excitation parameter decoding section 202 to decoded excitation generation section 703.

Figure 32:
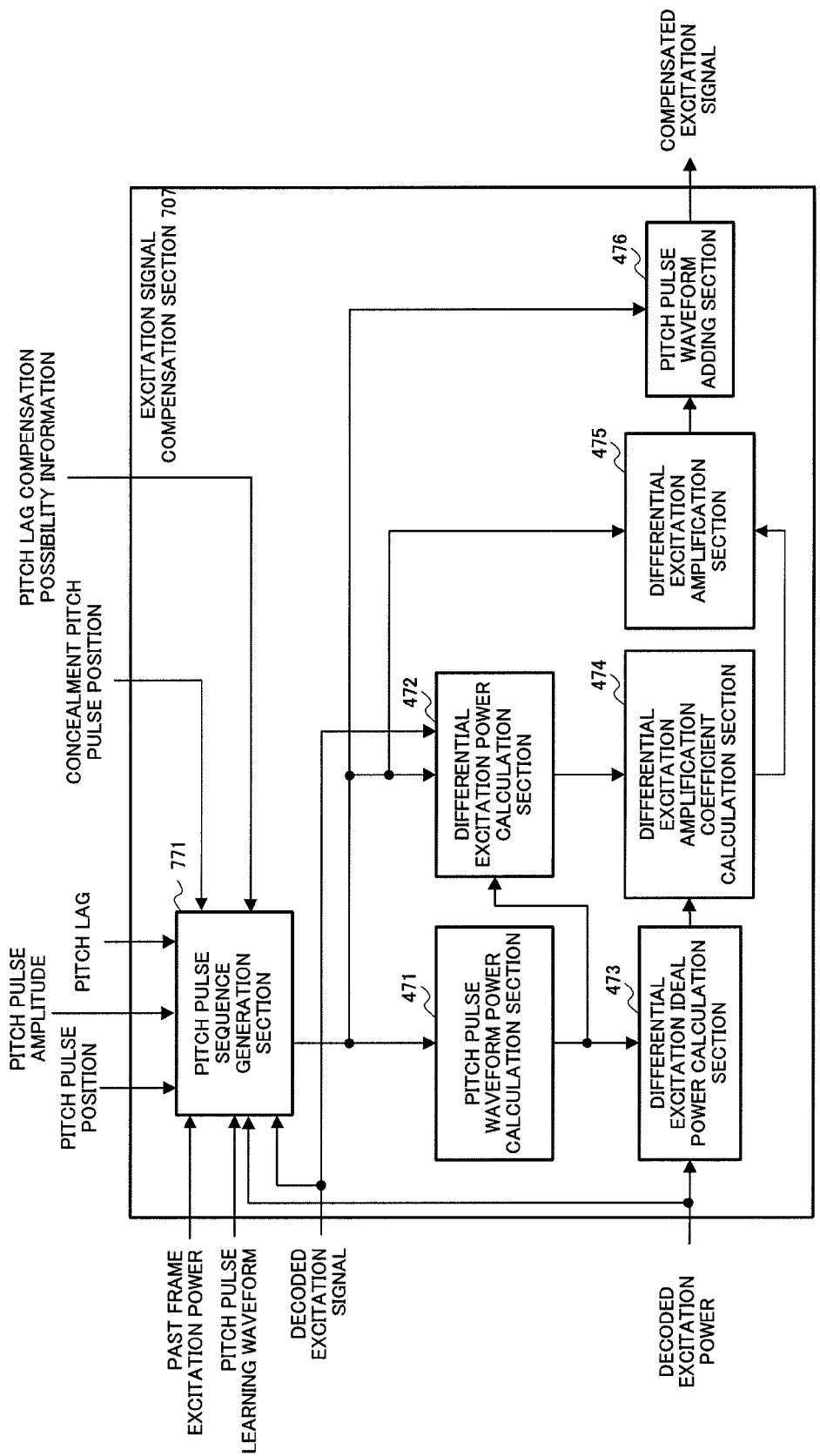
FIG. 32 is a block diagram showing the internal configuration of an excitation signal compensation section according to Embodiment 5.

FIG. 32 is a block diagram showing the internal configuration of excitation signal compensation section 707. Excitation signal compensation section 707 has the same kind of basic configuration as excitation signal compensation section 607 according to Embodiment 4, and therefore identical configuration elements are assigned the same reference codes, and descriptions thereof are omitted.

Excitation signal compensation section 707 differs from excitation signal compensation section 607 according to Embodiment 4 only in that a concealment pitch pulse position from concealment pitch pulse position calculation section 714 and pitch lag compensation possibility information from pitch lag compensation possibility determination section 713 are additionally input to pitch pulse sequence generation section 771. Accordingly, the internal configuration and processing differ in part between pitch pulse sequence generation section 771 of excitation signal compensation section 707 and pitch pulse sequence generation section 671 of excitation signal compensation section 607, and different reference codes are assigned to indicate this.

Figure 33:
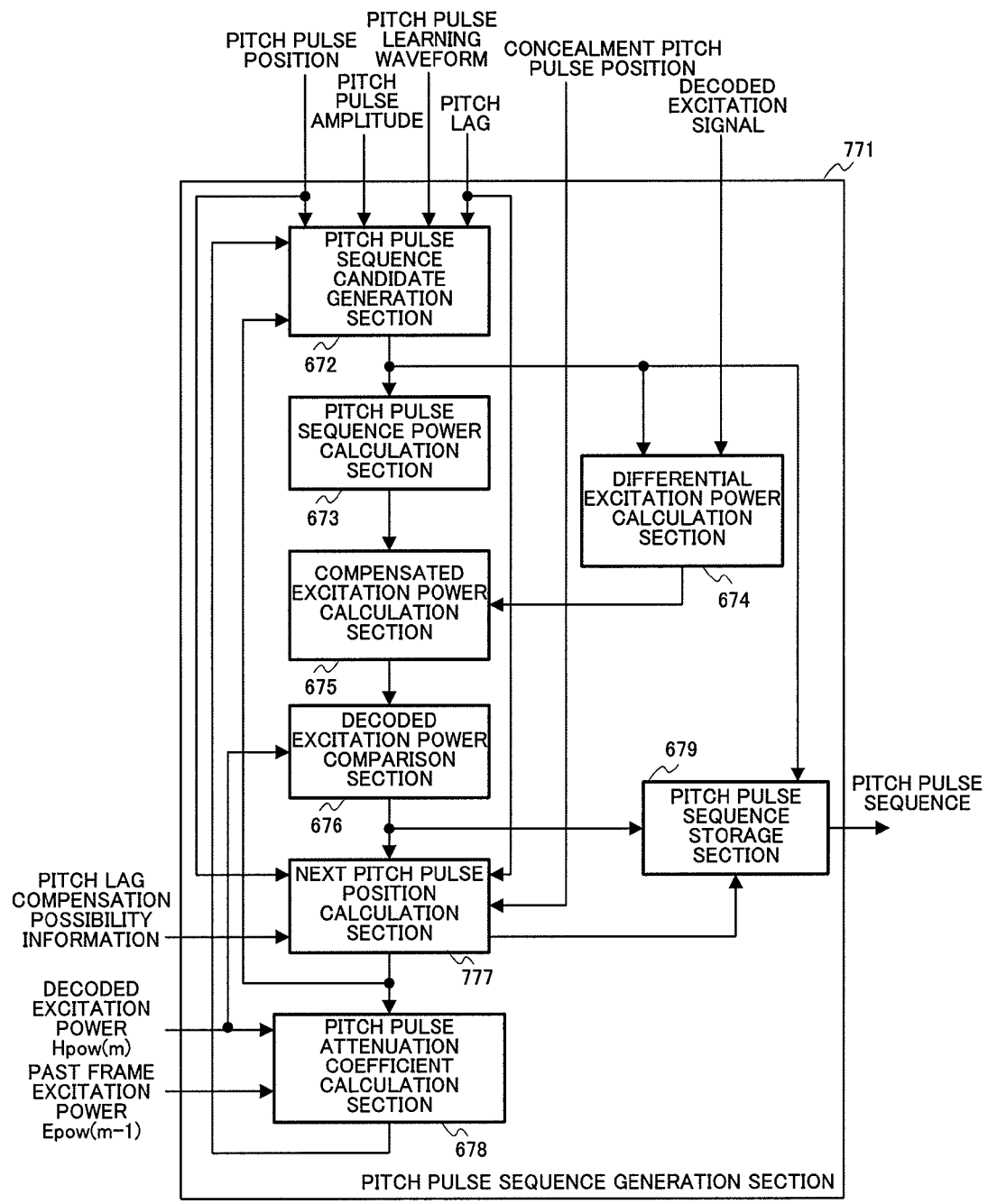
FIG. 33 is a block diagram showing the internal configuration of a pitch pulse sequence generation section according to Embodiment 5.

FIG. 33 is a block diagram showing the internal configuration of pitch pulse sequence generation section 771. Pitch pulse sequence generation section 771 has the same kind of basic configuration as pitch pulse sequence generation section 671 according to Embodiment 4, and therefore identical configuration elements are assigned the same reference codes, and descriptions thereof are omitted.

Pitch pulse sequence generation section 671 according to Embodiment 4 presupposes operation in a speech onset section, but in the case of operation in a voiced steady-state section, there is a possibility that the position of a pitch pulse waveform added to a decoded excitation signal and the position of a pitch pulse waveform contained in an ideal decoded excitation signal will not coincide, and therefore there is a possibility of disruption of decoded speech pitch periodicity and a sense of abnormal noise. Thus, pitch pulse sequence generation section 771 according to this embodiment improves decoded excitation signal quality without impairing the steady-state nature of speech by adding a pitch pulse waveform to a decoded excitation signal using a concealment pitch pulse position.

Specifically, pitch pulse sequence generation section 771 differs from pitch pulse sequence generation section 671 according to Embodiment 4 only in that a concealment pitch pulse position from concealment pitch pulse position calculation section 714 and pitch lag compensation possibility information from pitch lag compensation possibility determination section 713 are additionally input to next pitch pulse position calculation section 777. Accordingly, the internal configuration and processing differ in part between next pitch pulse position calculation section 777 of pitch pulse sequence generation section 771 and next pitch pulse position calculation section 677 of pitch pulse sequence generation section 671, and different reference codes are assigned to indicate this.

If pitch lag compensation possibility information from pitch lag compensation possibility determination section 713 is "impossible," next pitch pulse position calculation section 777 performs the same kind of operation as next pitch pulse position calculation section 677 according to Embodiment 4, and a detailed description thereof is omitted here.

On the other hand, if pitch lag compensation possibility information from pitch lag compensation possibility determination section 713 is "possible," next pitch pulse position calculation section 777 calculates a next pitch pulse position using a concealment pitch pulse position input from concealment pitch pulse position calculation section 714 instead of pitch lag input from excitation parameter decoding section 202. Specifically, only if the power comparison result input from decoded excitation power comparison section 676 is "small," next pitch pulse position calculation section 777 outputs PDp'[S'−p] as a next pitch pulse position represented by number p to pitch pulse sequence candidate generation section 672, pitch pulse attenuation coefficient calculation section 678, and pitch pulse sequence storage section 679. That is to say, next pitch pulse position calculation section 777 takes frame m last pitch pulse position PPp as an initial value, and sequentially outputs PDp'[S'−1], . . . PDp'[2], PDp' [1] as next pitch pulse positions. Also, since a concealment pitch pulse position is always present within the frame m range, next pitch pulse position calculation section 777 outputs "possible" next pitch pulse addition possibility information when pitch lag compensation possibility information is "possible" and a power comparison result input from decoded excitation power comparison section 676 is "small," and outputs "impossible" next pitch pulse addition possibility information otherwise.

Thus, according to this embodiment, a speech encoding apparatus adds an integral number of pitch pulses between a lost frame last pitch pulse position and a pre-lost frame last pitch pulse position in a decoded excitation signal, without increasing the amount of information transmitted from the speech encoding apparatus to a speech decoding apparatus. That is to say, a position of a pitch pulse waveform added to a decoded excitation signal is adjusted so as to coincide better with a position of a pitch pulse waveform contained in an ideal decoded excitation signal, enabling decoded speech signal quality to be improved without increasing noise or a sense of fluctuation, while reducing the amount of encoded information.

In this embodiment, in the explanation of FIG. 28B a case has been described by way of example in which pitch lag T(m−1) is used as concealment pitch lag T'(m), but the present invention is not limited to this, and T(m+1) may also be used as concealment pitch lag T'(m), in which case the position of a pitch pulse waveform added at the end of frame m does not coincide PPp, and a pseudo-pitch-pulse appears in a compensated decoded excitation signal.

In this embodiment, a case has been described by way of example in which preceding frame last pitch pulse detection section 711 detects the position and amplitude of a frame m−1 last pitch pulse using the same kind of method as used to detect frame n pitch pulse position PPp in pitch pulse detection section 192 on the speech encoding apparatus side, but the present invention is not limited to this, and if the frame m−1 last pitch pulse position and pitch pulse amplitude are obtained from pitch pulse information decoding section 204, preceding frame last pitch pulse detection section 711 may use these.

In this embodiment, a case has been described by way of example in which pitch lag is expressed only as an integer value, and a fractional part is truncated using the int( ) function in equation 8 employed by compensated pitch lag calculation section 712, but the present invention is not limited to this, and if pitch lag is to be expressed with fractional precision, compensated pitch lag may be calculated without using int( ) in equation 8.

In this embodiment, a case has been described by way of example in which T'(m,s−1) or T(m−1) is used as provisional pitch lag tT in equation 8, but the present invention is not limited to this, and T(m+1) may also be used as provisional pitch lag tT in equation 8, and furthermore an interpolated correlation value between T'(m,s−1) and T(m+1)—for example, (T'(m,s−1)+T(m+1))/2—may also be used.

In this embodiment, a case has been described by way of example in which one or other of T'(m,s−1) or T(m−1) is used unvaryingly as provisional pitch lag tT when calculating compensated pitch lag T'(m,s), but the present invention is not limited to this, and one that brings Dpp[s]/tT closest to an integer value may be selected for use from T'(m,s−1), T(m−1), T(m+1), and an interpolated correlation value between T'(m,s−1) and T(m+1). Also, generally, in CELP speech encoding, there is a possibility of pitch lag having a value 2 times or 0.5 times the originally expected pitch period, such as a double pitch period or half pitch period, and therefore pitch lag compensation may be performed after detecting whether or not a double pitch period or half pitch period is implemented using a past pitch lag sequence or a past pitch lag sequence and future pitch lag sequence, and compensating a double pitch period or half pitch period if detected.

In this embodiment, a case has been described by way of example in which, when a pitch lag compensation possibility determination result input from pitch lag compensation possibility determination section 713 is "possible," pitch lag switching section 715 outputs compensated pitch lag T'(m,s) input from compensated pitch lag calculation section 712, but the present invention is not limited to this, and pitch lag switching section 715 may output provisional pitch lag tT when a pitch lag compensation possibility determination result input from pitch lag compensation possibility determination section 713 is "possible."

In this embodiment, a case has been described by way of example in which compensated pitch lag calculation section 712 and concealment pitch pulse position calculation section 714 sequentially calculate a compensated pitch lag and concealment pitch pulse position using each other's calculation results, but the present invention is not limited to this, and a compensated pitch lag and concealment pitch pulse position may also be calculated together.

In this embodiment, a case has been described by way of example in which concealment is performed using a concealment parameter in a lost frame, but a decoded excitation signal compensation method according to the present invention is not limited to only a lost frame, and even with a normally received frame subsequent to a recovered frame, concealment may be performed using a concealment parameter for concealment of the relevant frame, and application of the present invention is also possible to a case in which there is a difference between decoded concealment excitation power, concealment pitch pulse position, or the like, and a concealment parameter.

Embodiment 6

Embodiment 6 of the present invention differs from Embodiment 5 in that, when generating a pitch pulse sequence used for compensation of a decoded excitation signal, a pitch pulse obtained by amplifying part of the decoded excitation signal is used instead of using a pitch pulse learning waveform. In the following description, a pitch pulse obtained by amplifying part of a decoded excitation signal is referred to as a decoded excitation pitch pulse waveform.

FIG. 34 and FIG. 35 are drawings for explaining a method of compensating a decoded excitation signal using a decoded excitation pitch pulse waveform in this embodiment.

Figure 34A:
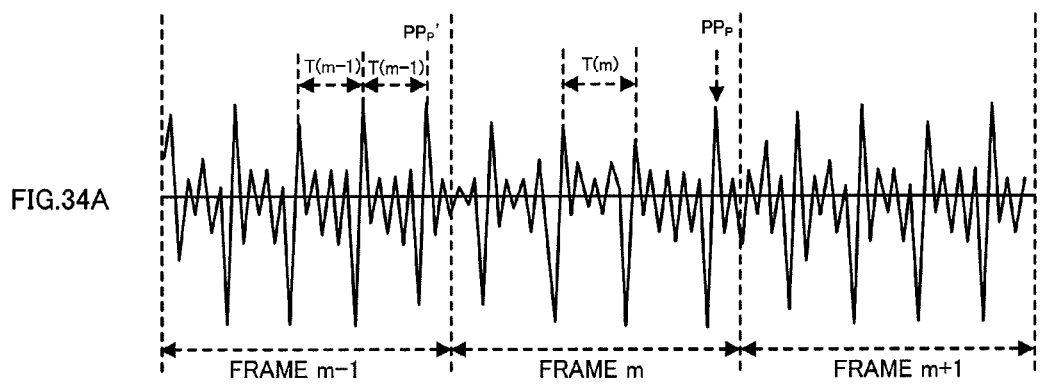
FIG. 34 is a drawing for explaining a method of compensating a decoded excitation signal using a decoded excitation pitch pulse waveform according to Embodiment 6.

FIG. 34A is a drawing showing a waveform of an ideal decoded excitation signal when frame loss has not occurred. FIG. 34A shows pitch lag T(m−1) of frame m−1, pitch lag T(m) of frame m, frame m last pitch pulse position PPp, and frame m−1 last pitch pulse position PPp'. That is to say, FIG. 34A is similar to FIG. 28A.

Figure 34B:
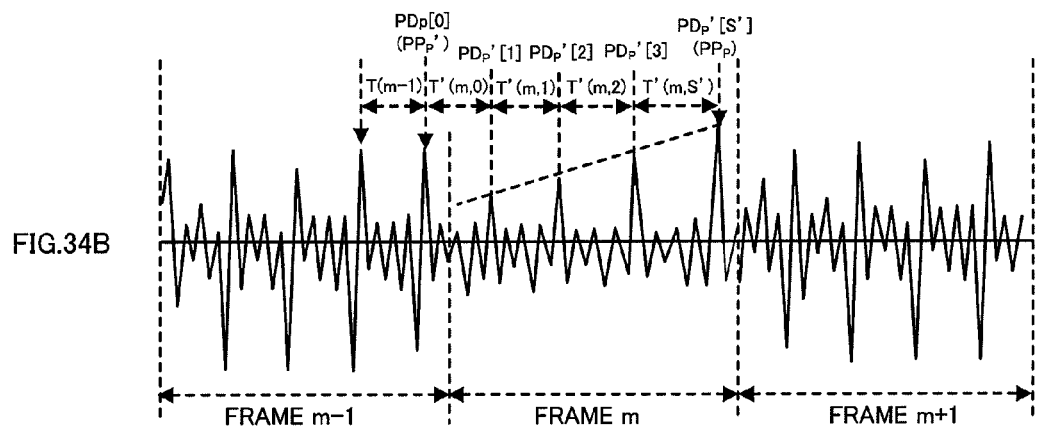
Figure 34C:

FIG. 34B is a drawing showing a waveform of a compensated decoded excitation signal obtained by compensating a decoded excitation signal using the method shown in Embodiment 5 when frame m−1 and frame m+1 are received normally but frame m is lost. FIG. 34C is a drawing showing a pitch pulse learning waveform used to obtain the compensated decoded excitation signal shown in FIG. 34B, and illustrates a pitch pulse learning waveform that does not resemble a pitch pulse waveform contained in the ideal decoded excitation signal shown in FIG. 34A. As shown in FIG. 34B, according to the decoded excitation signal compensation method shown in Embodiment 5, when a pitch pulse learning waveform used for compensation does not resemble a pitch pulse waveform of an ideal decoded excitation signal, an obtained compensated decoded excitation signal waveform also does not resemble an ideal decoded excitation signal, and degradation of decoded speech quality occurs. Specifically, in the ideal decoded excitation signal waveform shown in FIG. 34A, pitch peaks are present both above and below the horizontal axis, whereas in the compensated decoded excitation signal waveform shown in FIG. 34B, pitch peaks are present only above the horizontal axis. The reason for this is that pitch peaks are present only above the horizontal axis in the pitch pulse learning waveform shown in FIG. 34C used to obtain FIG. 34B. Thus, if a pitch pulse learning waveform cannot follow pitch pulse waveform changes in an ideal decoded excitation signal in this way, decoded speech quality actually degrades as a result of this kind of compensation.

Thus, when there is high correlativity between pitch pulses contained in a frame m−1 excitation signal (decoded excitation signal), a compensated decoded excitation signal more closely resembling an ideal decoded excitation signal can be expected to be obtained by compensating a decoded excitation signal using a past decoded excitation pitch pulse waveform instead of using a pitch pulse learning waveform.

Figure 35A:
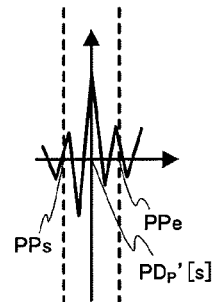
FIG. 35 is a drawing for explaining a method of compensating a decoded excitation signal using a decoded excitation pitch pulse waveform according to Embodiment 6.
Figure 35B:
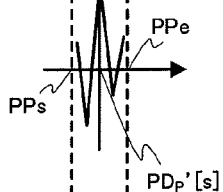
Figure 35C:
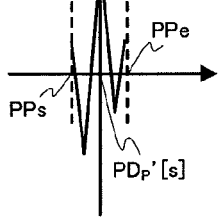

FIG. 35A, FIG. 35B, and FIG. 35C are drawings for explaining a method of generating a decoded excitation pitch pulse waveform obtained by amplifying part of a decoded excitation signal. FIG. 35A shows a section in the vicinity of concealment pitch pulse position PDp'[s] (where 0≤s≤S') in a decoded excitation signal, and FIG. 35B shows a pitch pulse waveform obtained by extracting the section from PPs to PPe from the waveform shown in FIG. 35A. FIG. 35C shows a decoded excitation pitch pulse obtained by amplifying the pitch pulse waveform shown in FIG. 35B. Here, the method of deciding starting point PPs and endpoint PPe of a decoded excitation pitch pulse waveform—that is, the method of deciding the number of decoded excitation pitch pulse waveform samples—is similar to the method of deciding the number of pitch pulse learning waveform samples shown in Embodiment 1. The method of amplifying the pitch pulse waveform shown in FIG. 35B will be described later herein.

Figure 35D:
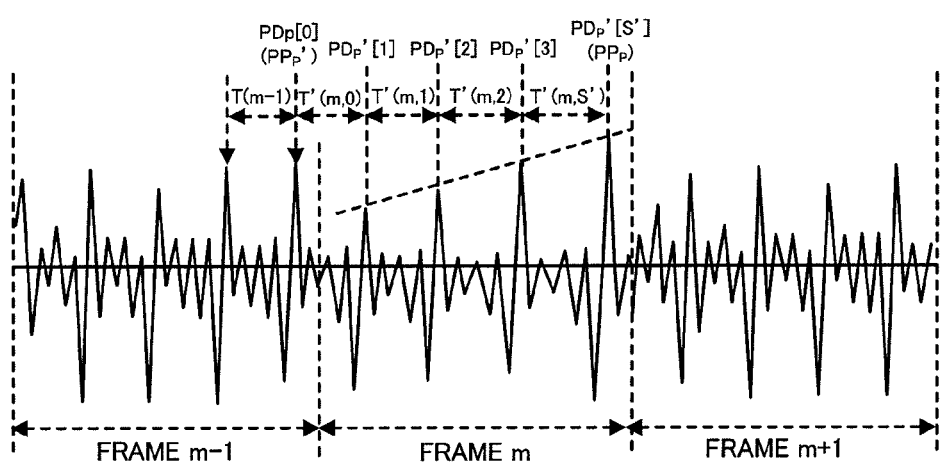

FIG. 35D is a drawing showing a compensated decoded excitation signal waveform obtained by multiple additions of a decoded excitation pitch pulse waveform such as shown in FIG. 35C to a decoded excitation signal. As can be seen from FIG. 35A, FIG. 35B, FIG. 35C, and FIG. 35D, the compensated decoded excitation signal shown in FIG. 35D more closely resembles the ideal decoded excitation signal shown in FIG. 34A than the compensated decoded excitation signal shown in FIG. 34B.

Figure 36:
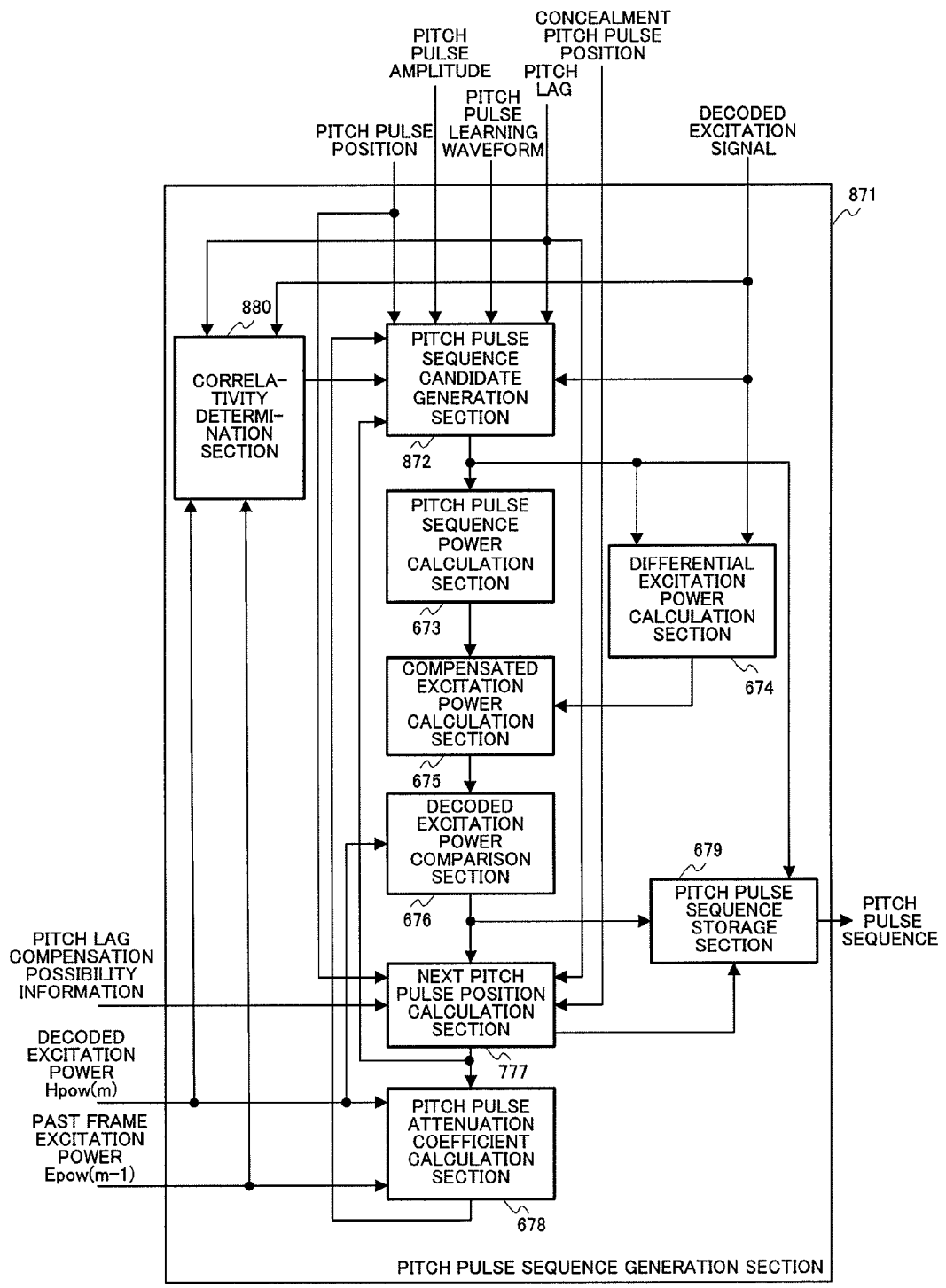
FIG. 36 is a block diagram showing the internal configuration of a pitch pulse sequence generation section according to Embodiment 6.

FIG. 36 is a block diagram showing the internal configuration of pitch pulse sequence generation section 871 according to this embodiment. Pitch pulse sequence generation section 871 has the same kind of basic configuration as pitch pulse sequence generation section 771 according to Embodiment 5, and therefore identical configuration elements are assigned the same reference codes, and descriptions thereof are omitted.

Pitch pulse sequence generation section 871 differs from pitch pulse sequence generation section 771 according to Embodiment 5 in being additionally equipped with correlativity determination section 880. Pitch pulse sequence candidate generation section 872 of pitch pulse sequence generation section 871 differs from pitch pulse sequence candidate generation section 672 of pitch pulse sequence generation section 771 in that a correlativity determination result from correlativity determination section 880 and a decoded excitation signal from decoded excitation generation section 703 are additionally input. Processing differs in part accordingly, and different reference codes are assigned to indicate this.

Using pitch lag input from excitation parameter decoding section 202, a decoded excitation signal input from decoded excitation generation section 703, decoded excitation power Hpow(m) input from excitation power decoding section 402, and past frame excitation power Epow(m−1) input from excitation power storage section 601, correlativity determination section 880 estimates correlativity between pitch pulse waveforms in the current frame, and outputs a "high correlation" or "low correlation" determination result to pitch pulse sequence candidate generation section 872. Specifically, a "high correlation" correlativity determination result is output if equation 12, equation 13, and equation 14 below are simultaneously satisfied, and a "low correlation" correlativity determination result is output otherwise.

$$\epsilon s \leq C(m-1) \qquad \text{(Equation 12)}$$

$$1/\epsilon p \leq Pr < \epsilon p \qquad \text{(Equation 13)}$$

$$1/\epsilon t \leq Tr < \epsilon t \qquad \text{(Equation 14)}$$

C(m−1) in equation 12 is a value whereby a normalized autocorrelation value is found for a decoded excitation signal of frame m−1 in accordance with equation 15 below.

(Equation 15)

$$C(m-1) = \frac{\sum_{i=1}^{\tau} exc[\text{L\_EXCMAX} - i] * exc[\text{L\_EXCMAX} - i - \tau]}{\sum_{i=1}^{\tau} exc[\text{L\_EXCMAX} - i] * exc[\text{L\_EXCMAX} - i]} \qquad [8]$$

In equation 15, exc[ ] indicates a decoded excitation signal, and L_EXCMAX indicates the buffer size. Also, τ indicates a delay value, pitch lag T(m−1) being used.

Pr in equation 13 is a power fluctuation amount calculated in accordance with equation 16 below, expressed as a ratio between past frame excitation power Epow(m−1) and decoded excitation power Hpow(m).

$$Pr = Epow(m-1)/Hpow(m) \quad \text{(Equation 16)}$$

Tr in equation 14 is a pitch lag fluctuation amount calculated in accordance with equation 17 below, expressed as a ratio between frame m−1 pitch lag T(m−1) and frame m+1 pitch lag T(m+1).

$$Tr = T(m-1)/T(m+1) \quad \text{(Equation 17)}$$

Terms εs, εp, and εt in equation 12, equation 13, and equation 14 respectively are assumed to have the following values, for example: εs=0.8, εp=1.5, εt=1.2.

When a correlativity determination result input from correlativity determination section 880 is "low correlation," pitch pulse sequence candidate generation section 872 performs the same kind of operation as pitch pulse sequence candidate generation section 672 according to Embodiment 5. When a correlativity determination result input from correlativity determination section 880 is "high correlation," pitch pulse sequence candidate generation section 872 performs basically the same kind of operation as pitch pulse sequence candidate generation section 672 according to Embodiment 5, with the difference that a decoded excitation signal is compensated using a decoded excitation pitch pulse generated from a decoded excitation signal input from decoded excitation generation section 703 instead of a pitch pulse learning waveform input from pitch pulse waveform learning section 205. Here, a "high correlation" correlativity determination result means that the current frame is a voiced steady-state section.

Specifically, when a correlativity determination result input from correlativity determination section 880 is "high correlation," pitch pulse sequence candidate generation section 872 performs the following operations to generates S' decoded excitation pitch pulses. First, centering on concealment pitch pulse position PDp[s] (where 0≤s≤S') input from next pitch pulse position calculation section 777, pitch pulse sequence candidate generation section 872 extracts a section from PPs to PPe from a decoded excitation signal input from decoded excitation generation section 703. Then pitch pulse sequence candidate generation section 872 amplifies the decoded excitation signal of the extracted section so that the amplitude of the PDp'[s] (where 0≤s≤S') position coincides with a value obtained by multiplying pitch pulse amplitude PPa input from pitch pulse information decoding section 204 by a pitch pulse attenuation coefficient input from pitch pulse attenuation coefficient calculation section 678. At this time, amplitude at the next pitch pulse position is amplified to the above amplitude, and windowing is performed so that the amplification coefficient at the decoded excitation pitch pulse waveform endpoint becomes a value close to 1.0. As a result, a decoded excitation pitch pulse waveform is obtained. The reason for performing windowing here is that, if all the samples of the decoded excitation signal of the extracted section are amplified using the same amplification coefficient, there is a possibility of a large difference between the post-amplification amplitude of the endpoint of the extracted section and the amplitude at a sample of a decoded excitation signal touching a decoded excitation pitch pulse waveform. Therefore, to avoid such an occurrence, by increasing the amplification coefficient at the midpoint of the extracted section and decreasing the amplification coefficient at the endpoint, the maximum amplitude of a decoded excitation pitch pulse waveform is amplified appropriately, and a decoded excitation pitch pulse waveform and a decoded excitation signal adjacent to the decoded excitation pitch pulse waveform are connected smoothly. As a result, a sense of power fluctuation of an obtained compensated decoded excitation signal is alleviated.

Thus, according to this embodiment, decoded excitation signal compensation is performed using a decoded excitation pitch pulse instead of a pitch pulse learning waveform when a frame is lost in a voiced steady-state section, enabling a compensated decoded excitation signal that is closer to an ideal decoded excitation signal when frame loss does not occur to be obtained, and enabling decoded speech clarity to be further improved, and decoded speech quality to be improved.

In this embodiment, a case has been described by way of example in which windowing is used when a decoded excitation pitch pulse waveform is generated by amplifying a decoded excitation signal of an extracted section, but the present invention is not limited to this, and it is also possible to increase the amplification coefficient at the next pitch pulse position and decrease the amplification coefficient at the endpoint of the extracted section, and use another window that has a function of alleviating a sense of power fluctuation of an obtained decoded excitation pitch pulse waveform.

In this embodiment, a case has been described by way of example in which the amplitude value of the center sample (concealment pitch pulse position) is largest in a decoded excitation pitch pulse waveform used for decoded excitation signal compensation, but depending on the case, a decoded excitation pitch pulse need not be added to a decoded excitation signal. That is to say, a decoded excitation pitch pulse need not be added to a decoded excitation signal (1) when the amplitude of another sample is larger than that of the center sample, or (2) when the amplitude of a concealment pitch pulse position of a decoded excitation signal is larger than the amplitude value of the center sample of a decoded excitation pitch pulse waveform, or (3) when the amplitude value of the center sample of a decoded excitation pitch pulse waveform and the amplitude value of the frame m last pitch pulse decoded in pitch pulse information decoding section 204 have opposite polarities (signs).

A case has been described by way of example in which preceding frame last pitch pulse detection section 711 detects the position and amplitude of a frame m−1 last pitch pulse using the same kind of method as used to detect frame n pitch pulse position PPp in pitch pulse detection section 192 on the speech encoding apparatus side, but there are cases in which past frame pitch pulses cannot be generated repeatedly, or repeated generation is performed as far as a superfluous pitch pulse. The reason for this is that, generally, concealment pitch lag T'(m) in a lost frame—that is, pitch lag T(m−1)—is different from pitch lag T(m) of frame m of an ideal decoded excitation signal. For example, concealment pitch lag T'(m)—that is, T(m−1)—may be shorter than pitch lag T(m), the frame m−1 last pitch pulse may not appear in frame m. Specifically, this phenomenon tends to occur when the frame m−1 last pitch pulse position is present in the vicinity of a position separated by T(m−1) in the past direction from the boundary between frame m−1 and frame m. That is to say, if compensated pitch lag T'(m,s) becomes shorter than the distance between the frame m−1 last pitch lag position and the frame m boundary, a phenomenon occurs whereby a frame m−1 pitch pulse cannot be incorporated in an adaptive codebook in frame m. To prevent this, it is necessary for compensated pitch lag to be further compensated so as to become greater than or equal to the distance between the frame m−1 last pitch lag position and the frame m boundary. On the other hand, if concealment pitch lag T'(m)—that is, T(m−1)—is longer than pitch lag T(m), a pitch pulse at a position one pitch lag further in the past from the frame m−1 last pitch pulse position (called a pseudo-past-pitch-pulse) is generated repeatedly in frame m. Generation is possible when the frame m−1 last pitch pulse is present at a position near frame m and compensated pitch lag T'(m,s) is calculated as longer than T(m−1). Specifically, the conditions for this phenomenon can be detected as applying when compensated pitch lag T'(m,s) is longer than the total of pitch lag T(m−1) and the distance between the frame m−1 last pitch pulse position and the frame m boundary. When the above phenomenon is detected, following countermeasures (1) and (2) can be taken, for example. (1) Shorten compensated pitch lag T'(m,s). Specifically, first make the compensated pitch lag T(m−1), then total of pitch lag T(m−1) and the distance between the frame m−1 last pitch pulse position and the frame m boundary, and make an interpolation point of the total value and T(m−1) compensated pitch lag T'(m,s). (2) Eliminate a pseudo-past-pitch-pulse. Specifically, first perform frame m frame loss concealment after making the amplitude of a section in which a pseudo-pitch-pulse is present zero in the adaptive codebook, then eliminate a pseudo-past-pitch-pulse by means of the pseudo-pitch-pulse elimination method described in Embodiment 3. In excitation signal compensation section 707, a pseudo-past-pitch-pulse can be eliminated by changing the operation of pseudo-pitch-pulse detection section 571. The difference from the operation in pseudo-pitch-pulse detection section 571 is that the total value of pitch lag T(m−1) and the distance between the frame m−1 last pitch pulse position and the frame m boundary is taken as a pseudo-past-pitch-pulse. The process for eliminating a subsequent pseudo-pitch-pulse is the same. Alternatively, the same kind of effect as described above may also be obtained by setting in advance a minimum value and maximum value of a value that is possible when calculating compensated pitch lag instead of adding an addition compensation to compensated pitch lag as described above.

This concludes a description of embodiments of the present invention.

A speech decoding apparatus and speech encoding apparatus according to the present invention are not limited to the above-described embodiments, and various variations and modifications may be possible without departing from the scope of the present invention. For example, it is possible for embodiments to be implemented by being combined appropriately.

An excitation codebook comprises a noise codebook and an adaptive codebook, and a noise codebook may also be called a fixed codebook, stochastic codebook, or random codebook. An adaptive codebook may also be called an adaptive excitation codebook.

It is possible for a speech decoding apparatus and speech encoding apparatus according to the present invention to be installed in a communication terminal apparatus and base station apparatus in a mobile communication system, by which means a communication terminal apparatus, base station apparatus, and mobile communication system can be provided that have the same kind of operational effects as described above.

A case has here been described by way of example in which the present invention is configured as hardware, but it is also possible for the present invention to be implemented by software. For example, the same kind of functions as those of a speech encoding apparatus and speech decoding apparatus according to the present invention can be implemented by writing an algorithm of an encoding method and decoding method according to the present invention in a programming language, storing this program in memory, and having it executed by an information processing means.

The function blocks used in the descriptions of the above embodiments are typically implemented as LSIs, which are integrated circuits. These may be implemented individually as single chips, or a single chip may incorporate some or all of them.

Here, the term LSI has been used, but the terms IC, system LSI, super LSI, ultra LSI, and so forth may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosures of Japanese Patent Application No. 2006-192071, filed on Jul. 12, 2006, Japanese Patent Application No. 2006-338981, filed on Dec. 15, 2006, and Japanese Patent Application No. 2007-053547, filed on Mar. 3, 2007, including the specifications, drawings and abstracts, are incorporated herein by reference in their entirety.

INDUSTRIAL APPLICABILITY

A speech decoding apparatus and speech encoding apparatus according to the present invention can be applied to such uses as CELP encoding frame loss concealment processing.

The invention claimed is:
1. A speech decoding apparatus, comprising:
a receiver that receives frame loss information identifying a first frame that is a lost frame and speech encoded data of a second frame subsequent to the first frame wherein the speech encoded data includes an encoded excitation signal parameter of the second frame and, if encoded pitch pulse information of the first frame exists, the encoded pitch pulse information of the first frame;
a first decoder that decodes the encoded pitch pulse information, if the encoded pitch pulse information exists, to acquire a pitch pulse position and pitch pulse amplitude information of the first frame;
a second decoder that decodes the encoded excitation signal parameter to acquire excitation signal parameters;
a decoded excitation generation section that performs CELP decoding and concealment processing of a lost frame, and generates a decoded excitation signal using the excitation signal parameters;
a pitch pulse waveform learning section that analyzes whether a steady-state is present in the decoded excitation signal, and if the steady-state is present, detects peak position in the decoded excitation signal and extracts a predetermined number of samples peripheral to the peak position and performs learning of a pitch pulse waveform by smoothing the extracted samples with a past pitch pulse learning waveform and generates a learned pitch pulse waveform;
an excitation signal compensation section that adjusts the amplitude of the learned pitch pulse waveform according to the pitch pulse amplitude information of the first frame and adds the learned pitch pulse waveform to the decoded excitation signal according to the pitch pulse position of the first frame to generate a compensated excitation signal; and an excitation signal selection section that selects the decoded excitation signal if the frame loss information does not indicates a frame loss and selects the compensated excitation signal if the frame loss information does indicate a frame loss.

2. The speech decoding apparatus according to claim 1, wherein:

the second decoder further decodes an encoded parameter transmitted in the second frame subsequent to the first frame to acquire an excitation power of the first frame as first excitation power; and a first adjuster that adjusts power of the compensated excitation signal to the first excitation power.

3. The speech decoding apparatus according to claim 2, wherein the first adjuster adjusts power of the compensated excitation signal to the first excitation power while maintaining an amplitude of the first pitch pulse waveform.

4. The speech decoding apparatus according to claim 3, further comprising:

a first calculator that calculates excitation power of the first pitch pulse waveform as a second excitation power;

a second calculator that calculates a difference between the first excitation power and the second excitation power as a third excitation power; and a difference generator that makes an amplitude of a section corresponding to the first pitch pulse waveform zero in an excitation signal of the first frame, to generate a differential excitation signal, wherein the first adjuster adjusts amplitude of the differential excitation signal and adjusts excitation power of the differential excitation signal to the third excitation power.

5. The speech decoding apparatus according to claim 1, further comprising:

a detector that eliminates the first pitch pulse waveform in a search section of a predetermined length backward in time from a rear-end of the first frame and detects a pitch pulse waveform whose amplitude is at least equal to a threshold value as a pseudo-pitch-pulse-waveform;

a noise generator that generates noise of a length of the pseudo-pitch-pulse-waveform; and a replacer that replaces the pseudo-pitch-pulse-waveform with the noise in an excitation signal of the first frame.

6. The speech decoding apparatus according to claim 5, wherein the predetermined length of the search section is equal to a pitch lag length of one frame ahead in time from the first frame.

7. The speech decoding apparatus according to claim 5, wherein the noise is generated using one of random noise, Gaussian noise, and a past steady-state excitation.

8. The speech decoding apparatus according to claim 1, wherein:

the pitch pulse information further includes the pitch lag; and the excitation signal compensation section further generates a second pitch pulse waveform by multiplying the pitch pulse learned waveform by an attenuation coefficient, calculates an addition position of the second pitch pulse waveform using the pitch pulse position information and the pitch lag, and further adds the second pitch pulse waveform to the excitation signal at the calculated addition position to generate a compensated excitation signal.

9. The speech decoding apparatus according to claim 8, wherein the excitation signal compensation section calculates a position separated by the pitch lag in a past direction of a time domain from a position indicated by the pitch pulse position information as the addition position.

10. The speech decoding apparatus according to claim 8, wherein the excitation signal compensation section detects a last pitch pulse position of a frame immediately preceding the first frame that is the lost frame, and calculates a position, which is located at a distance equal to the pitch lag of the lost frame from the last pitch pulse position, as the addition position of the second pitch pulse.

11. The speech decoding apparatus according to claim 1, wherein the excitation signal compensation section detects a last pitch pulse position of a frame immediately preceding the first frame that is the lost frame, calculates a position, which is located at a distance equal to the pitch lag of the lost frame from the last pitch pulse position, as an addition position of the second pitch pulse, extracts, from the excitation signal, a predetermined section centered at the addition position of the second pitch pulse and performs windowing for the extracted section from the excitation signal so that an amplification coefficient of a window at an endpoint of a pitch pulse waveform of the extracted section becomes a value close to 1.0, to obtain a third pitch pulse waveform, and adds the third pitch pulse waveform to the addition position of the second pitch pulse of the excitation signal to generate a compensated excitation signal.

* * * * *